US007982923B2

(12) United States Patent
Andoh et al.

(10) Patent No.: US 7,982,923 B2
(45) Date of Patent: Jul. 19, 2011

(54) IMAGE FORMING APPARATUS

(75) Inventors: Takayuki Andoh, Kanagawa-ken (JP); Takuji Takahashi, Kanagawa-ken (JP); Takamasa Shiraki, Kanagawa-ken (JP); Shigeo Nanno, Kyoto (JP); Yoshihide Ohta, Kanagawa-ken (JP); Kohji Hatayama, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 842 days.

(21) Appl. No.: 12/010,742

(22) Filed: Jan. 29, 2008

(65) Prior Publication Data
US 2008/0180760 A1    Jul. 31, 2008

(30) Foreign Application Priority Data

Jan. 30, 2007 (JP) .................................. 2007-019273
Jul. 9, 2007 (JP) .................................. 2007-180236
Nov. 16, 2007 (JP) .................................. 2007-297941

(51) Int. Cl.
    *H04N 1/04* (2006.01)
(52) U.S. Cl. ........ 358/474; 358/496; 358/498; 399/165; 399/110; 271/4.1; 271/162
(58) Field of Classification Search .................. 358/496, 358/474, 497, 505, 501, 498, 1.13, 401; 399/165, 399/110, 126, 405, 361, 125, 194, 121; 271/4.1, 271/162, 124
See application file for complete search history.

(56) References Cited

U.S. PATENT DOCUMENTS

| 5,532,825 | A  | * | 7/1996  | Lim et al. ................... 358/296 |
|-----------|----|----|---------|----------------------------------------|
| 6,185,010 | B1 | * | 2/2001  | Watanabe .................... 358/474 |
| 6,628,433 | B1 | * | 9/2003  | Westcott et al. ............. 358/474 |
| 6,690,901 | B2 |   | 2/2004  | Katsuyama et al. |
| 6,903,849 | B2 | * | 6/2005  | Yokota ........................ 358/497 |
| 7,199,910 | B2 | * | 4/2007  | Manabe et al. .............. 358/474 |
| 2001/0009625 | A1 | * | 7/2001  | Tamehira et al. ............. 399/405 |
| 2001/0040705 | A1 | * | 11/2001 | Yokota ........................ 358/474 |
| 2002/0150403 | A1 |   | 10/2002 | Katsuyama et al. |
| 2009/0225375 | A1 | * | 9/2009  | Iwata .......................... 358/474 |
| 2009/0316547 | A1 | * | 12/2009 | Worthington et al. ....... 369/53.2 |

FOREIGN PATENT DOCUMENTS

| JP | 05-197225 | 8/1993 |
| JP | 05-219308 | 8/1993 |
| JP | 05-330713 | 12/1993 |

(Continued)

*Primary Examiner* — Negussie Worku
(74) *Attorney, Agent, or Firm* — Harness, Dickey & Pierce, P.L.C.

(57) ABSTRACT

An image forming apparatus that includes an image reading part, an image forming part to form an image on a sheet, a sheet discharge part to discharge the sheet from front to rear of the image forming apparatus, a sheet stack part to stack the sheet between the image reading part and the image forming part, a supporter provided outside the sheet stack part along a discharge direction of the sheet to form a space between the sheet stack part and the image reading part, a connector to electrically connect the image forming part with the image reading part, a bending unit provided between the image reading part and the supporter to bend back the connector in a sliding direction of the image reading part, and a bend limiter provided at a rear position of the image reading part in the sliding direction to limit bending of the connector.

5 Claims, 58 Drawing Sheets

FOREIGN PATENT DOCUMENTS

| | | |
|---|---|---|
| JP | 10-063053 | 3/1998 |
| JP | 10-290311 | 10/1998 |
| JP | 10-301349 | 11/1998 |
| JP | 11-038716 | 2/1999 |
| JP | 2001-022143 | 1/2001 |
| JP | 2001-230895 | 8/2001 |
| JP | 2001-343880 | 12/2001 |
| JP | 2002-354173 | 12/2002 |
| JP | 2002-361975 | 12/2002 |
| JP | 2002-365864 | 12/2002 |
| JP | 2003-058019 | 2/2003 |
| JP | 2004-045906 | 2/2004 |
| JP | 2004-264500 | 9/2004 |
| JP | 2004-279691 | 10/2004 |
| JP | 2004-354832 | 12/2004 |
| JP | 2005-020374 | 1/2005 |
| JP | 2005-167801 | 6/2005 |
| JP | 2005-182032 | 7/2005 |
| JP | 2005-242267 | 9/2005 |
| JP | 2005-301154 | 10/2005 |
| JP | 2006-065188 | 3/2006 |
| JP | 2006-119236 | 5/2006 |
| JP | 2006-119474 | 5/2006 |
| JP | 2006-184530 | 7/2006 |
| JP | 2006-208910 | 8/2006 |
| JP | 2006-227064 | 8/2006 |
| JP | 2006-240848 | 9/2006 |
| JP | 2006-276620 | 10/2006 |
| JP | 2006-279877 | 10/2006 |
| JP | 2006-330356 | 12/2006 |

* cited by examiner

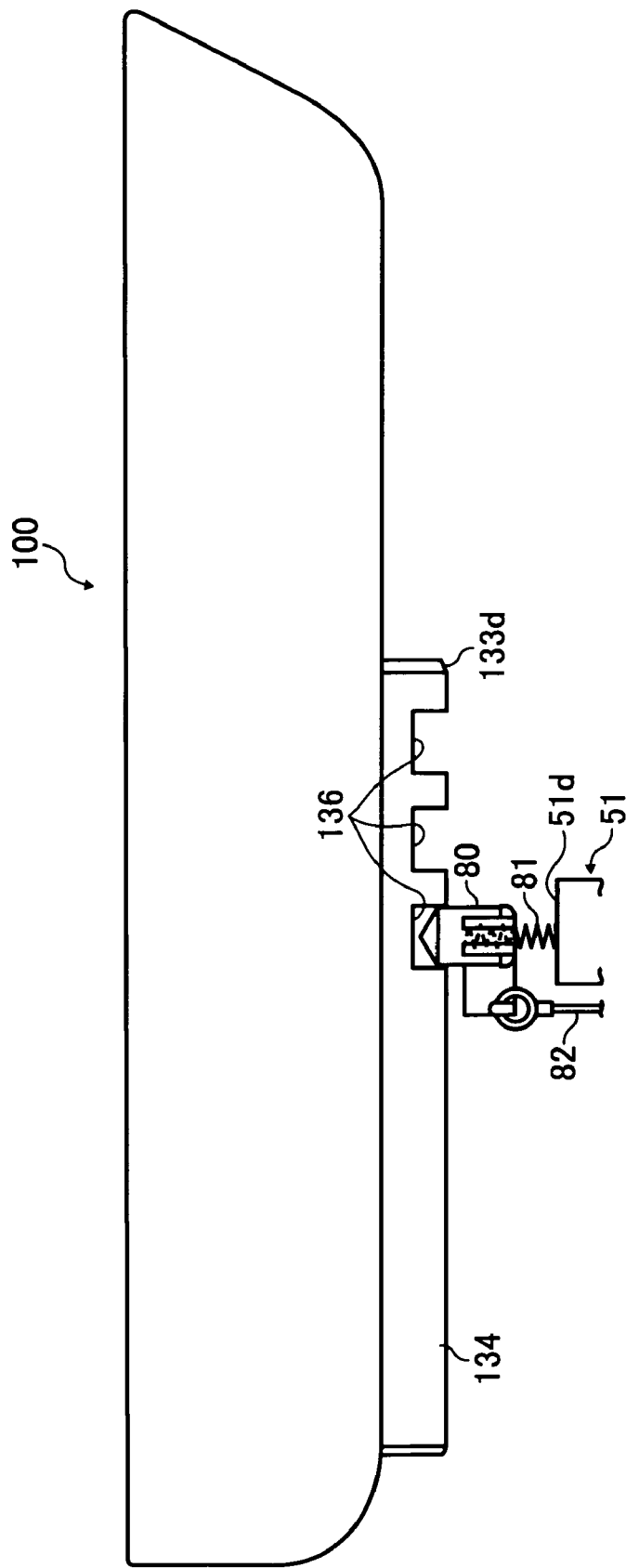

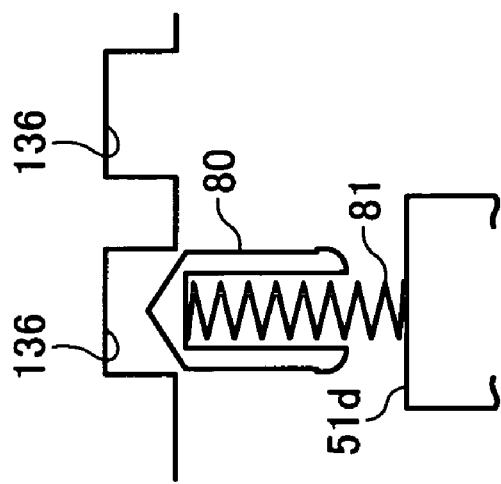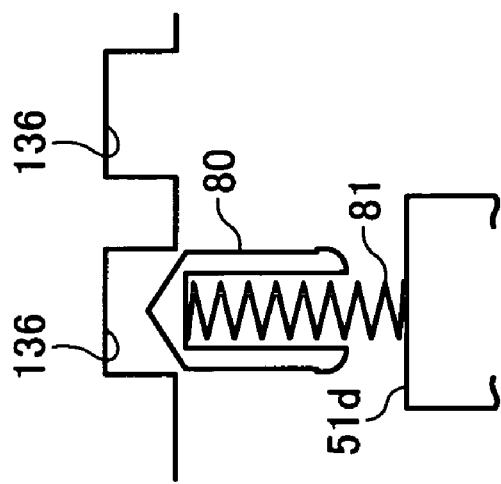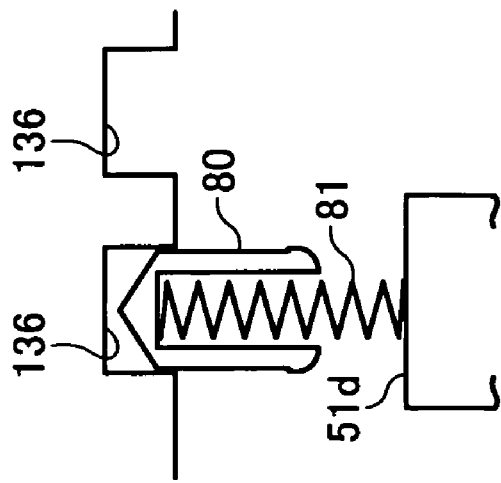

IMAGE FORMING APPARATUS

CROSS-REFERENCE TO RELATED APPLICATIONS

This patent specification is based on and claims priority from Japanese Patent Application Nos. 2007-019273, filed on Jan. 30, 2007, 2007-297941, filed on Nov. 16, 2007, and 2007-180236, filed on Jul. 9, 2007 in the Japan Patent Office, the entire contents of each of which are hereby incorporated by reference herein.

BACKGROUND

1. Field of the Invention

The present invention generally relates to an image forming apparatus such as a copier, a printer, a facsimile machine, and a multifunction machine including at least two of these functions.

2. Description of the Related Art

An image forming apparatus with a scanner including a sheet stack part for stacking a recorded sheet inside a housing thereof is well known. Specifically, the upper surface of the apparatus body is used as the sheet stack part and the scanner reading an original document is provided above the sheet stack part. Such an image forming apparatus has an advantage of having a small footprint.

In one related-art example of an image forming apparatus, a sheet is discharged from front to rear of the apparatus. The apparatus is designed to be compact in width and height by overlapping the scanner and the sheet stack part as much as possible and reducing the space therebetween.

However, when supporters for supporting the scanner are provided on the right, left, and rear as viewed from the front of the apparatus, the apparatus size increases to prevent the sheet from contacting the supporters. In addition, the supporter on each side in the discharge direction restricts visibility of the sheet from the side of the apparatus and obstructs removal of the sheet.

One proposal to enhance the ability to see and remove the sheet is to install the scanner so as to slide relative to the apparatus body.

In a typical image forming apparatus, a scanner and an apparatus body are connected to each other using a connection member such as a flat cable to supply electrical power and exchange signals therebetween. Similarly, the slidable scanner and the apparatus body are connected to each other using a flat cable, etc.

FIGS. 1 and 2 illustrate cross-sectional views illustrating states of a flat cable when a scanner is slid in a typical image forming apparatus. In FIG. 1, as a signal line for transmitting image information read by a scanner 530 and a connection member for driving a scanner motor, a flat cable 570 runs from the scanner 530 to a control unit, not shown, of an apparatus body 501 through a supporter 550.

Since the scanner 530 can slide relative to the apparatus body 501, the position of the scanner 530 changes relative to the apparatus body 501 in the sliding direction of the scanner 530. Therefore, the flat cable 570 needs to be bent back, otherwise the flat cable 570 is tensioned, which makes it difficult to slide the scanner 530.

However, when the flat cable 570 is bent back, the flat cable 570 hangs down and the lower surface thereof contacts the supporter 550 as illustrated in FIG. 1.

When the scanner 530 is slid backward, the back edge of the scanner 530 protrudes over the back edge of the apparatus body 501 and a space 580 is exposed at the lower surface of the sliding portion of the scanner 530 as illustrated in FIG. 2. Then, the flat cable 570 hangs down from the space 580, and a user's finger, etc. gets caught in the flat cable 570. Further, a connection between the flat cable 570 and the scanner 530 is put under load when the scanner 530 is slid forward.

SUMMARY

This patent specification describes a novel image forming apparatus that includes an image reading part to read an original, an image forming part to form an image of the original on a sheet, a sheet discharge part to discharge the sheet on which the image is formed by the image forming part from front to rear of a main body of the image forming apparatus, a sheet stack part to stack the sheet discharged by the sheet discharge part between the image reading part and the image forming part, a supporter provided outside the sheet stack part along a discharge direction of the sheet to form a space between the sheet stack part and the image reading part, a connector to electrically connect the image forming part with the image reading part, a bending unit provided between the image reading part and the supporter to bend back the connector in a sliding direction of the image reading part, and a bend limiter provided at a rear position of the image reading part in the sliding direction to limit bending of the connector.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 24 is a cross-sectional view illustrating the scanner lock mechanism in the right supporter;

FIGS. 25A, 25B, and 25C illustrate changes in an engagement state between a lock member and a groove;

DETAILED DESCRIPTION OF EXEMPLARY EMBODIMENTS

Figure 1:
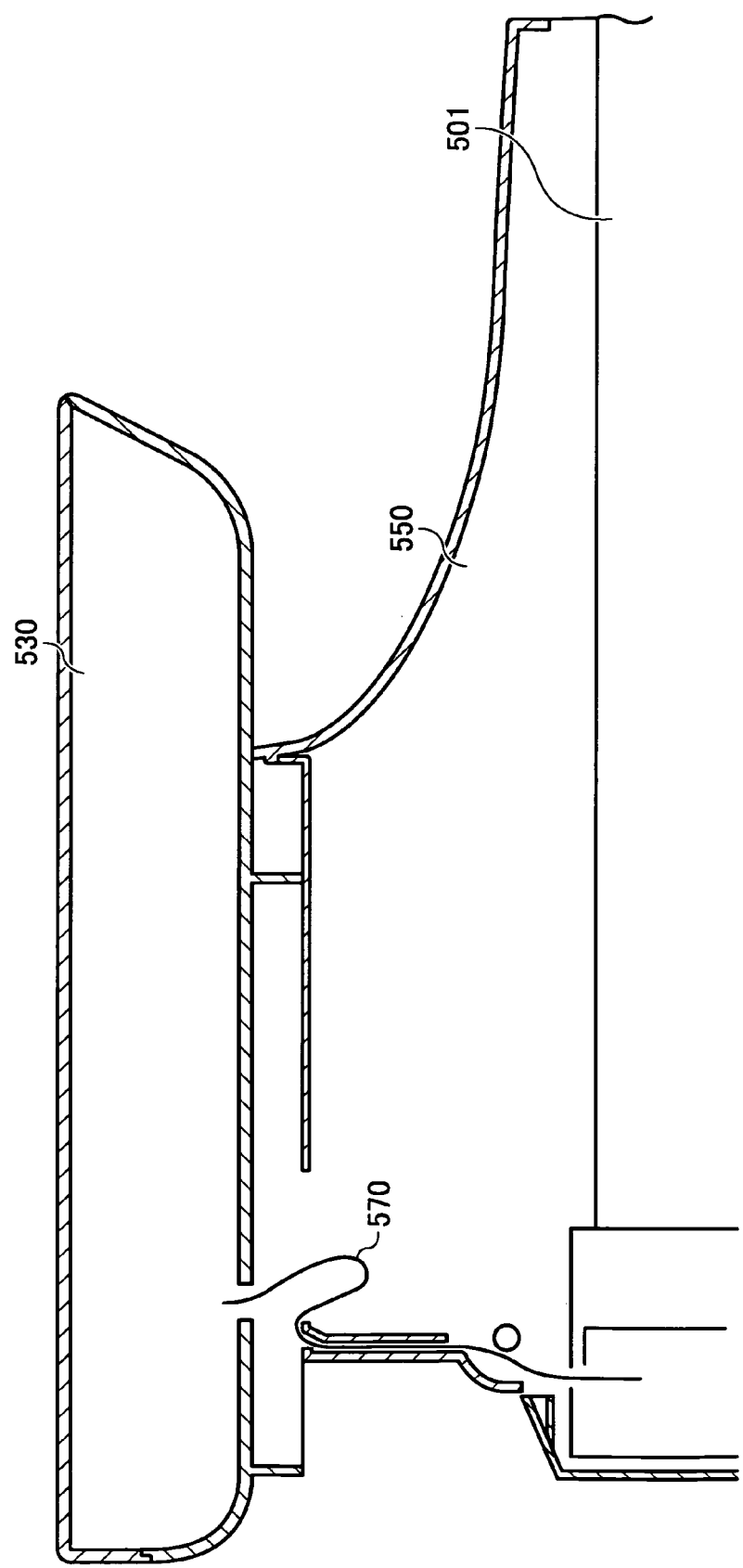
FIG. 1 is a cross-sectional view illustrating a state of a flat cable when a scanner is slid in a typical image forming apparatus.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Figure 3:
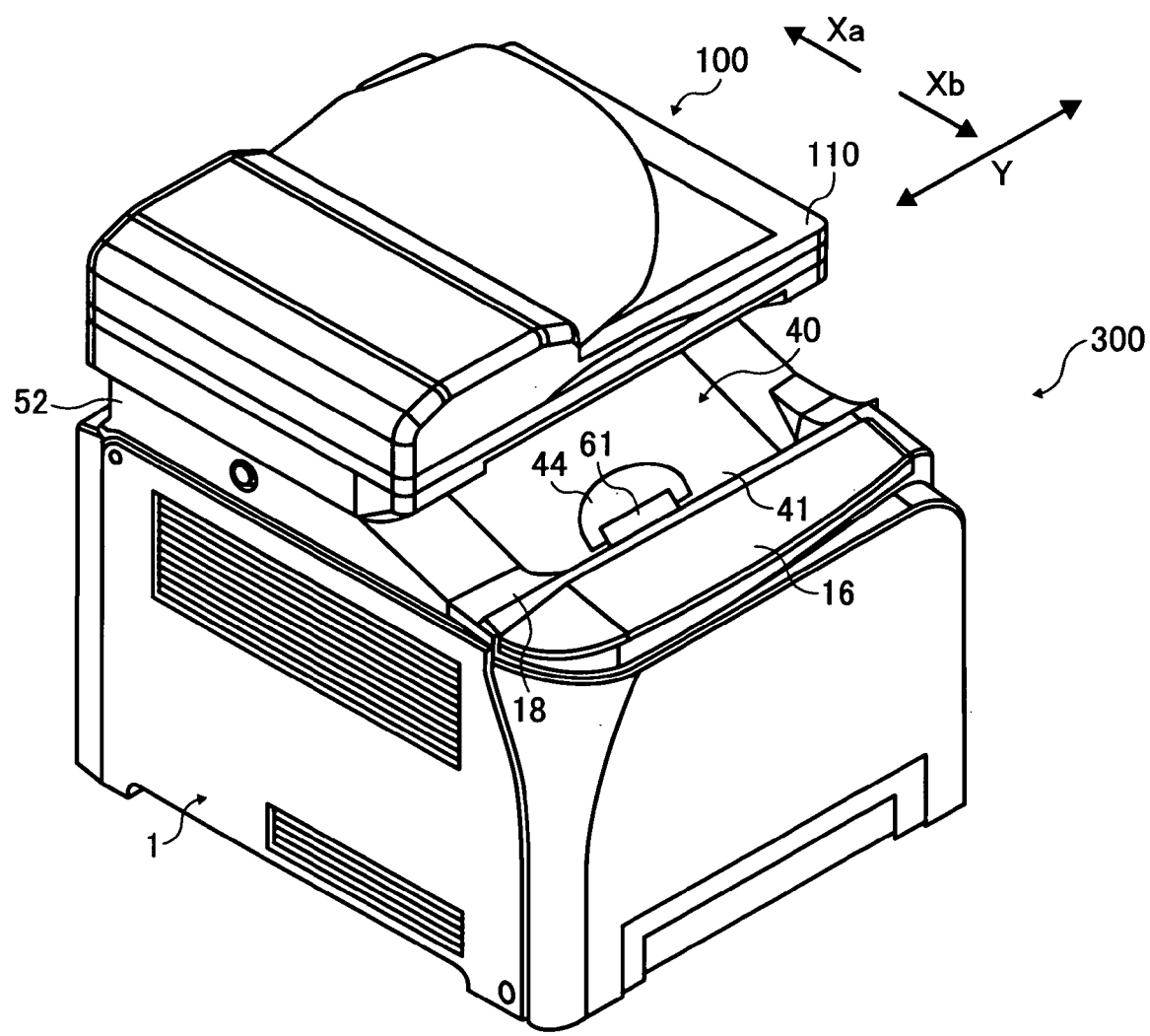
FIG. 3 is a perspective view illustrating an image forming apparatus according to an illustrative embodiment of the present invention viewed obliquely from upper left.
Figure 4:
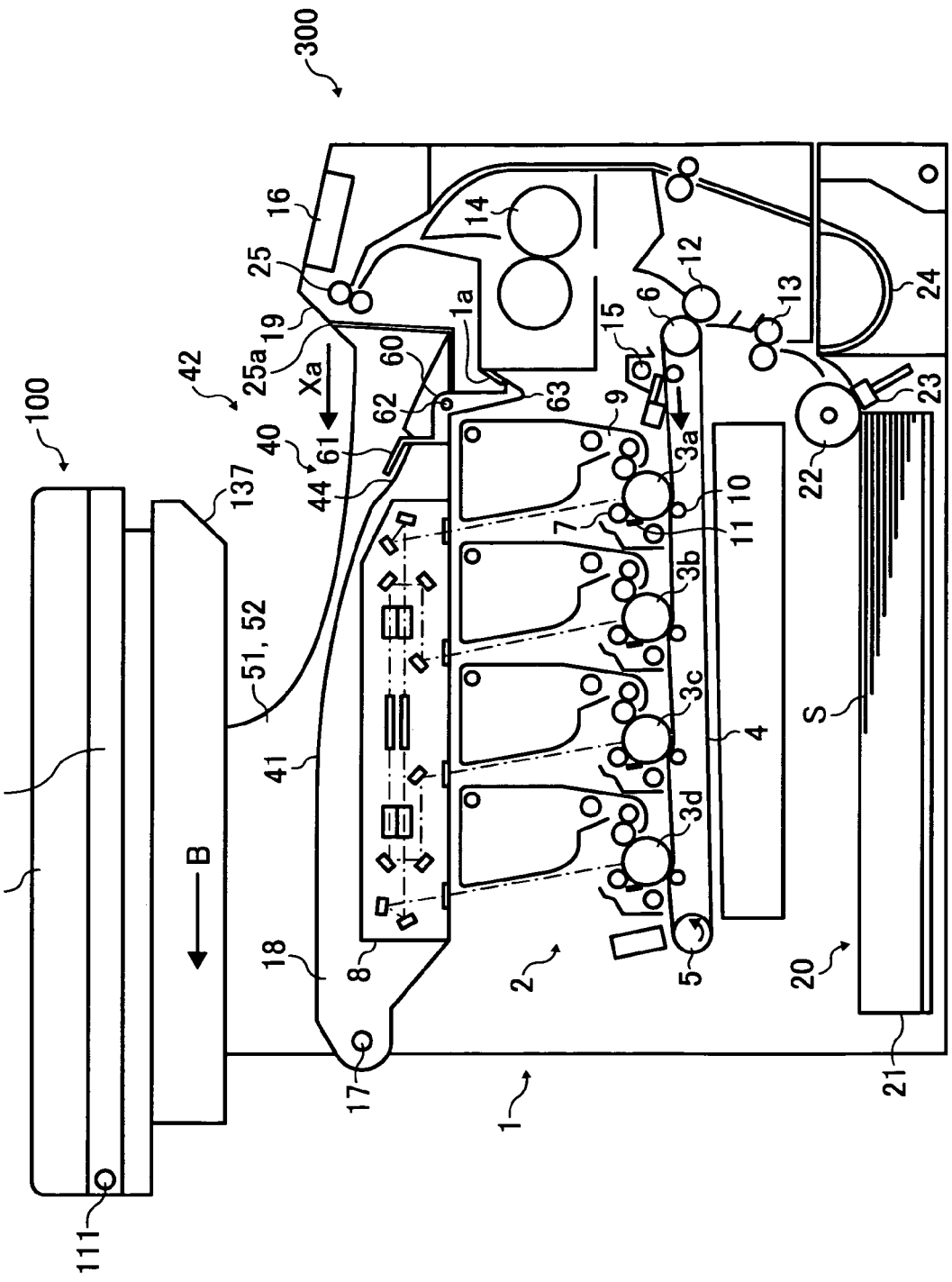
FIG. 4 is a schematic cross-sectional view illustrating an example of an interior of the image forming apparatus illustrated in FIG. 3.

Referring now to the drawings, wherein like reference numerals and reference characters designate identical or corresponding parts throughout the several views thereof, and particularly to FIGS. 3 and 4, an image forming apparatus 300 according to an example embodiment of the present invention is described.

FIG. 3 is a perspective view of the image forming apparatus 300 and FIG. 4 is a schematic cross-sectional view illustrating an inner configuration thereof. As illustrated in FIG. 3, the image forming apparatus 300 includes an apparatus body (main body) 1 and a scanner 100, which is an image reading part. The scanner 100 is located above the apparatus body 1, and a sheet stack part 40 is provided in a space formed between the apparatus body 1 and the scanner 100. The apparatus body 1 includes a control panel 16 located at a front upper potion thereof and has an upper cover 18 attached.

The upper cover 18 covers an upper portion of the apparatus body 1, and an upper surface of the upper cover 18 is used as a sheet stack surface 41. The upper cover 18 is configured to be openable with respect to the apparatus body 1 and provided with a cover pull 61 as a handle and a fan-shaped concavity 44 so that a user can pull the cover pull 61 and open the upper cover 18 by inserting his/her hand into the concavity 44.

The scanner 100 is configured as an upper unit, and is slidable in a discharge direction shown by arrow Xa and a direction opposite thereto shown by arrow Xb, which are hereinafter also collectively referred to as the sliding direction. The scanner 100 is supported by supporters 51 and 52. The supporter 51 is provided on a side opposite the supporter 52, although not illustrated in FIG. 3. In FIG. 3, a reference character Y indicates a sheet width direction, which is perpendicular to the discharge direction shown by arrow Xa.

The image forming apparatus 300 is a tandem color image forming apparatus with a scanner. As described above, the image forming apparatus 300 includes a sheet discharge space inside a housing thereof.

As illustrated in FIG. 4, the apparatus body 1 further includes an image forming part 2 to form images on sheets, located in a center portion thereof and a sheet feeder 20 to feed sheets to the image forming part 2, located beneath the image forming part 2.

The image forming part 2 includes drum shaped photoreceptors 3a, 3b, 3c, and 3d, on which different color toner images are formed. In an example embodiment illustrated in FIG. 4, yellow, cyan, magenta, and black images are formed on the photoreceptors 3a, 3b, 3c, and 3d, respectively. The photoreceptors 3a, 3b, 3c, and 3d are aligned in parallel at a given interval, and an intermediate transfer belt 4, which is an endless belt looped around support rollers 5 and 6 and driven to rotate counterclockwise in FIG. 4 and functions as an intermediate transferer, faces lower sides of the photoreceptors 3a, 3b, 3c, and 3d. Alternatively, a drum may be used as the intermediate transferer.

Configurations around the photoreceptors 3a, 3b, 3c, and 3d are described below, based on the photoreceptor 3a located rightmost in FIG. 4, on which a yellow toner image is formed, because configurations thereof are similar to each other.

Around the photoreceptor 3a are provided, in order, a charger 7, an exposure unit including a light-scanning device 8, a developing unit 9, and a primary transferer 10 facing the photoreceptor 3a via the intermediate transfer belt 4, and a cleaner 11.

When image forming processes are started in the image forming part 2 described above, the photoreceptor 3a is rotated clockwise in FIG. 4 and the charger 7 charges the surface of the photoreceptor 3a to a predetermined polarity uniformly. The light-scanning device 8 directs laser light onto the charged surface of the photoreceptor 3a according to image information, thus forming an electrostatic latent image thereon. The electrostatic latent image is developed into a yellow toner image by the developing unit 9, and then transferred onto the intermediate transfer belt 4 in a primary transfer process by the primary transferer 10. The cleaner 11 removes toner remaining on the surface of the photoreceptor 3a after the toner image is transferred therefrom.

In full color image forming, the image forming processes described above are also performed on the photoreceptors 3b, 3c, and 3d to form a cyan, magenta, and black toner images thereon. The yellow, cyan, magenta, and black toner images are superimposed sequentially one on another on the intermediate transfer belt 4, and thus a full color image is formed. The image forming apparatus 300 further includes a secondary transfer roller 12 facing the support roller 6 via the intermediate transfer belt 4.

The sheet feeder 20 includes a sheet cassette 21 containing sheets S, a feed roller 22 to feed the sheets S to the image forming part 2, a friction pad 23 to separate the sheets S so that the sheets are fed one by one, and a return path 24. The sheets S include transfer papers, resin films, etc. The return path 24 is used when images are formed on both surfaces of a sheet S.

The apparatus body 1 further includes a pair of registration rollers 13, a fixer 14, a belt cleaner 15, a pair of discharge rollers 25, and a sheet exit 25a. The discharge rollers 25 and the sheet exit 25a are located at an upper front portion of the apparatus body 1, that is, an upper right portion in FIG. 4. The sheet S is discharged in the discharge direction shown by arrow Xa onto the sheet stack surface 41 after an image is formed thereon.

The sheet S transported by the feed roller 22 is forwarded to the registration rollers 13, and a leading edge of the sheet S is sandwiched between the registration rollers 13 that are in a rest state. After the sheet S is aligned, the registration rollers 13 rotate and forward the sheet S to a secondary transfer nip, where the secondary transfer roller 12 is provided, in such a way that the full color image on the intermediate transfer belt 4 meets the leading edge of the sheet S at the secondary transfer nip.

After an unfixed color toner image is transferred onto the sheet S at the secondary transfer nip, the sheet S is transported to the fixer 14, which fixes the unfixed toner image with heat and pressure. The sheet S is then discharged by the discharge rollers 25 through the sheet exit 25a into the sheet stack part 40. It is to be noted that the belt cleaner 15 removes toner remaining on the intermediate transfer belt 4 after the color toner image is transferred therefrom.

It is to be noted that, in the present embodiment, each of the photoreceptors 3a, 3b, 3c, and 3d and the charger 7, the developing device 9, and the cleaner 11 are integrated into a process cartridge. The process cartridge can be removed from and installed in the apparatus body 1 by opening the upper cover 18.

The scanner 100 includes a mechanism to scan an image on an original document set on an upper portion thereof, similarly to a typical image reading device. The scanner 100 further includes a platen cover 110 at an upper portion thereof. The platen cover 110 is a document press member that presses and holds the original document and is rotatable around a hinge 111 to open and close with respect to a housing of the scanner 100. An automatic document feeder (ADF) 120 is integrated into the platen cover 110. Thus, the scanner 100 can scan documents either set by a user manually or forwarded by the ADF 120.

In the present embodiment, the side on which the control panel 16 is provided is a front side of the image forming apparatus 300, the apparatus body 1, and the scanner 100, and is hereinafter also simply referred to as the front side. Similarly, the sides on which the supporters 51 and 52 are provided are the right and left sides of the image forming apparatus 300 and the apparatus body 1, respectively. Therefore, the image forming apparatus 300 is a front-discharge type and the sheet exit 25a is located at the front side, and sheets are discharged from the front to a back of the apparatus body 1 onto the sheet stack part 40. In FIG. 4, a reference numeral 42 indicates a front opening of the space between the scanner 100 and the apparatus body 1, used to access the sheet stack part 40. The scanner 100 further includes a first tapered portion 137 at a lower front corner. The apparatus body 1 further includes a second tapered portion 19 above the control panel 16.

The image forming part 2 and the scanner 100 are located so that the discharge direction shown by arrow Xa and a sub-scanning direction of the scanner 100 are at right angles or substantially right angles to each other. As illustrated in FIG. 4, the front side of the apparatus body 1 is located upstream of the scanner 100 and the supporters 51 and 52 in the discharge direction shown by arrow Xa, and the control panel 16 is located at the upper front portion, thus providing sufficient space for the front opening 42 to enhance removal of short sheets from above as well as visibility and operability of the cover pull 61.

The upper cover 18 provided at the upper portion of the apparatus body 1 is configured as a cover or a frame of the image forming part 2 on which the supporters 51 and 52 are provided. In the present embodiment, the supporters 51 and 52 are provided on both left and right edges of the upper cover 18 and form the sheet stack part 40 and the space between the scanner 100 and the sheet stack part 40. It is to be noted that the image forming apparatus 300 includes only the supporters 51 and 52 provided on left and right edges of the upper cover 18, and does not include a supporter at a back edge of the upper cover 18. This configuration is designed to enable the sheet stack part 40 to accommodate a long sheet having a length longer than a distance between front and back edges of the sheet stack surface 41, by dropping an overflowing part of the sheet behind the apparatus body 1. Further, although the overhanging scanner 100 overhangs the sheet stack surface 41, light does come from a back side of the sheet stack part 40, which is open.

The upper cover 18 is further described below, referring to FIGS. 4 and 5.

The image forming apparatus 300 further includes a rotary shaft 17 provided at a back end portion thereof and a cover lock 60. The upper cover 18 supports the light-scanning device 8, which is included in the image forming part 2, at a lower portion thereof and is rotatable upward around the rotary shaft 17. The cover lock 60 locks the upper cover 18 to the apparatus body 1. When the cover lock 60 is released, the upper cover 18 is rotatable and openable. When the upper cover 18 rotates counterclockwise around the rotary shaft 17 and opens with respect to the apparatus body 1 as illustrated in FIG. 5, the scanner 100 supported by the supporter 51 and 52 and the light-scanning device 8 are rotated together with the upper cover 18. In this state, the image forming part 2 is accessible, thus facilitating maintenance work. The scanner 100, the sheet stack part 40, and the upper cover 18 together form an upper structure 26.

The cover pull 61 is integrated into the cover lock 60 and used to unlock the cover lock 60. The cover pull 61 is located on the sheet stack surface 41, at a portion that is covered with sheets when sheets are stacked on the sheet stack surface 41. Further, the cover lock 60 integrally includes a support shaft 62 extending in the sheet width direction shown by arrow Y in FIG. 3 and a pair of lock claws 63 at both ends of the support shaft 62. The lock claws 63 engage protrusions 1a provided on the apparatus body 1 as illustrated in FIG. 4, and are biased constantly in a direction to engage the protrusion 1a. The support shaft 62 is rotatably supported by the upper cover 18. The cover pull 61 includes a plate part whose surface is flush with or nearly flush with the sheet stack surface 41.

As described above, when a user inserts his/her hand into the concavity 44 and pulls up the cover pull 61 against the bias force that engages the lock claws 63 with the protrusion 1a, the cover lock 60 rotates clockwise around the support shaft 62 and the lock claws 63 disengage from the protrusion 1a. When the user pulls up the cover pull 61 further, the upper cover 18 is opened counterclockwise as illustrated in FIG. 5. This open direction of the upper cover 18 is identical or similar to the open direction of the platen cover 110 including the ADF 120.

When the upper cover 18 is opened, the upper cover 18 is rotated upward with the back side of the sheet stack surface 41 down. Therefore, if a user forgets to remove the sheets from the sheet stack surface 41 and opens the upper cover 18 accidentally with the sheets thereon, the sheets slide down and fall behind the image forming apparatus 300. Although this may be prevented by a supporter to block the back side of the sheet stack part 40, long sheets are blocked by such supporter and cannot be stacked properly.

By contrast, in the present embodiment, the cover pull 61 to unlock the cover lock 60 and open the upper cover 18 is provided at the portion that is covered with sheets when sheets are stacked on the sheet stack surface 41, thus preventing the upper cover 18 from being opened while sheets are on the sheet stack surface 41.

If a scanner is provided above an image forming apparatus and sheets are stacked under the scanner, it is harder to see and to access the sheets compared to arrangements in which the sheets are stacked on an image forming apparatus that is without a scanner. Therefore, in the present embodiment, the large front opening 42 is provided between the scanner 100 and the apparatus body 1 as illustrated in FIG. 4 to access the sheet stack part 40. Further, the scanner 100 is supported by the supporters 51 and 52 slidably in a direction shown by arrow B in FIG. 4 that is a direction identical or similar to the discharge direction shown by arrow Xa. Therefore, the front opening 42 can be enlarged by sliding the scanner 100 backward.

Further, as described above, the image forming apparatus 300 includes the first tapered portion 137 illustrated in FIG. 4 to enhance visibility of and access to the sheets from the front opening 42 and the second tapered portion 19 illustrated in FIG. 4 to enlarge the front opening 42. In particular, because the second tapered portion 19 is configured to enlarge the size of the front opening 42 outward, the user can put his/her hand into the sheet stack part 40 easily and remove the sheets stacked therein. This configuration may be applied to the first tapered portion 137. Alternatively, another configuration may be used to enlarge the size of the front opening 42, instead of a tapered portion.

The scanner 100 is described in further detail below, with reference to FIG. 6.

Figure 6:
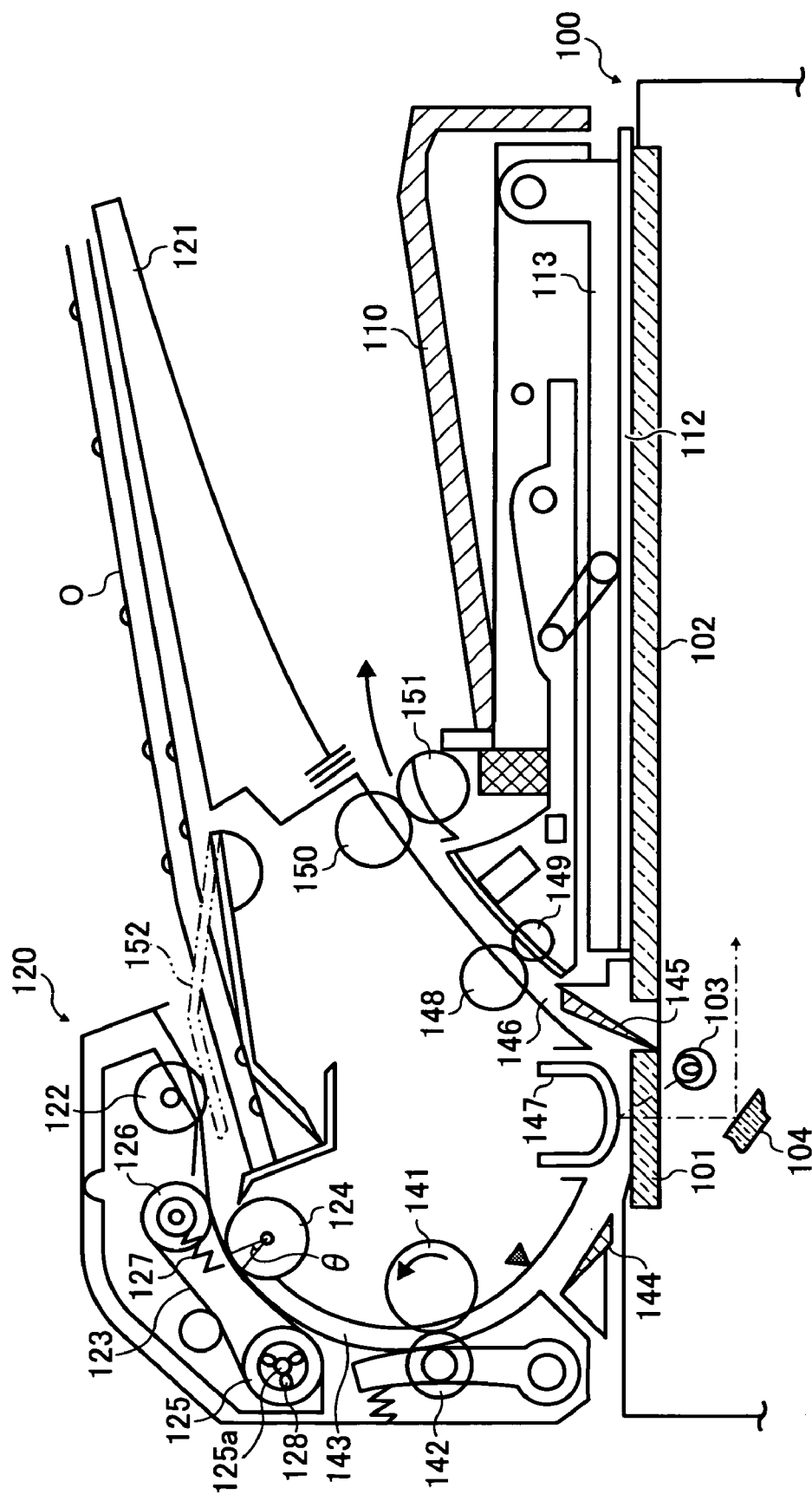
FIG. 6 is a schematic cross-sectional view illustrating a configuration of a scanner included in the image forming apparatus illustrated in FIG. 3.

As illustrated in FIG. 6, a slit glass 101 as a first scan position and a contact glass 102 as a second scan position are provided on an upper surface of a main body of the scanner 100. Beneath the slit glass 101 and the contact glass 102, an exposure lamp 103 as an image reader and a first mirror 104, etc., are provided. The exposure lamp 103, the first mirror 104, etc., are integrated into a scan unit that moves laterally beneath the contact glass 102 in FIG. 6 while scanning an original document set on the contact glass 102 in a first scan mode. Further, when an original document on the slit glass 101 is scanned, the scan unit stops beneath the slit glass 101. After the exposure lamp 103 scans a surface of the original document in a second scan mode, light reflected from the surface of the original document is imaged on an imaging element such as a CCD via the first mirror 104, etc., through a known method.

Figure 7:
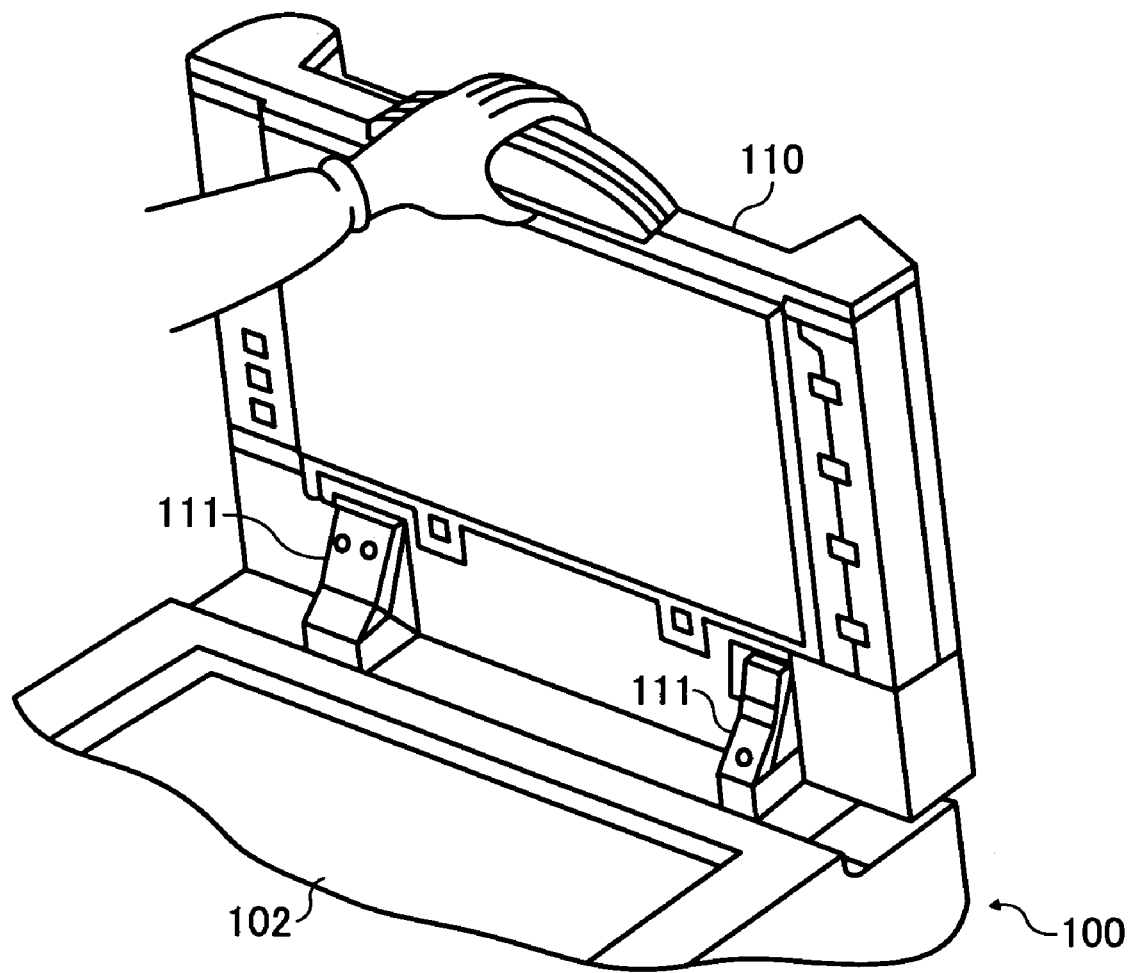
FIG. 7 illustrates a state of the image forming apparatus illustrated in FIG. 3 when a platen cover is opened.

The platen cover 110 includes a reflection plate 112 at a lower surface thereof, configured to press the original document set on the contact glass 102 against the contact glass 102 and serve as a white standard for reading the original document. The platen cover 110 connects to the main body of the scanner 100 via the hinge 111 as illustrated in FIG. 7, and is openable and closable with respect to the housing of the scanner 100.

Referring to FIG. 6, the ADF 120 located above the platen cover 110 includes a document table 121, a feed roller 122, a separation belt 123, and a separation prevention roller 124 at an upper portion thereof. The document table 121 accommodates an original document bundle O including a plurality of sheets. After the original document bundle O is fed by the feed roller 122, which can approach and withdraw from the original document bundle O, the original document bundle O is transported one sheet at a time and separated by the separation belt 123 and the separation prevention roller 124. The separation belt 123 presses against the separation prevention roller 124 at a given angle θ.

The separation belt 123 is looped around a driving roller 125 including a shaft 125a and a driven roller 126. A spring 127 biases the driven roller 126 to apply a constant tension to the separation belt 123. Between the driving roller 125 and the shaft 125a, a one-way clutch 128 is provided to rotatably drive the driving roller 125 clockwise in FIG. 6, and the driven roller 126 is also rotated clockwise. Further, the separation prevention roller 124 is configured to rotate clockwise to separate one sheet from the top of the original document bundle O sandwiched between the separation belt 123 and the separation prevention roller 124.

The ADF 120 further includes a first transport roller 141, a driven roller 142, and a turnaround path 143, a turnaround guide 144, a discharge guide 145, and a reflection guide plate 147. The sheet separated by the separation belt 123 and the separation prevention roller 124 is sandwiched between the first transport roller 141 as a driving roller and the driven roller 142, and then transported along the turnaround path 143 to the slit glass 101, guided by the turnaround guide 144.

After the sheet is transported to the slit glass 101, the discharge guide 145 guides the sheet upward to a discharge path 146. The reflection guide plate 147 is provided above the slit glass 101 and serves as a white standard for reading the original document.

The ADF 120 further includes a pressure plate 113, a second transport roller 148 as a driving roller, a driven roller 149 as a transport member, a discharge roller 150, and a driven roller 151. The second transport roller 148 and the driven roller 149 transport the sheet through the discharge path 146 by sandwiching the sheet therebetween, and then the sheet is sandwiched between the discharge roller 150 and the driven roller 151 and discharged onto the platen cover 110. The pressure plate 113 is provided above the reflection plate 112 covering the contact glass 102 and presses the original document set on the contact glass 102 against the contact glass 102. The ADF 120 further includes a pressure plate 152 provided at the document table 121.

Operation of the scanner 100 is described below.

When a user sets an original document bundle O, front surface up, on the document table 121 and then presses a start button, not shown, the pressure plate 152 presses the original document bundle O against the feed roller 122, which then transports the original document bundle O to the separation belt 123. The separation belt 123 and the separation prevention roller 124 separate one sheet from the top of the original document bundle O, and then the sheet is transported by the first transport roller 141 and the driven roller 142 along the turnaround path 143 onto the slit glass 101. On the slit glass 101, the front surface of the sheet is scanned by the scan unit including the exposure lamp 103 and the first mirror 104, etc., and then the second transport roller 148 and the driven roller 149 transport the sheet along the discharge path 146. Further, the discharge roller 150 and the driven roller 151 discharge the sheet onto the platen cover 110.

When the ADF 120 is not used, the user lifts the platen cover 110 and sets an original document on the contact glass 102. When the user presses the start button, not shown, the scan unit is actuated.

Removal of the sheet S is described below.

Figure 8:
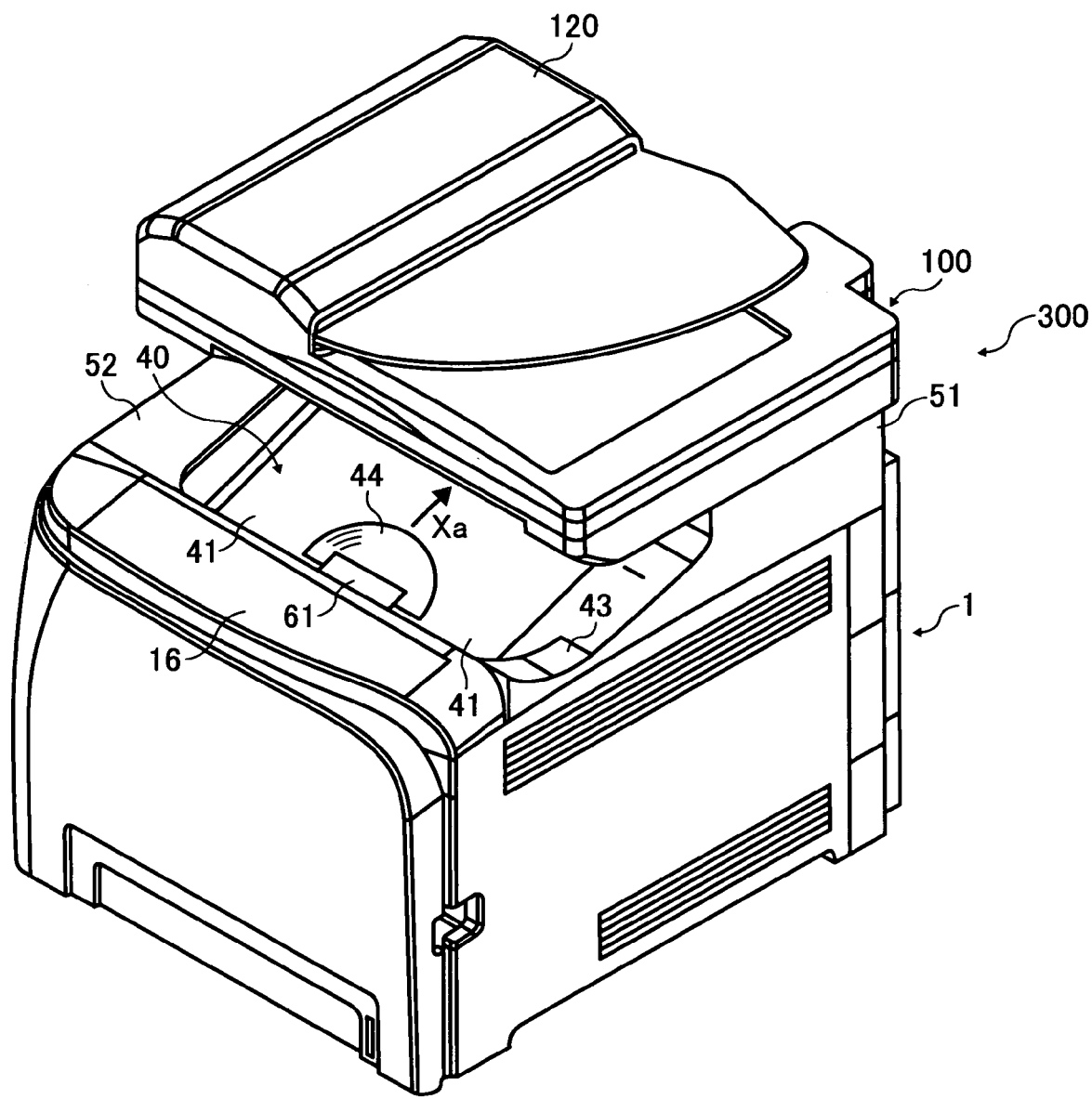
FIG. 8 illustrates the image forming apparatus illustrated in FIG. 3 viewed obliquely from upper right.
Figure 9:
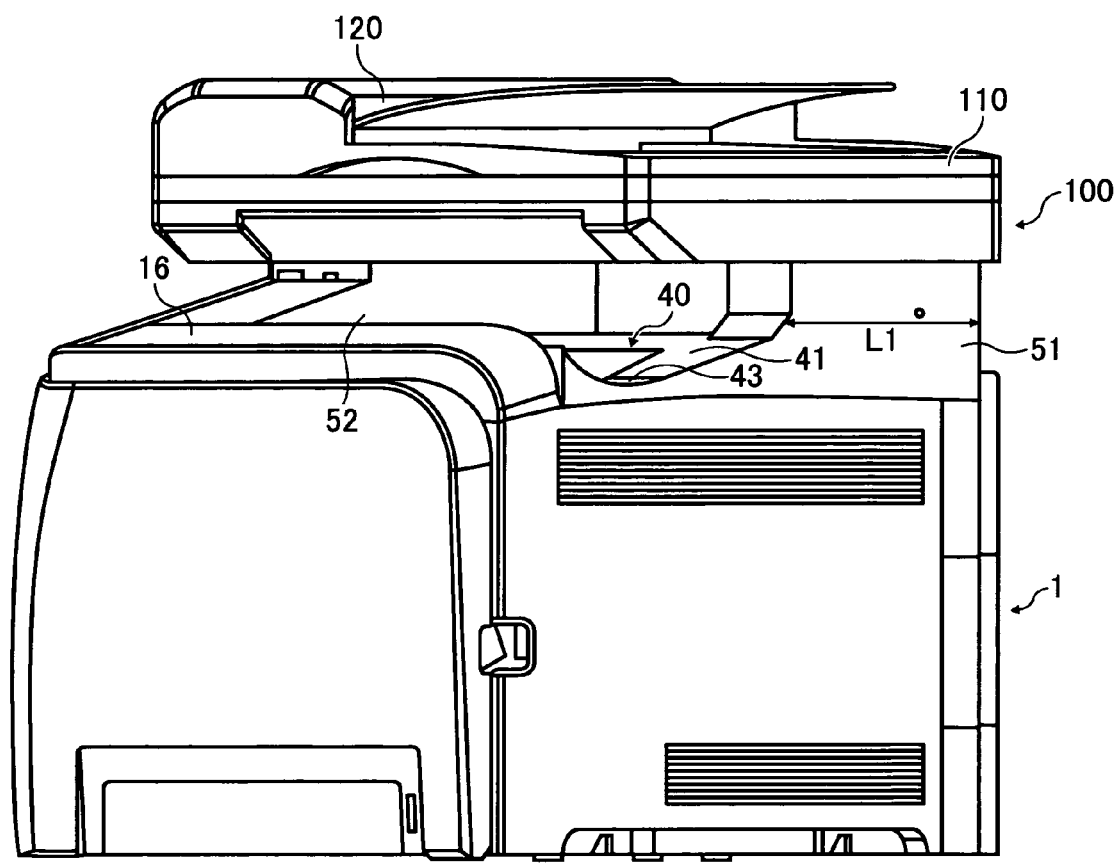
FIG. 9 illustrates the image forming apparatus illustrated in FIG. 3 viewed from right.

As illustrated in FIGS. 8 and 9, a curved portion 43 is formed in an upper right portion of the sheet stack part 40. Because of the curved portion 43, the supporter 51 has a surface lower than the sheet stack surface 41 and a sloped portion ascending in the discharge direction shown by arrow Xa. Therefore, the sheet stack surface 41 can be accessed from the side of the apparatus body 1 as well as the front side in which the control panel 16 is located, thus enhancing accessibility particularly for a large-handed user. It is to be noted that, although the curved portion 43 is formed in the upper right portion in the present embodiment, alternatively, the curved portion 43 may be formed in an upper left portion of the sheet stack part 40.

Referring to FIG. 8, the fan-shaped concavity 44 is formed around the cover pull 61 so that the user can grasp the cover pull 61 easily as described above. Further, the concavity 44 offers a space in which the user puts his/her fingers and scoops the sheet S discharged onto the sheet stack surface 41. Because the sheet S is discharged with a centerline thereof aligned with a centerline of the sheet stack surface 41 in the sheet width direction shown by arrow Y in FIG. 3 in the example embodiment illustrated in FIGS. 3 and 8, the concavity 44 is symmetrical with respect to the centerline of the sheet stack surface 41. Further, because the concavity 44 has a width larger than a predetermined or given sheet width used in the image forming apparatus 300, for example, post card size, the user can pick up small sheets.

The cover pull 61 is further described below with reference to FIG. 8.

The sheet stack surface 41, which serves as a sheet discharge tray, includes a sloped portion for receiving sheets. The cover pull 61 is provided at the sloped portion and configured so that an upper surface thereof is below the sheet stack surface 41. With this configuration, when a trailing edge of the sheet discharged onto the sheet stack surface 41 slides down the sloped portion, the trailing edge of the sheet is blocked by the cover pull 61, stacking the sheets neatly.

Alternatively, the cover pull 61 may be located at a portion downstream of a portion where the trailing edge of the sheet lands on the discharge tray in the discharge direction shown by arrow Xa, or near the sheet exit 25a illustrated in FIG. 4 if the sheet falls freely, in order to attain the effect described above.

As described above, the cover pull 61 is provided at the sloped portion of the sheet stack surface 41 as illustrated in FIGS. 3 and 8. Further, the cover pull 61 is located upstream of a front edge of the scanner 100 in the discharge direction shown by arrow Xa, thus providing good visibility from the front side. After the sheet is removed from the sheet stack surface 41 through the front opening 42 located at the front side, the cover pull 61 is visible.

As illustrated in FIG. 9, the supporters 51 and 52 are not symmetrical. The supporter 51 located at the right side viewed from the front side, has a depth L1 illustrated in FIG. 9 that is shallower than that of the supporter 52 located at the left side because of the curved portion 43.

Figure 10:
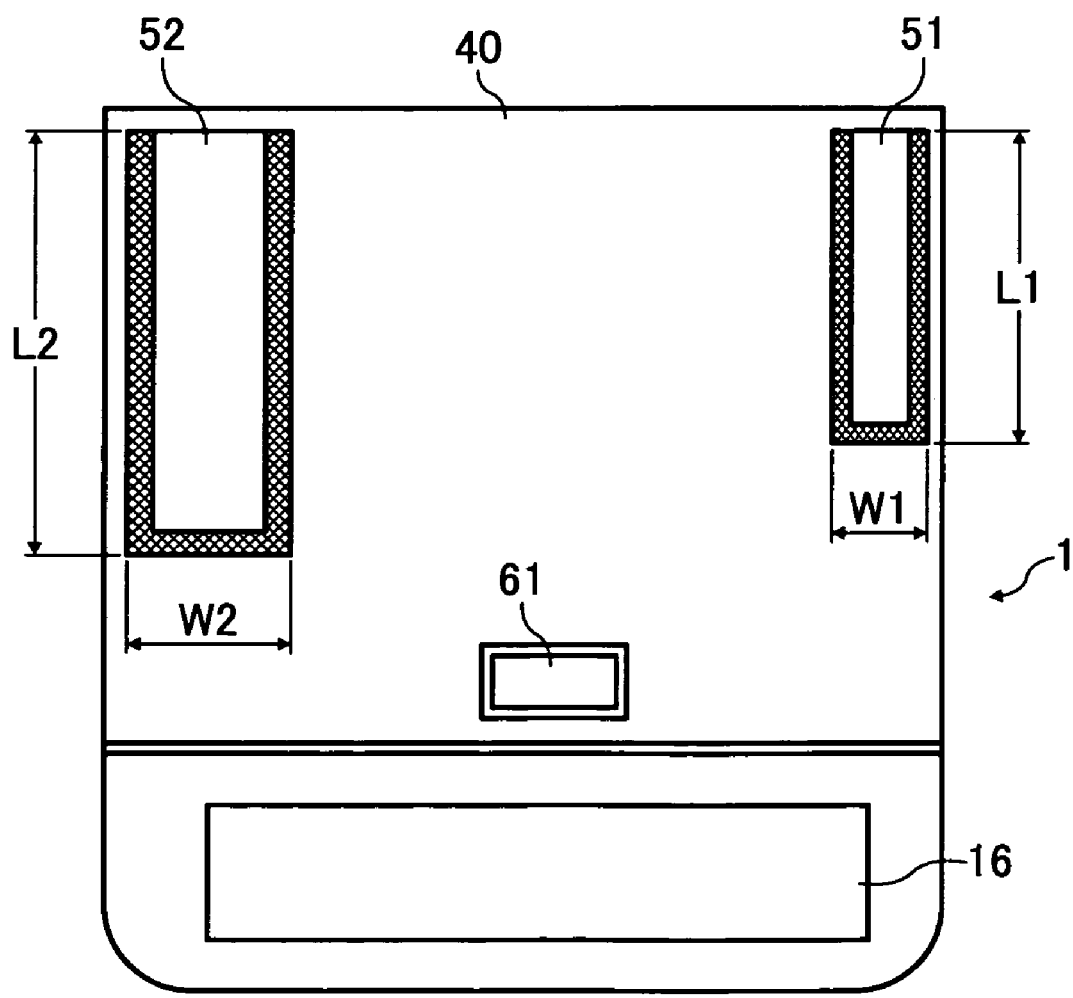
FIG. 10 is a schematic plan view of right and left supporters in the image forming apparatus illustrated in FIG. 3.

Referring to FIG. 10, a reference character L2 indicates the depth of the supporter 52. Because the depth L1 of the supporter 51 is shallower than the depth L2 of the supporter 52 as described above, the sheets are easily removed from the sheet stack part 40 through the curved portion 43. Further, because light comes into the sheet stack part 40 through the curved portion 43, the sheets on the sheet stack surface 41 can be seen more easily. Further, the supporter 52 has a width W2 that is larger than a width W1 of the supporter 51. It is to be noted that the supporters 51 and 52 have sufficient strength because the supporter 52 located the left side of the ADF 120, which is heavier than the right side thereof, has the depth L2 that is greater than the depth L1 of the supporter 51.

The supporters 51 and 52 and an inner configuration of the scanner 100 are further described with respect to removal of sheets, strength, and shock absorption.

Figure 11:
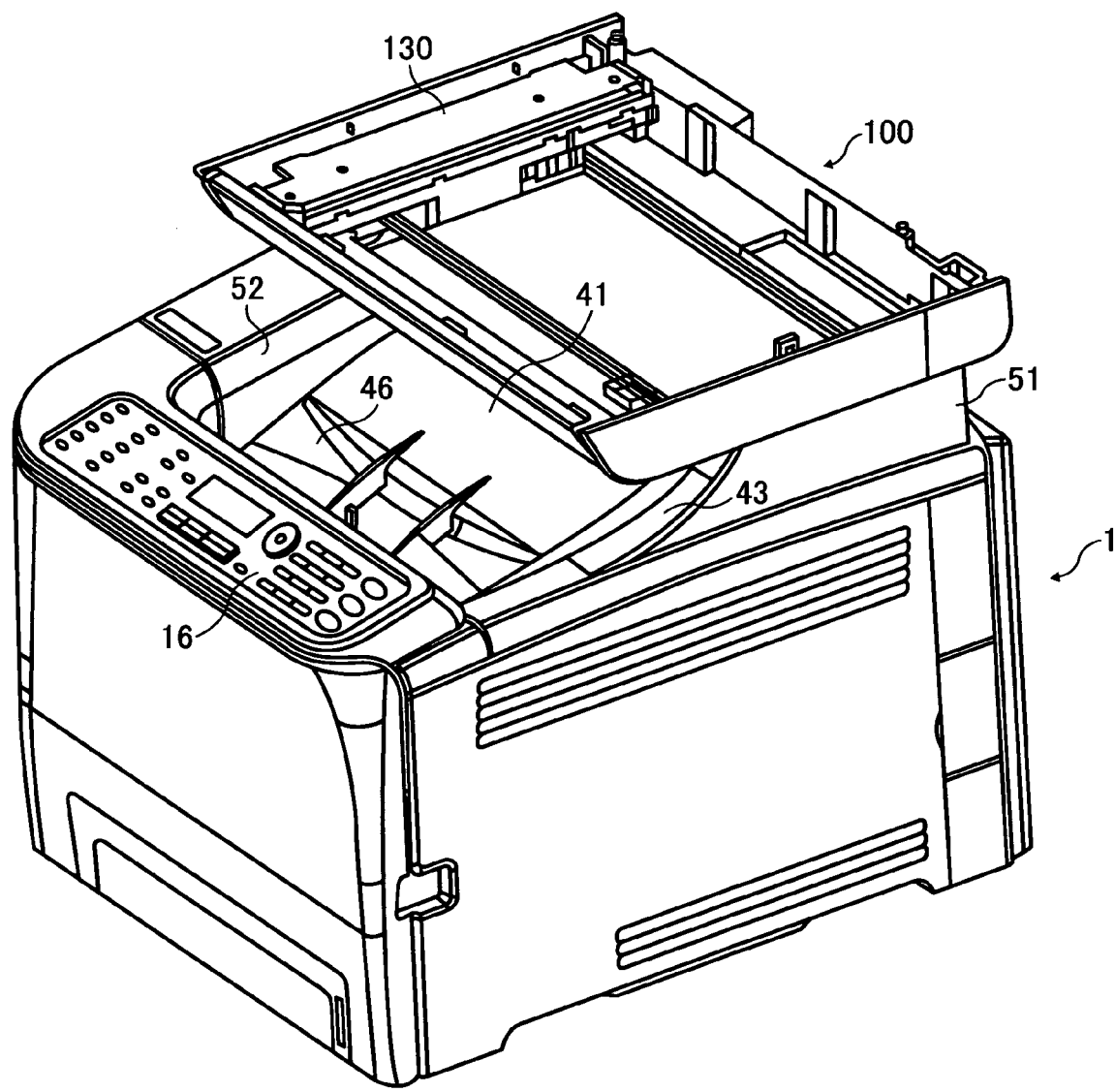
FIG. 11 is a perspective view illustrating an interior of the scanner included in the image forming apparatus illustrated in FIG. 3.

FIG. 11 is a perspective view of the image forming apparatus 300 in which an interior of the scanner 100 is illustrated. As illustrated in FIG. 11, the scanner 100 further includes an optical movable module 130, and a groove 46 is provided in the sheet stack part 40. The optical movable module 130 is located at the left as viewed from the front side and faces the supporter 52, and the scan unit including the exposure lamp 103, the first mirror 104, etc., and a carriage are mounted therein. As a result, a load center of the scanner 100 is biased to the left. The groove 46 helps the user to insert his/her hand under the sheets discharged on the sheet stack surface 41, thus facilitating removal of sheets. Further, in the present invention, projections (ribs) are provided at a portion corresponding to the groove 46 on the sheet stack surface 41 to prevent the sheets from falling in the groove 46, and thus operability can be enhanced.

The supporter 52 located at the left as viewed from the front side is larger than the supporter 51 located at the right as illustrated in FIG. 10, in view of operability in removal of sheets from the right side as well as the fact that the load center of the scanner 100 is biased leftward.

Further, the ADF 120 illustrated in FIG. 6 is located so that a sheet turnaround side thereof, where the turnaround path 143 illustrated in FIG. 6 is located, is at the left as viewed from the front side and a right side of the document table 121 and the platen cover 110, which is a discharge tray, is open. This configuration takes into account right-handed users to provide convenience to many users.

Figure 12:
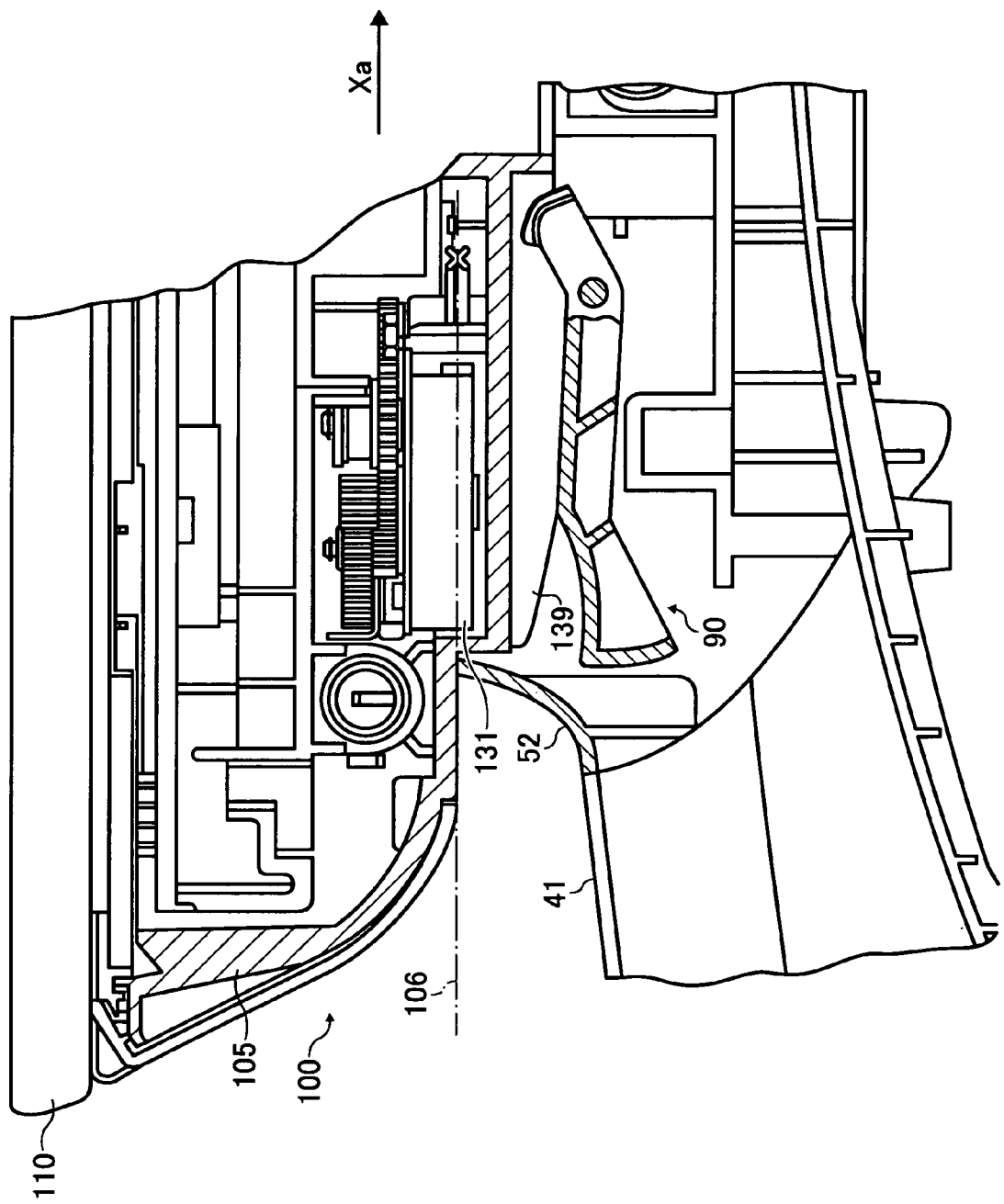
FIG. 12 is a cross-sectional view illustrating a left front portion of the scanner and a front portion of the left supporter when the scanner is at a foremost position.
Figure 13:
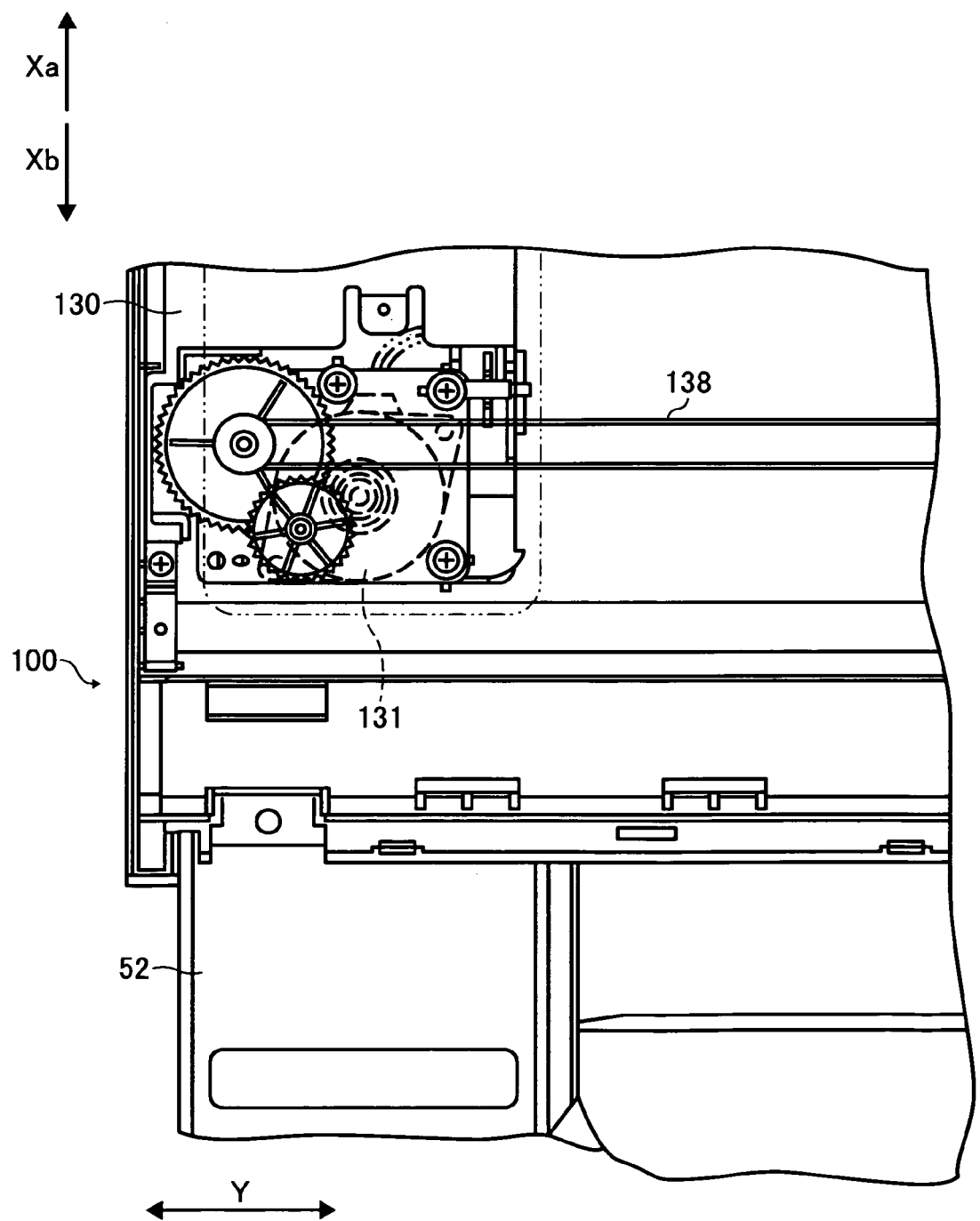
FIG. 13 is a plan view illustrating arrangement of a driving motor in the scanner when the scanner is at the foremost position.

FIG. 12 is a cross-sectional view illustrating a front left portion of the scanner 100 and a front portion of the supporter 52, and FIG. 13 illustrates the interior of the scanner 100 as viewed from above. As illustrated in FIGS. 12 and 13, the scanner 100 further includes a drive transmission system including a driving motor 131, gears, etc., located at the left as viewed from the front side. That is, the scanner 100 includes the scan unit, not shown, and the driving motor 131 to drive the scan unit. The driving motor 131 transmits a driving force through a timing belt 138 illustrated in FIG. 13, etc., to the scan unit. In FIG. 12, the front side of the scanner 100 is shown on the left and a reference numeral 105 indicates a lower case that is the housing of the scanner 100. The lower case 105 includes a portion projecting downward in which the driving motor 131 is located. A reference numeral 106 indicates an outline of a bottom portion of the lower case 105 excepting the portion projected downward. That is, the scanner 100 includes the portion projected downward in a front left portion.

As illustrated in FIG. 12, the supporter 52 further includes a shield 90 and an engagement part 139 beneath the driving motor 131 configured to engage the shield 90.

As described above, the scanner 100 accompanied with the ADF 120 is not symmetrical when viewed from the front side thereof. The supporter 52 located at the left is configured to bear a load larger than a load that the supporter 51 bears so that the scanner 100 balances.

Figure 14:
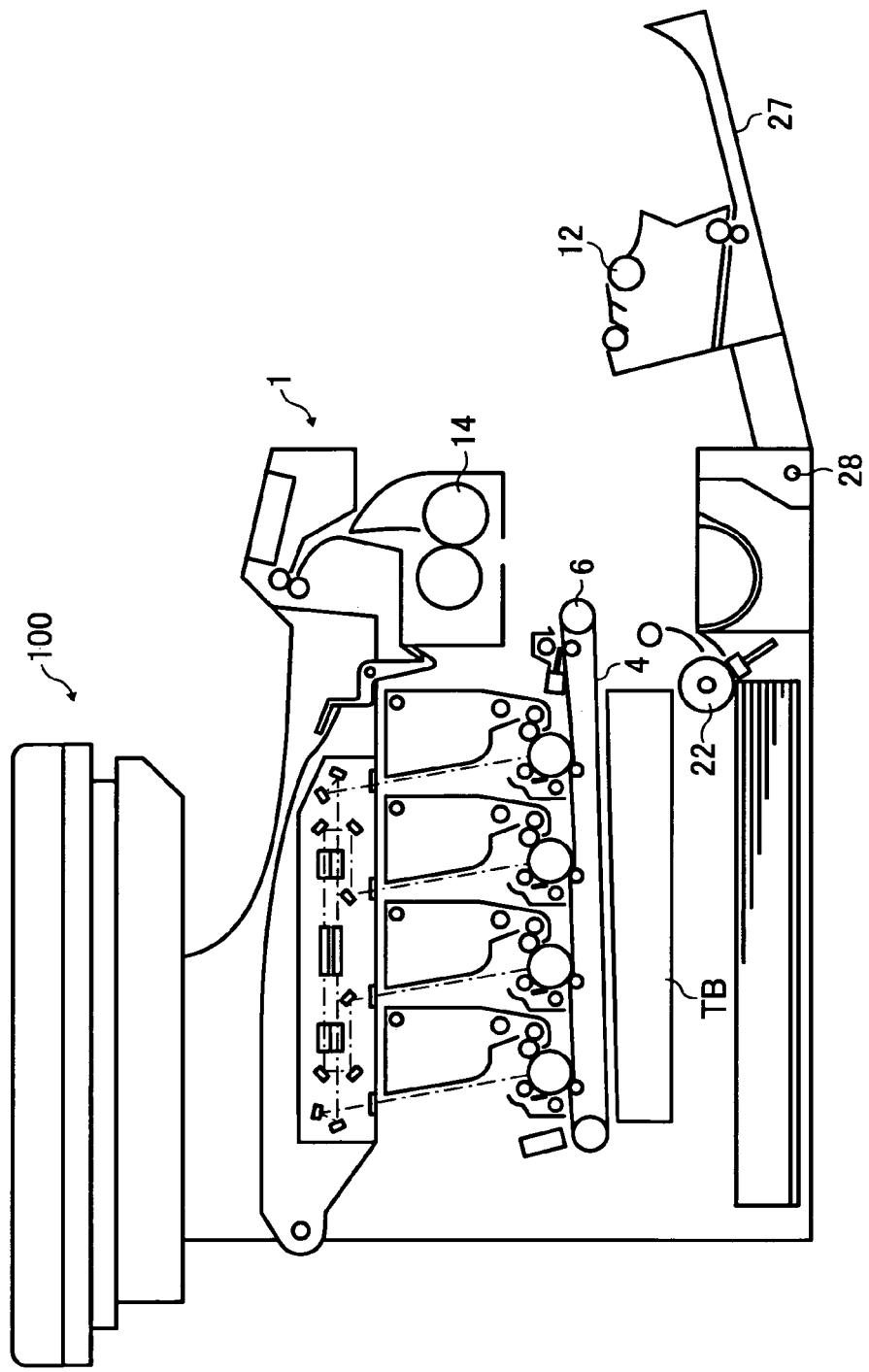
FIG. 14 schematically illustrates one example in which a front cover is openable and closable with respect to an apparatus body.

Referring to FIG. 14, the apparatus body 1 further includes a front cover 27 that is openable and closable with respect to the apparatus body 1 via a hinge 28. When the front cover 27 is opened, maintenance and replacement of the intermediate transfer belt 4, a toner bottle TB, and the fixer 14, and removal of sheets stuck within a sheet transport path can be performed.

Figure 15:
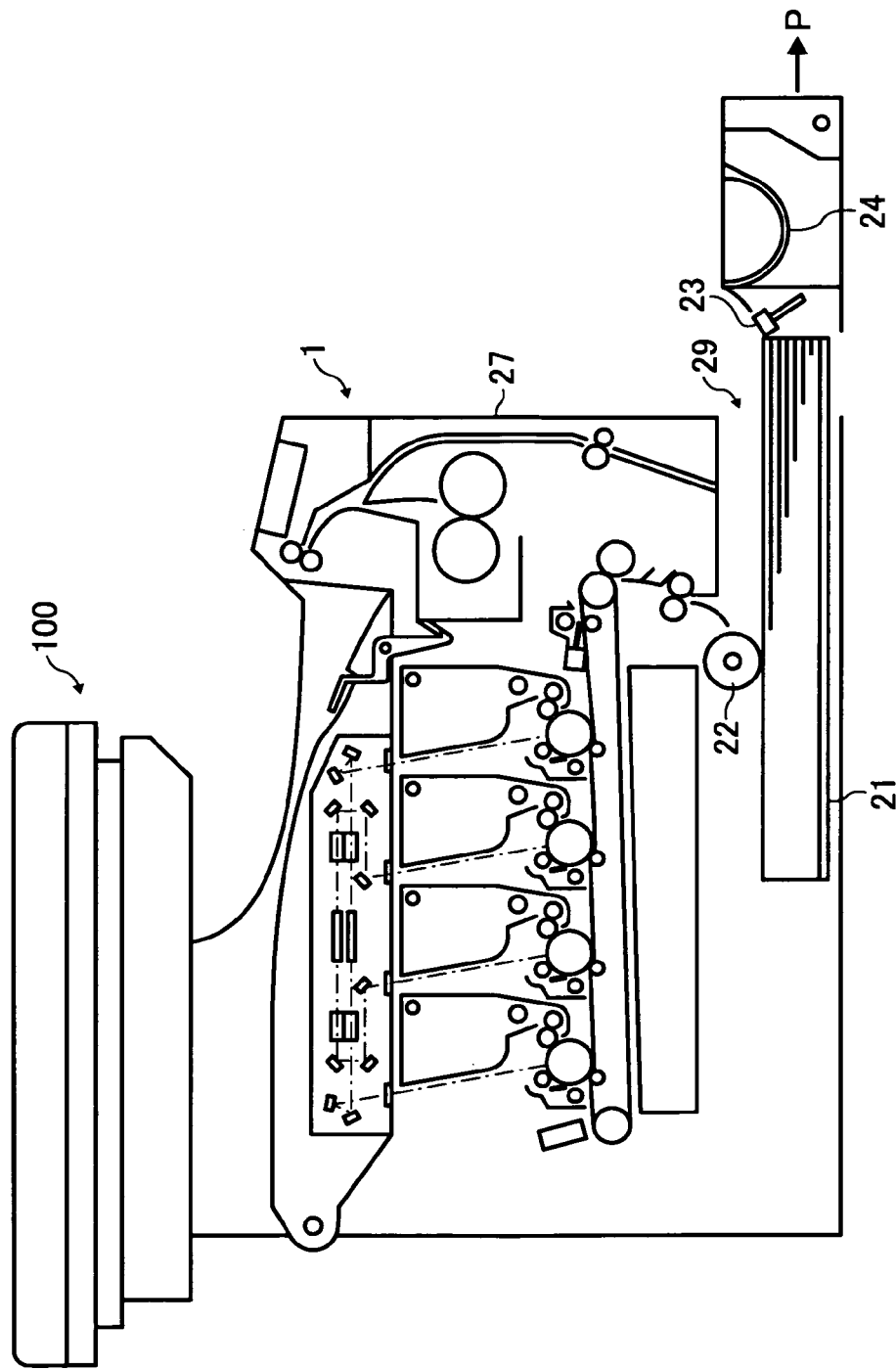
FIG. 15 schematically illustrates one example in which a front cover is detachably attached to an apparatus body.

Referring to FIG. 15, the front cover 27 is provided with an opening 29 to insert the sheet cassette 21 into the apparatus body 1 from the front side, that is, from right to left in FIG. 15. FIG. 15 illustrates a state in which the sheet cassette 21 is being pulled out of the apparatus body 1 in a direction shown by arrow P, together with the friction pad 23 and the return path 24. That is, maintenance and replacement work, and removal of sheets stuck in the apparatus body 1 can be performed from the front side, making a space required to do that work from the back side of the apparatus body 1 unnecessary. Therefore, an image forming apparatus with a small footprint and good operability can be attained at a lower cost.

A slide and lock mechanism of the scanner 100 with respect to the supporters 51 and 52 is described below.

Although the sheet discharge space between the scanner 100 and the apparatus body 1 opens wide on the front side as described above with reference to FIGS. 3 and 4, the front opening 42 illustrated in FIG. 4 decreases in size when the image forming apparatus 300 is decreased in height and depth. If the sheet discharge space is small, putting a hand in the sheet discharge space is difficult. Further, the sheets might hit the scanner 100 and a cover around the sheet exit 25a illustrated in FIG. 4 when the user removes the sheets. For example, although the scanner 100 projects backward from the back side of the apparatus body 1 in FIG. 4, the front opening 42 decreases in size if the back side of the scanner 100 is aligned with the back side of the apparatus body 1 to make the image forming apparatus 300 more compact. However, ease of sheet removal may be more important than compactness of an apparatus depending on installation site conditions. Further, the ease of sheet removal varies among users. Therefore, it is preferable that the size of the front opening 42 be adjustable and the position of the scanner 100 be selectable from plural positions to provide suitable range of usage for various user conditions.

Figure 16:
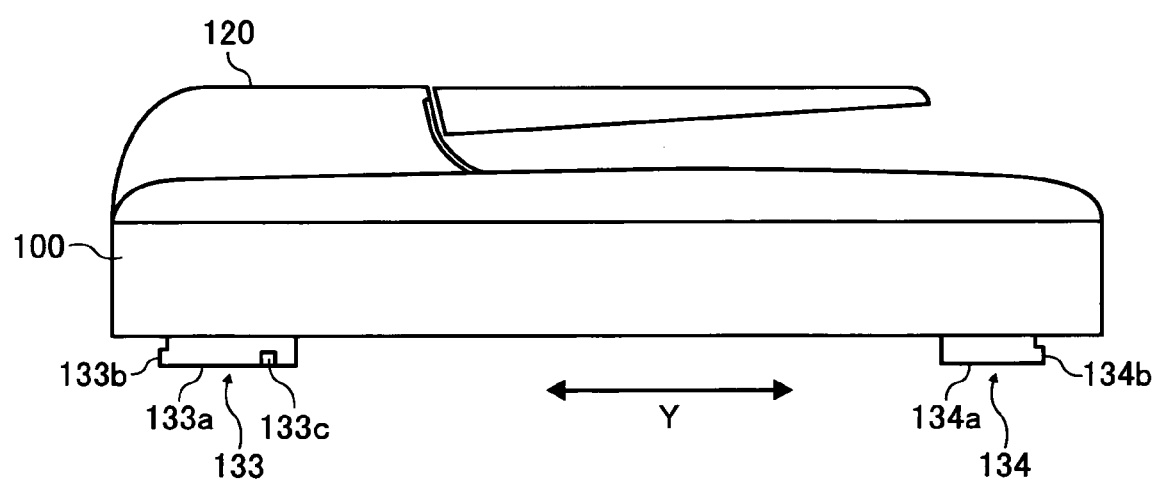
FIG. 16 is a front view of the scanner.
Figure 17:
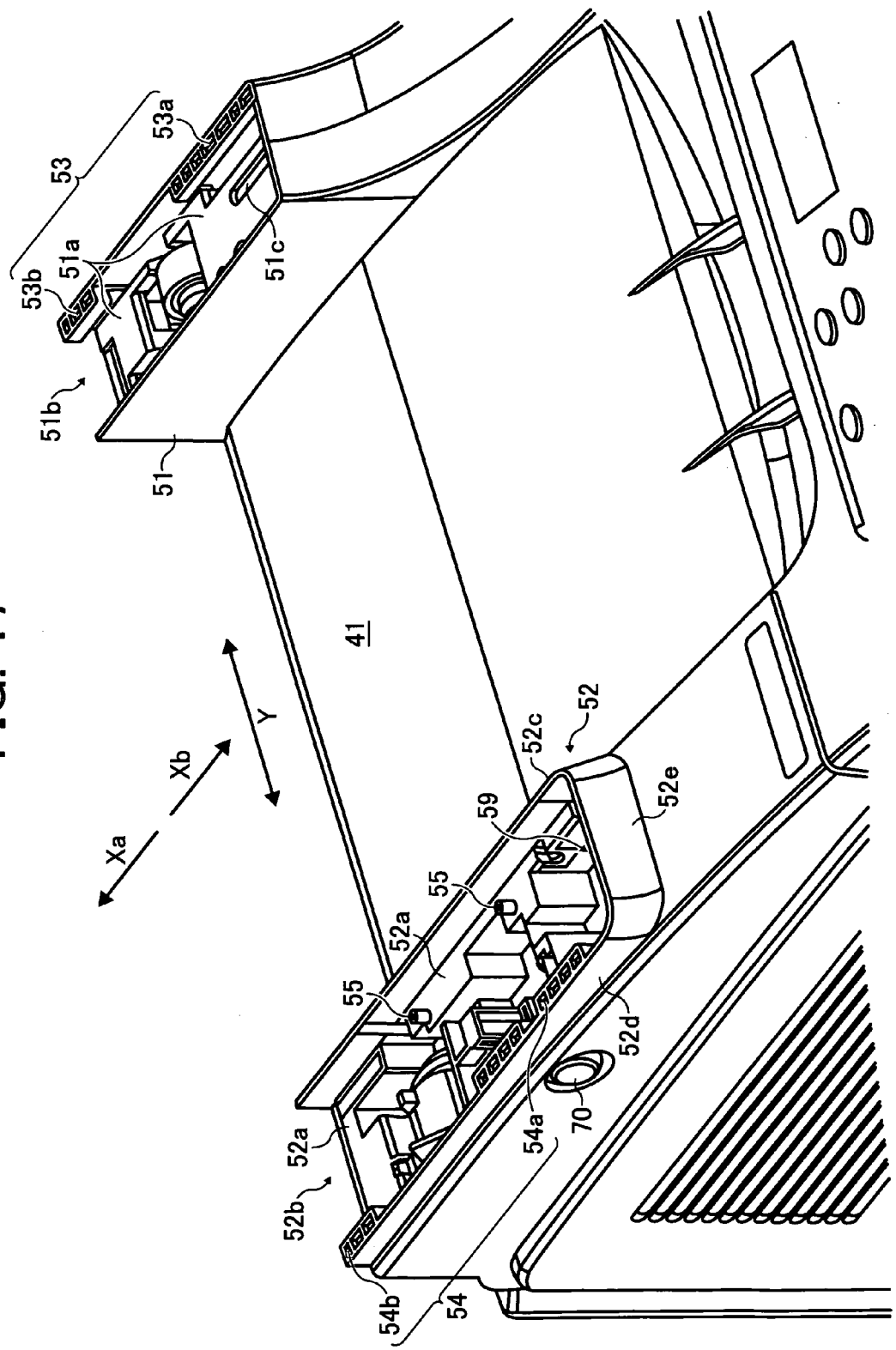
FIG. 17 is a perspective view illustrating configurations around disengagement stoppers in the right and left supporters.
Figure 18:
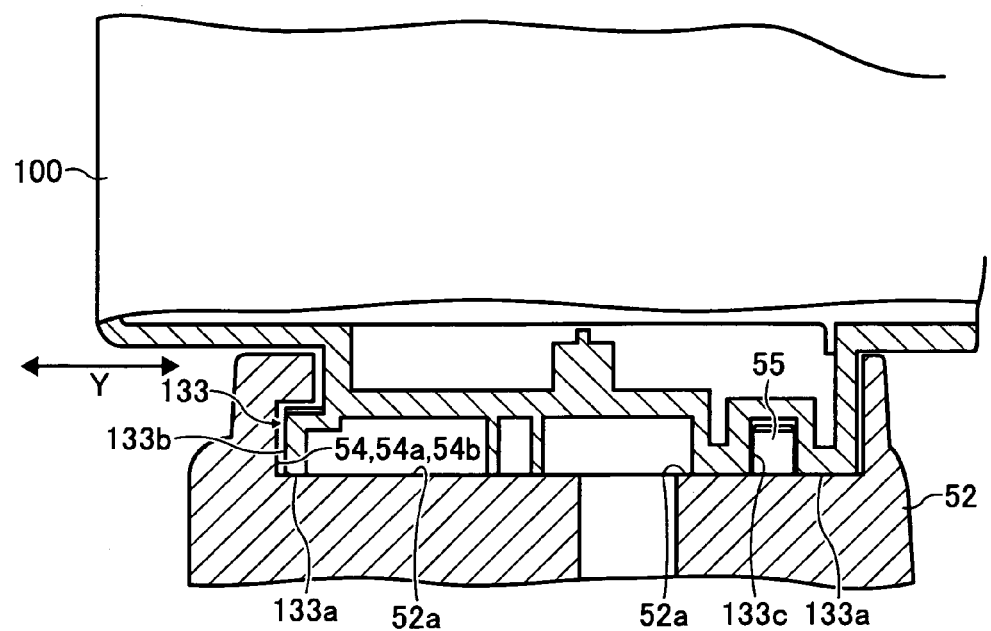
FIG. 18 is a cross-sectional view illustrating sliding engagement between a rail of the scanner and the left supporter.

Referring to FIGS. 16 through 18, the slide mechanism that slides the scanner 100 with respect to the supporters 51 and 52 in the sliding direction shown by arrows Xa and Xb illustrated in FIG. 3 is described below.

FIG. 16 illustrates the scanner 100 from the front side, and the arrow Y indicates the sheet width direction. As illustrated in FIG. 16, the scanner 100 integrally includes rails 133 and 134 on the left and right sides thereof as a leg part. The rails 133 and 134 are also referred to as the slide contact parts. The rails 133 and 134 integrally include lower surfaces 133a and 134a as slide surfaces and projections 133b and 134b on outer side thereof, respectively. Further, the rail 133 located at the left in FIG. 16 includes a groove 133c that extends in the sliding direction shown by arrows Xa and Xb illustrated in FIG. 3.

FIG. 17 illustrates interiors of the supporters 51 and 52, and FIG. 18 illustrates a state in which the rail 133 of the scanner 100 engages the supporter 52. As illustrated in FIG. 17, the supporters 51 and 52 integrally include upper surfaces 51a and 52b that slidably contact the lower surfaces 133a and 134a of the rails 133 and 134 illustrated in FIG. 16, respectively, and thus the scanner 100 is slidably supported by the supporters 51 and 52. The supporter 52 further includes a pair of pins 55 projecting upward that engage the groove 133c on the rail 133 with a given space, respectively as illustrated in FIG. 18, thus limiting horizontal jolting of the scanner 100. The supporter 52 further includes a scanner lock mechanism to lock the scanner 100 in the sliding direction, and an operation button 70 to operate the scanner lock mechanism is provided on the left side of the supporter 52.

The supporters 51 and 52 further integrally include disengagement stoppers 53 and 54 that are shaped like rectangles without one side and located at the outer sidewall thereof, respectively. The disengagement stoppers 53 and 54 include front stoppers 53a and 54a, and rear stoppers 53b and 54b, respectively. The disengagement stoppers 53 and 54 that engage the projections 133b and 134b of the rails 133 and 134 with a given space, respectively, limit disengagement and upward jolting of the scanner 100.

Referring to FIG. 17, the supporters 51 and 52 further includes entries 51b and 52b on the back side thereof, respectively. The supporter 51 located at the right in FIG. 17 further includes a slot 51c having a length equals or substantially equals a maximum sliding stroke of the scanner 100. The supporter 52 further includes a pair of right and left sidewalls 52c and 52d extending in the sliding direction shown by arrows Xa and Xb, and a front wall 52e extending in the sheet width direction shown by arrow Y, formed at a front end thereof. Enclosed by the sidewalls 52c and 52d, and the front wall 52e, an opening 59 is formed. The shield 90 illustrated in FIG. 12 covers the opening 59.

It is to be noted that, alternatively, disengagement stoppers may be formed on the inner sidewalls of the supporters 51 and 52, a left sidewall of the supporter 51 and the right sidewall 52c, and projections may be formed on the inner sides of the rails 133 and 134. By engaging the disengagement stoppers with the projections with a given space, the disengagement and upward jolting of the scanner 100 can be limited similarly.

As described above, according to the present invention, the housing (lower case 105) of the scanner 100 integrally includes the rails 133 and 134, and the lower surface 133a and 134a of the rails 133 and 134 can slide on the upper surfaces 51a and 52a of the supporters 51 and 52, respectively, thus attaining a slide mechanism at a lower cost without additional components. Further, the rails 133 and 134 have cross sections that can provide sufficient strength to the rails 133 and 134, and the scanner 100.

Moreover, because the disengagement stoppers 53 and 54 are integrated into the supporters 51 and 52, respectively, the scanner 100 can be prevented from disengaging upward at a lower cost without additional components. Further, because the load of the scanner 100 is received on both right and left sides by the disengagement stopper 53 and 54 provided in the supporters 51 and 52, the supporters 51 and 52 have sufficient strength. Even when a force is applied on either the right or left side, the disengagement stoppers 53 and 54 can prevent the disengagement of the scanner 100.

If the slide mechanism does not need the advantages and effects to the extent described above, alternatively, disengagement stoppers similar to the disengagement stoppers 53 and 54 may be provided on the scanner 100 and slide surfaces similar to the lower surfaces 133a and 134a of the rail 133 and 134 may be integrally provided on the supporters 51 and 52.

However, if disengagement stoppers are provided on both outer and inner sides of the supporters 51 and 52, respectively, a sufficient space might not be left for other components. Because the supporters 51 and 52 need to include a mechanism to buffer the action of opening and closing the upper cover 18 illustrated in FIG. 5, etc., it is preferable that the disengagement stoppers require a smaller space.

Therefore, according to the present embodiment, the disengagement stoppers 53 and 54 are divided into the front stoppers 53a and 54a and the rear stoppers 53b and 54b. With this configuration, the front stopper 53a and 54a receive a force applied to a front portion of the scanner 100, and the rear stoppers 53b and 54b receive a force applied to a rear portion of the scanner 100, thus reliably preventing disengagement of the scanner 100. Further, other components can be installed in a space between the divided disengagement stoppers.

Although each disengagement stopper is divided into the front stopper and the rear stopper for convenience of space and/or mold configuration, such as a slide core for injection molding, in the present invention, alternatively, a disengagement stopper extending an entire length of the sidewall may be provided in each of the supporters 51 and 52.

Further, in the present invention, the disengagement stoppers 53 and 54 are shaped like a box and further provided with ribs to enhance strength, and thus damage to and deformation of the disengagement stoppers 53 and 54 can be prevented even when users apply an upward force to the scanner 100.

Figure 19:
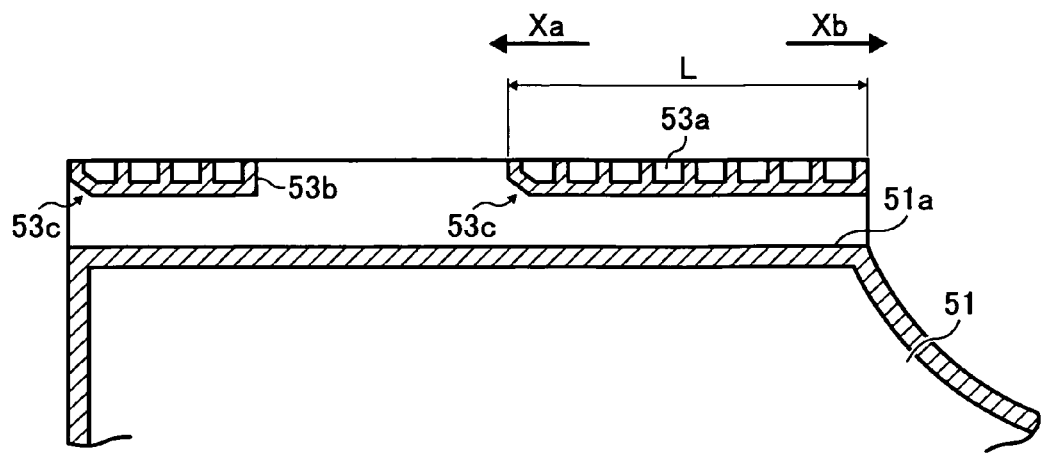
FIG. 19 is a cross-sectional view illustrating the disengagement stoppers in the right supporter.

Moreover, as illustrated in FIG. 19, tapered portions 53c are provided on edge portions of the divided front stopper 53a and the rear stoppers 53b in the sliding direction shown by arrow Xa, respectively. It is to be noted that tapered portions 53c are also provided on edge portions of the front stopper 54a and the rear stoppers 54b in the supporter 52 in the sliding direction shown by arrow Xa, although not illustrated in FIG. 19. This configuration prevents the disengagement stoppers 53 and 54 from getting stuck at edge portions of the rails 133 and 134, respectively, when the scanner 100 slides in the sliding direction shown by arrow Xb.

In FIG. 19, a reference character L indicates a length of the front stopper 53a. It is to be noted that the length of L of the front stopper 54a is similar to that of the front stopper 53a, although not illustrated in FIG. 19. The length L is set so that the rails 133 and 134 of the scanner 100 engage the front stoppers 53a and 54a and rear stoppers 53b and 54b, respectively, when the scanner 100 slides within a slidable range of the scanner 100 in the sliding direction shown by arrow Xa. Therefore, when the scanner 100 is at any given position within the slidable range, the rails 133 and 134 engage the front stoppers 53a and 54a and rear stoppers 53b and 54b, respectively, and thus the upward disengagement of the scanner 100 can be reliably prevented.

Installation of the scanner 100 on the supporters 51 and 52 is described below, referring to FIGS. 16, 17, 20A, and 20B.

Figure 20A:
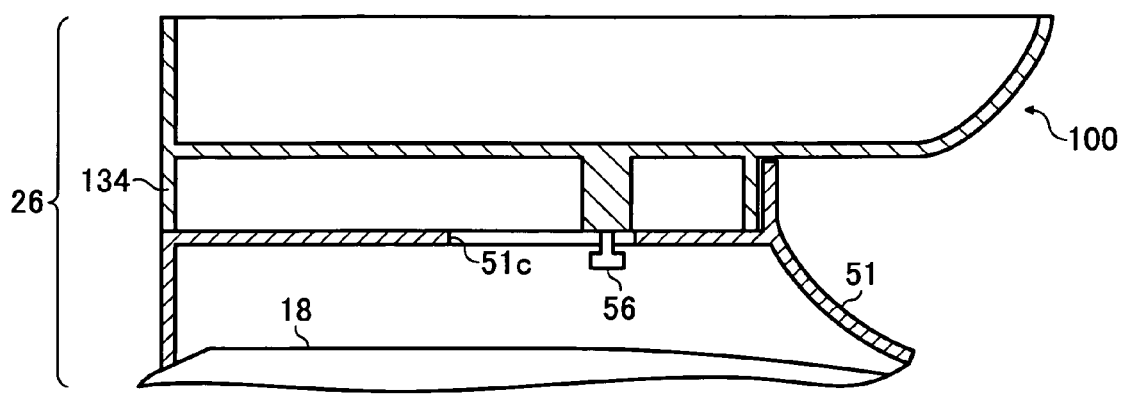
FIG. 20A is a cross-sectional view illustrating a disengagement stopper in a mount and removal direction, in which the scanner is at an initial position on the supporters.
Figure 20B:
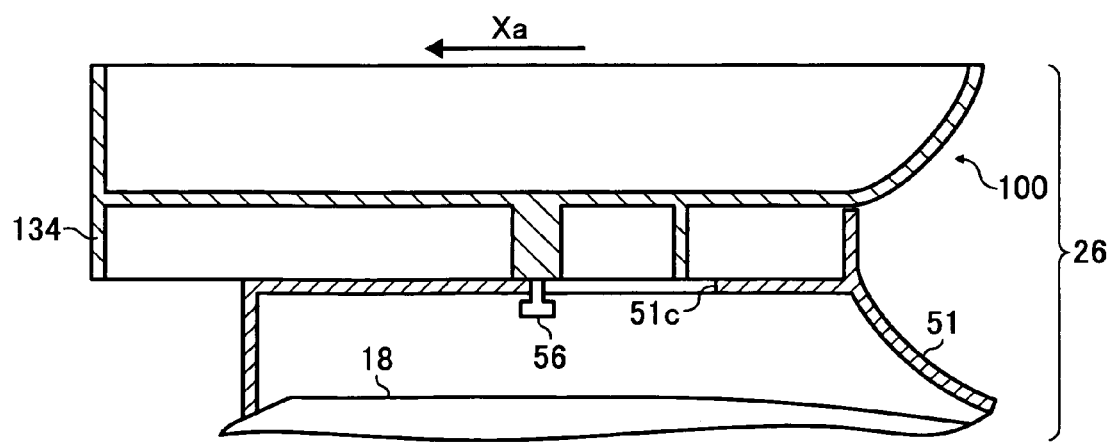
FIG. 20B is a cross-sectional view illustrating the disengagement stopper in the mount and removal direction, in which the scanner is at a rearmost position on the supporters.

The rails 133 and 134 of the scanner 100 illustrated in FIG. 16 are inserted into the entries 51b and 52b illustrated in FIG. 17, located on the back sides of the supporters 51 and 52, respectively, and are slid forward in the sliding direction shown by arrow Xb. After the scanner 100 is thus inserted into the supporters 51 and 52, the upper over 18 is opened with respect to the apparatus body 1 as illustrated in FIG. 5, and a step screw 56 is inserted into the slot 51c from an under side of the supporter 51 and further engaged with the rail 134 as illustrated in FIGS. 20A and 20B. As described above, the slot 51c on the supporter 51 illustrated in FIG. 17 has a length equal or substantially equal to the maximum sliding stroke of the scanner 100. The step screw 56 prevents the scanner 100 from falling backward when the scanner 100 slides in the sliding direction shown by arrow Xa. FIG. 20A illustrates an initial state of the scanner 100, and FIG. 20B illustrates a state in which the scanner 100 is at a rearmost position after sliding for the maximum sliding stroke on the supporters 51 and 52 in the sliding direction shown by arrow Xa.

It is to be noted that ribs, not shown, are provided on a back surface of the upper cover 18.

When the scanner 100 is detached from the supporters 51 and 52, the steps described above are performed in reverse. That is, firstly, the step screw pin 56 is removed from the slot 51c.

It is to be noted that, although the step screw 56 is used in the present invention, alternatively, a rivet, a step pin, etc., may be used.

As described above, the disengagement stoppers 53 and 54 prevent the scanner 100 from disengaging from the supporters 51 and 52, and the scanner 100 is mountably removable from the back side of the apparatus body 1 in the discharge direction and the direction opposite thereto (sliding direction) shown by arrows Xa and Xb, which is hereinafter also referred to as the mount and removal direction. Further, the step screw, 56 prevents the scanner 100 from falling backward in the mount and removal direction. That is, the step screw 56 serves as a disengagement stopper in the mount and removal direction.

Therefore, according to the present embodiment, even when users apply a force upward and/or in the sliding direction, the scanner 100 does not disengage from the supporters 51 and 52, thus an image forming apparatus with sufficient strength can be attained. Further, the scanner 100 is easily mountable and removable from the apparatus body 1.

It is to be noted that two lock mechanisms for safety purposes are provided in a back side portion of the supporter 52 located at the left. One is a lock mechanism to prevent the upper structure 26 from opening with respect to the apparatus body 1 illustrated in FIG. 5 when the platen cover 110 is opened with respect to the housing of the scanner 100. That is, this lock mechanism prevents the cover lock 60 from being unlocked when the platen cover 110 is opened. The other lock mechanism prevents the platen cover 110 including the ADF 120 from opening with respect to the main body of the scanner 100 when the upper structure 26 is opened with respect to the apparatus body 1.

In the supporter 51 located at the right, a cable is loosely provided to transmit image signals generated by the scanner 100 to an electrical board included in the apparatus body 1, not shown, in such a way that the cable moves with the scanner 100.

Further, in the back side portion of the supporter 52, a cable is loosely provided at a side of the two lock mechanisms described above to transmit signals to control driving of the ADF 120. The cables to transmit image signals and driving control signals are thus separately included in the supporters 51 and 52 to prevent noise from affecting the image signals. Further, the scanner 100 is mounted on and removed from the supporters 51 and 52 from the back side of the apparatus body 1 as described above, thus eliminating the risk of pinching the cables when the canner 100 is mounted thereto and removed therefrom.

When the scanner 100 is slidable as described above, lock mechanisms to lock the scanner 100 at multiple positions with respect to the supporters 51 and 52 should be provided.

As described above with reference to FIG. 17, two supporters 51 and 52 slidably support the scanner 100, and the supporter 52 includes the scanner lock mechanism provided with the operation button 70 located on the outer side of the supporter 52. This scanner lock mechanism is further described below with reference to FIGS. 21 and 22.

Figure 21:
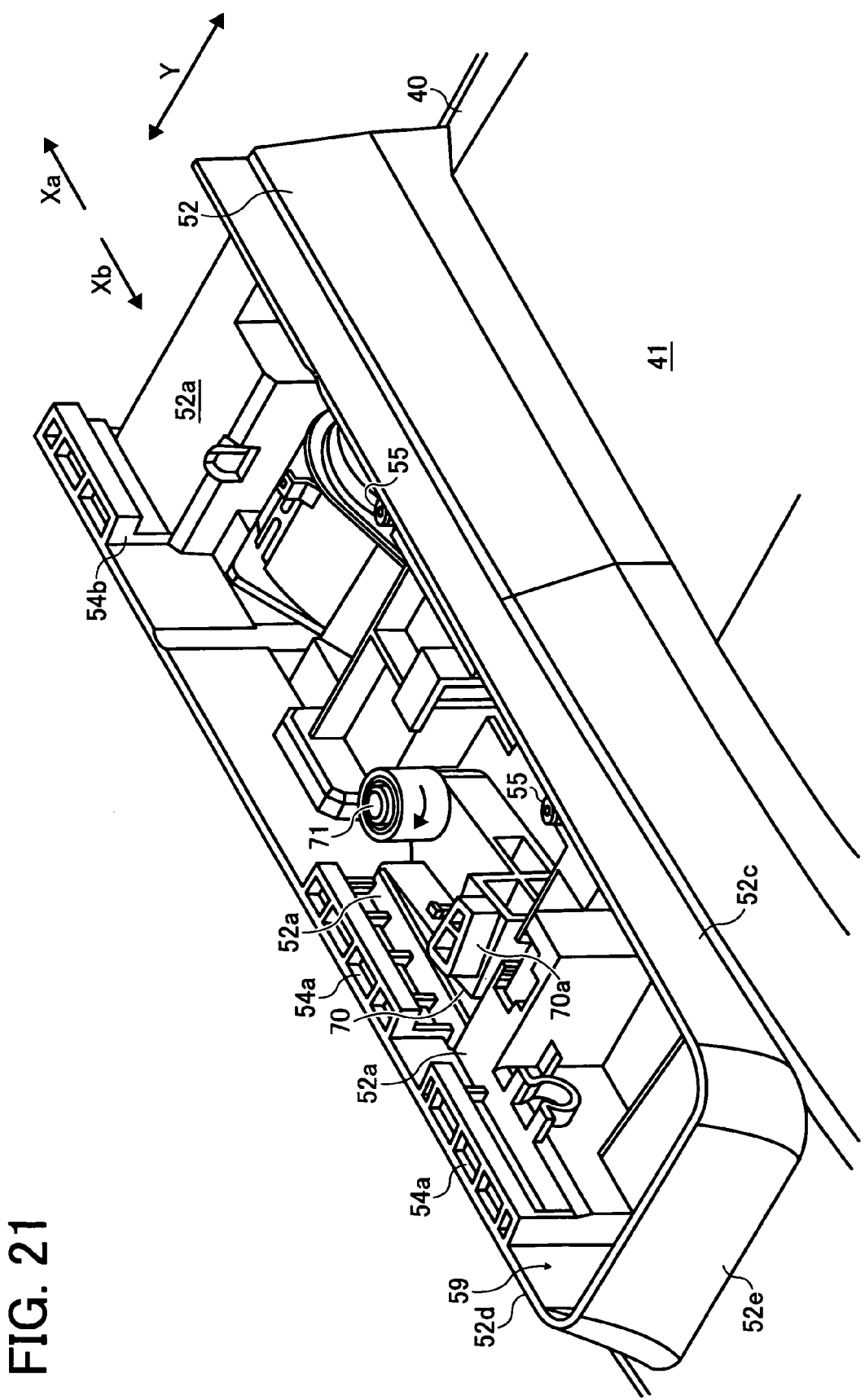
FIG. 21 is a perspective view illustrating a scanner lock mechanism in the left supporter.

FIG. 21 illustrates an interior of the supporter 52 on which the operation button 70 is provided. As illustrated in FIG. 21, the operation button 70 includes a hook 70a integrally provided thereto and an axis part 71.

Figure 22:
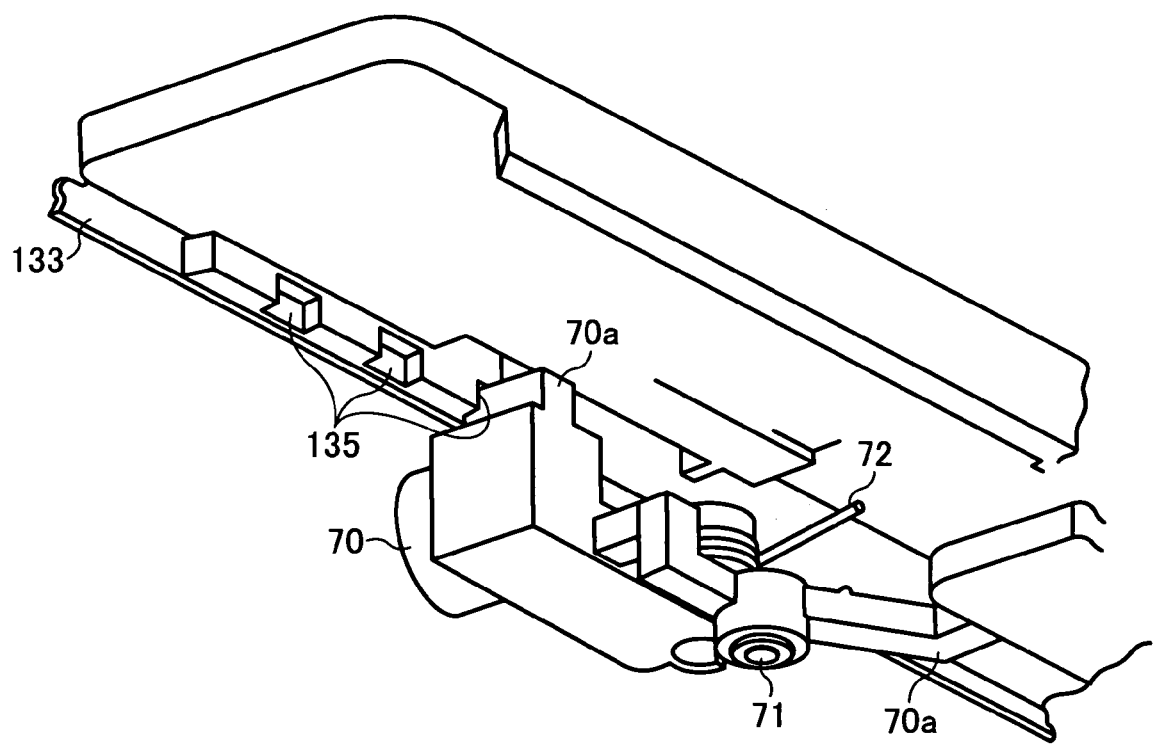
FIG. 22 is a perspective view illustrating essential parts of the scanner lock mechanism.

As illustrated in FIG. 22, a plurality of cutouts 135 are provided on the rail 133 of the scanner 100, and a torsion coil spring 72 is attached to the axis portion 71 and biases the operation button 70 constantly outside of the supporter 52. The hook 70a engages one of the cutouts 135 when the torsion coil spring 72 biases the operation button 70 outside of the supporter 52, thus locking the scanner 100 in the sliding direction. When the user presses the operation button 70 appearing on the outside of the supporter 52 to counter the bias force of the torsion coil spring 72, the hook 70a is disengaged from the cutout 135 and the scanner 100 becomes slidable. In the present embodiment, three cutouts 135 are provided on the rail 133, that is, the scanner 100 can be locked at three different positions by the cutouts 135.

As described above, horizontal jolting of the scanner 100 is limited by the pins 55 engaging the groove 133c as illustrated in FIG. 18. However, the distance between the pins 55 is limited because various functional components are included in the supporter 52. Further, to reduce cost, the pins 55 are formed on a plastic member to which the sheet stack part 40 and the supporters 51 and 52 are integrally provided. Similarly, the groove 133c is formed on a plastic member to which the housing of the scanner 100 is integrally provided. Therefore, the pins 55 and the groove 133c are limited in engagement accuracy and more liable to deform than metal. Therefore, even when the scanner 100 is locked in the sliding direction, the scanner 100 jolts horizontally with respect to the supporters 51 and 52 and is laterally unbalanced.

It is to be noted that examples of material for the plastic member include a mixture of polycarbonate (PC) and polystyrene (PS), and the plastic member is processed with a fire retardant, etc., according to the laws and regulations of the region and/or country where the scanner 100 is used.

In the present embodiment, another scanner lock mechanism is provided in the supporter 51 to reduce the horizontal jolting of the scanner 100. By providing these two lock mechanisms in the right and left supporters 51 and 52 separately, a sufficient distance can be maintained therebetween with respect to the apparatus body 1, and thus the jolting of the scanner 100 can be minimized.

Figure 23:
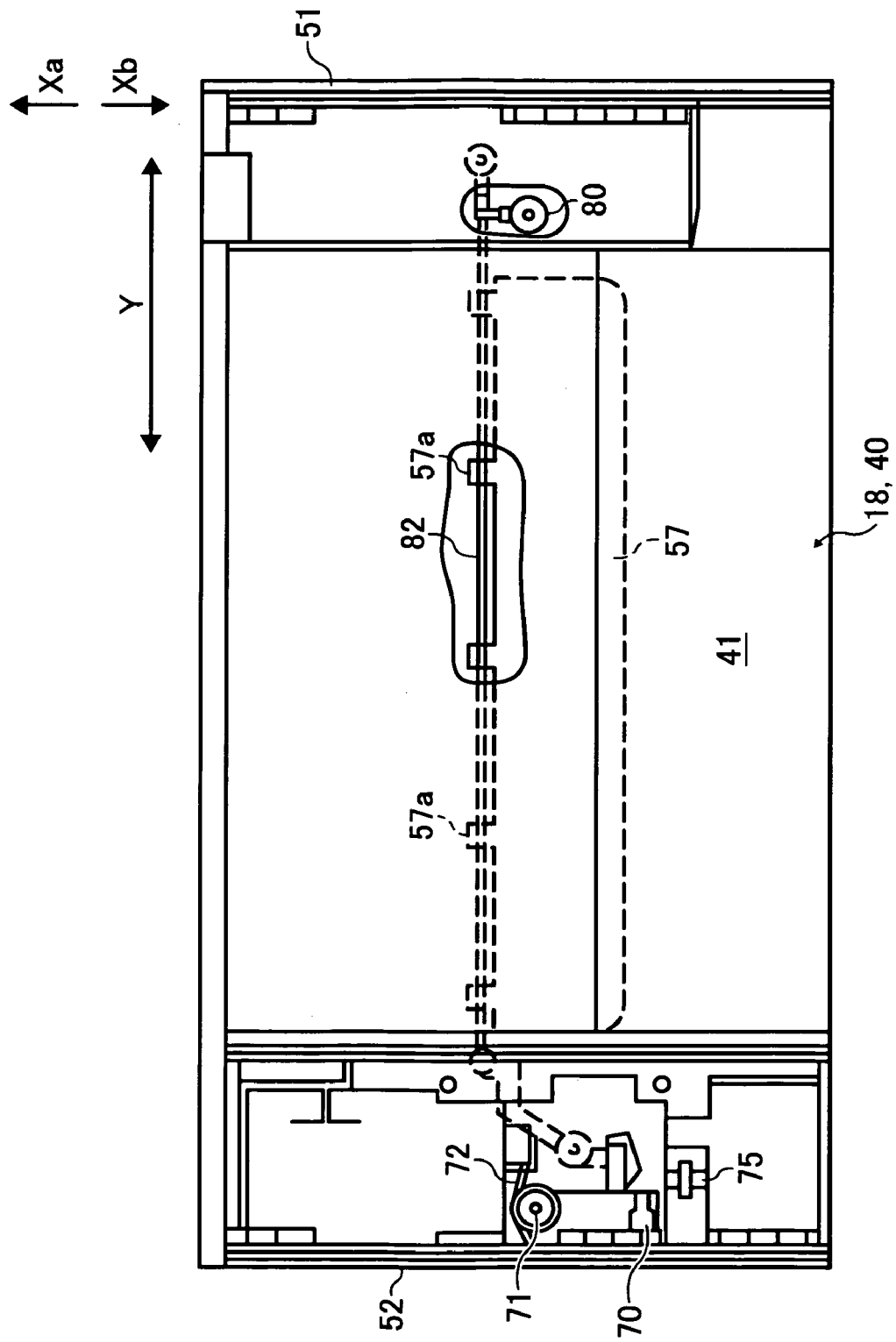
FIG. 23 is a plan view illustrating a connection between two scanner lock mechanisms in the left and right supporters.

As illustrated in FIG. 23, a lock member 80 is provided in the supporter 51 and connected to the operation button 70 by a flexible wire 82. A wire holder 57 including a guide 57a is provided on the back surface of the upper cover 18 that is integrated with the supporters 51 and 52. A vertically rotatable pendulum 75 is attached to the supporter 52 at a position close to the operation button 70.

As illustrated in FIG. 24, the lock member 80 is cylindrical and includes a conically shaped head. The lock member 80 is biased upward constantly by a compression spring 81 so as to engage one of grooves 136 provided in the rail 134 of the scanner 100. The compression spring 81 includes an upper end engaging a spring engagement part provided on a lower portion of the lock member 80 and a lower end engaging a spring engagement part 51d provided on the supporter 51. Each of the rails 133 and 134 further includes a tapered portion 133d provided at an edge thereof, although FIG. 24 illustrates only the rail 134. These tapered portions 133d on the rails 133 and 144 and the tapered portions 53c on the disengagement stoppers 53 and 54 illustrated in FIG. 19 prevent the disengagement stoppers 53 and 54 from getting stuck at the edges of the rails 133 and 134, respectively, when the scanner 100 slides in the sliding direction.

The wire 82, which connects the operation button 70 and the lock member 80, is bent at a right edge thereof (the side of supporter 51), at about 90 degrees from a back surface of the paper on which FIG. 23 is drawn to a front surface of that paper. That is, the wire 82 is bent upward in FIG. 24 from a direction perpendicular to the surface of the paper on which FIG. 24 is drawn and engages a hook engagement part on the lock member 80. Therefore, the user can operate the two lock mechanisms in conjunction with each other by pressing the operation button 70. Further, the wire 82 is guided by the guide 57a, a groove, not shown, provided on the ribs on the back surface of the upper cover 18 and the supporters 51 and 52, etc., so as not to become loose. The lock mechanisms in the right and left supporters 51 and 52 can be connected to each other readily with fewer components by using the wire 80, even if a path therebetween is complicated.

When the two lock mechanisms are located in the supporters 51 and 52 that are the projections on the right and left sides facing each other via the sheet stack part 40 as in the present embodiment, a wire is effective because an action is transmitted through a U-shaped path.

Referring to FIG. 22 through FIGS. 25A-25C, operations of the two lock mechanisms are described below. FIGS. 25A through 25C illustrate changes in the engagement state between the lock member 80 and the groove 136.

When the operation button 70 is not pressed, the lock member 80 engages the groove 136 as illustrated in FIG. 25A. By contrast, when the user presses the operation button 70 to counter the bias forces of the torsion coil spring 72 and the compression spring 81, the wire 82 pulls the cylindrical lock member 80 downward, and thus the lock member 80 is disengaged from the groove 136. In this state, the conically shaped head of the lock member 80 remains inside the groove 136 as illustrated in FIG. 25B. When the user slides the scanner 100 in this state, contact with the groove 136 further presses the lock member 80 downward, and the lock member 80 disengages from the groove 136 as illustrated in FIG. 25C and clicks. The lock member 80 also clicks when engaging one of the grooves 136, and thus the user can recognize locking positions.

A method to prevent the scanner 100 from falling is described below, referring to FIGS. 5 and 23.

Figure 5:
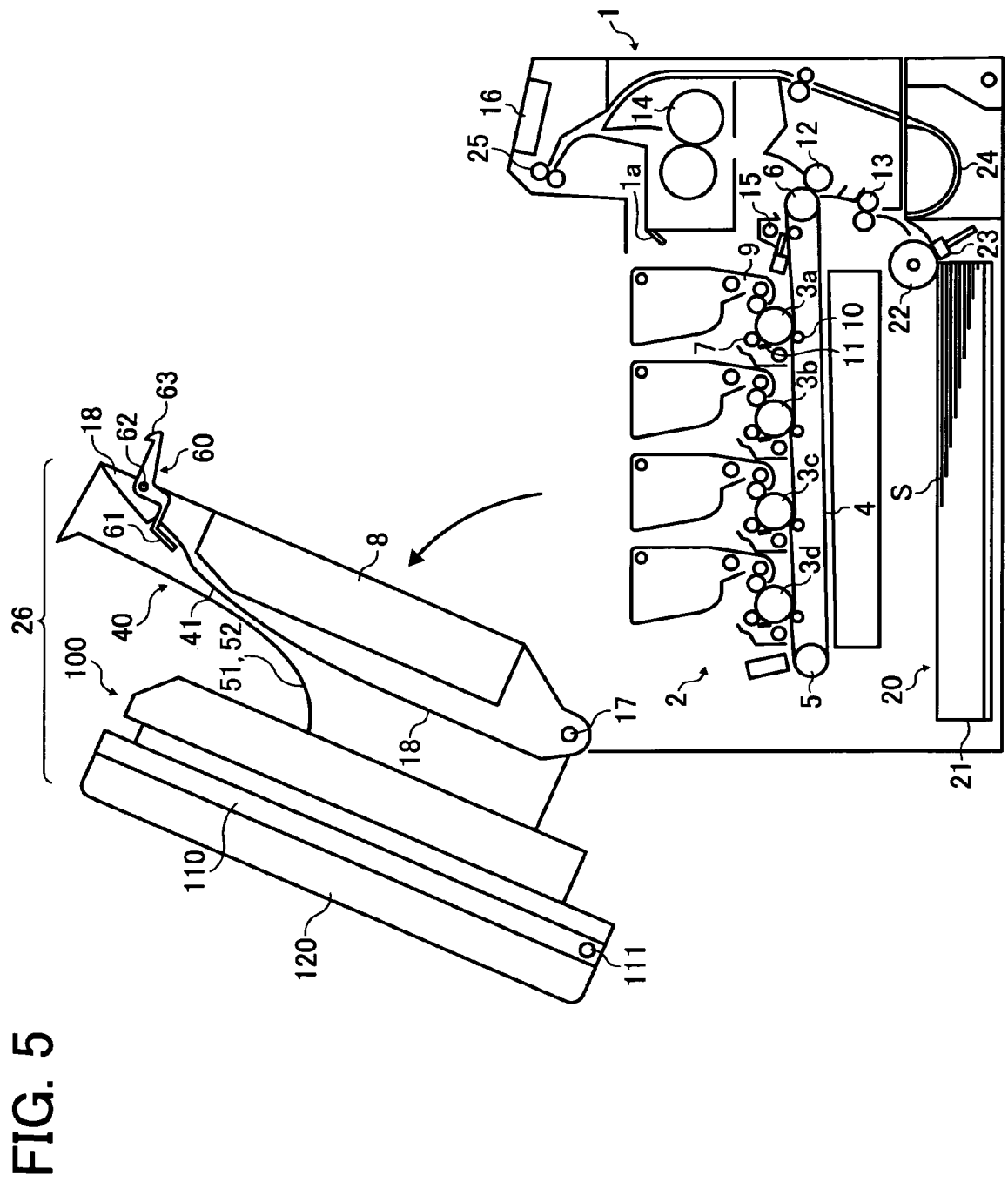
FIG. 5 schematically illustrates a state of the image forming apparatus illustrated in FIG. 3 when an upper structure including an upper cover is opened with respect to an apparatus body.

As illustrated in FIG. 5, the upper structure 26 including the scanner 100, the sheet stack part 40, and the upper cover 18 is rotatable around the rotary shaft 17 and openable at the front side with respect to the apparatus body 1 to facilitate replacement of consumables such as toner cartridge and periodic replacement of components such as the transfer belt. When the process cartridges are aligned horizontally as illustrated in FIG. 5 in the tandem color image forming apparatus according to the illustrative embodiment, the upper structure 26 should be rotated upward by about 90 degrees to install and remove the process cartridges from above. In this state, if the user presses the operation button 70 illustrated in FIG. 17 accidentally and unlocks the scanner lock mechanism, the scanner 100 might fall by its own weight. Therefore, the pendulum 75 illustrated in FIG. 23 prevents the operation button 70 from being accidentally pressed, as do as the disengagement stoppers 53 and 54 illustrated in FIG. 17 and the step screw 56 illustrated in FIGS. 20A and 20B that prevent such an accident.

As illustrated in FIG. 23, the vertically rotatable pendulum 75 is attached at a position close to the operation button 70. When the upper structure 26 including the upper cover 18 is rotated upward as described above, the pendulum 75 rotates by its own weight to a position in a travel path of the operation button 70. Therefore, the pendulum 75 blocks the operation button 70 from traveling to a position to unlock the lock mechanism while the upper structure 26 is in an open state with respect to the apparatus body 1, thus preventing the scanner 100 from falling by its own weight.

The opening 59 is further described below with reference to FIGS. 12, 17 and 21.

As described above, the upward disengagement of the scanner 100 is prevented by the disengagement stoppers 53 and 54 that engage the rails 133 and 134, respectively, as illustrated in FIGS. 16 through 18. Further, each of the supporters 51 and 52 should have a sufficient length in the front and back direction because users might apply a force from above to the scanner 100 that is slidable on the supporters 51 and 52, for example, by putting his/her hand thereon. In particular, in the supporter 52, the upper surface 52a and the disengagement stopper 54 are extended to the front side as far as possible for right-handed users.

However, when the user slides the scanner 100 backward for better visibility of the sheet, the upper surface 52a and the front stopper 54a provided in the front portion on the upper side of the supporter 52 are exposed. Although it poses no problem when the upper side is simply flat, it might cause a safety problem because a bumpy part (the upper surface 52a and the front stopper 54a) is exposed when the upper side serves as a slide supporter, or a slide mechanism, and includes an engagement part to prevent disengagement of the scanner 100.

To solve the problem described above, the supporter 52 may have a flat surface without an engagement part on the front portion thereof. In this case, the flat surface should have a height higher than that of a slide contact surface between the upper surface 52a and the lower surface 133a illustrated in FIG. 18, which is hereinafter also referred to as the boundary surface. Otherwise, the slide surface of the scanner 100 might protrude from the front side, forming a space thereunder. If the exterior of the image forming apparatus 300 includes such a space in the sliding direction, a users' hand, clothing, etc. might get caught therein when the scanner 100 slides, thus posing a safety problem.

Further, there is the matter of compactness. As described above referring to FIGS. 11 through 13, the scanner 100 includes the scan unit, not shown, and the driving motor 131 to drive the scanner unit via the timing belt 138.

Although the movable scan unit requires a space having a certain height throughout its movable range, that is, almost whole the length of the scanner 100 in the sheet width direction, the fixed driving motor 131 requires only an installation space having a certain height. Although this installation space can be secured by partly projecting the scanner 100 downward, if this projection is located above the sheet stack surface 41, sheets being discharged onto or stacked on the sheet stack surface 41 might hit this projection. Further, such a projection reduces the length and a sheet stack capacity of the sheet stack surface 41 in the discharge direction. Therefore, the scanner 100 is partly projected downward into the supporter 52 in the present embodiment.

When the scanner 100 is configured so that the projection is housed in the supporter 52 with the boundary surface maintained, the opening 59 illustrated in FIGS. 17 and 21 is formed by an exterior maintaining the boundary surface and a space to house the projection. As illustrated in FIGS. 17 and 21, the opening 59 is formed in the front edge portion of the supporter 52 in the sliding direction shown by arrows Xa and Xb. To enhance strength of the supporter 52, particularly the front stopper 54a, this front edge portion is formed continuously by the pair of sidewalls 52c and 52d and the front wall 52e forming a single integrated unit.

When the scanner 100 slides forward in a state in which the opening 59 is exposed, users' fingers might get caught therein, and thus a significant hazard is posed. Therefore, the opening 59 should be covered with a shield member that selectably covers the opening 59 in conjunction with sliding of the scanner 100 to prevent users from accessing the slide mechanism.

The shield 90 illustrated in FIG. 12 is further described below with reference to FIGS. 26 through 33. The shield 90 is a movable member that changes position with sliding of the scanner 100 between a first position to cover the opening 59 illustrated in FIG. 21 and a second position disengaged from the opening 59. The first and second positions are hereinafter also referred to as a shield position and a standby position, respectively.

Figure 26:
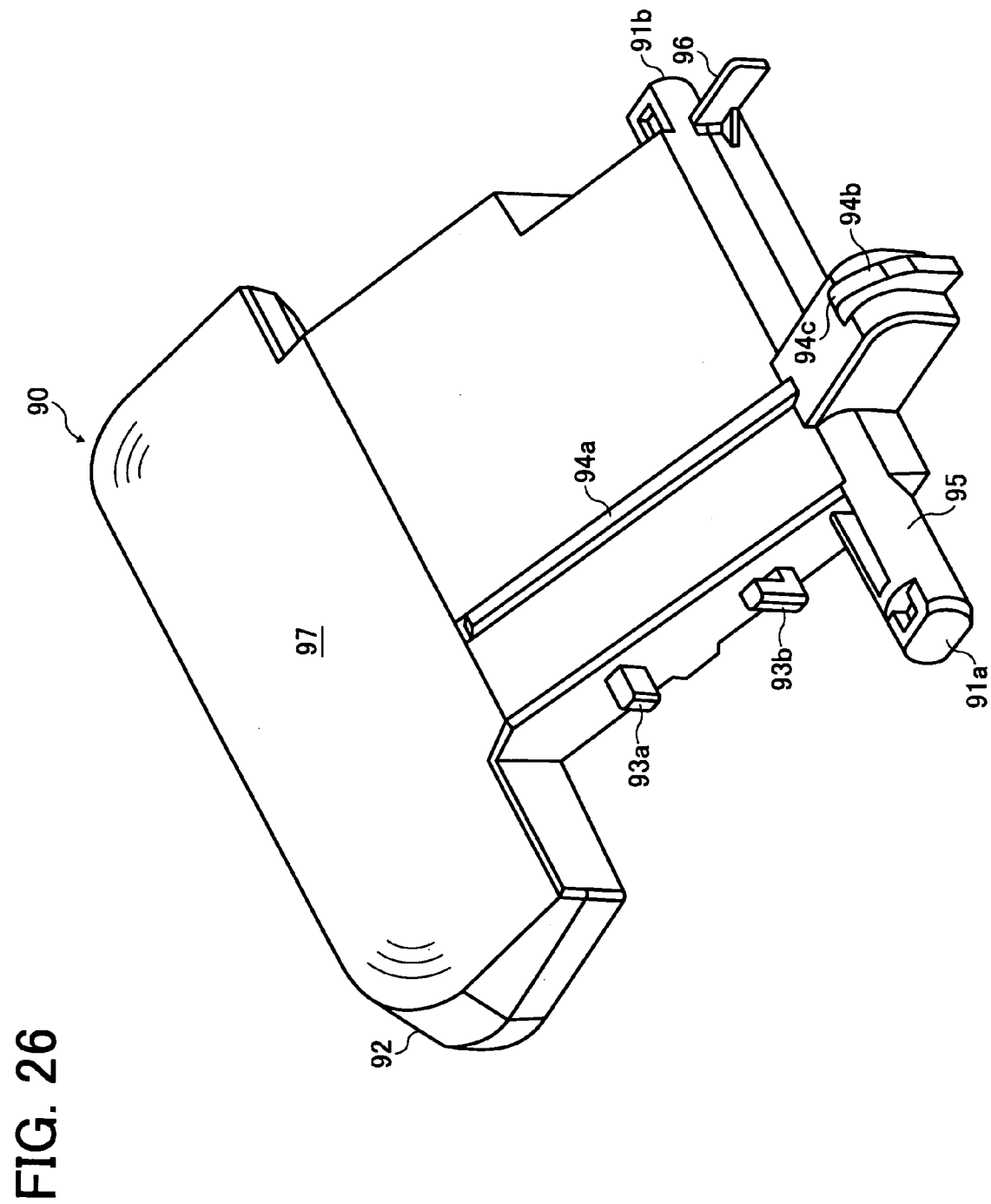
FIG. 26 is a perspective view illustrating a shield.

As illustrated in FIG. 26, the shield 90 includes shaft parts 91a and 91b on which the shield 90 pivots, shield surfaces 92 and 97 to shield the opening 59, first and second holders 93a and 93b, pivot limiters 94a, 94b, and 94c, a spring attachment part 95, and a stopper 96. The second holder 93b is shaped like a hook. These components of the shield 90 are integrally formed with a plastic that is identical or similar to the plastic used for the sheet stack part 40 and the supporters 51 and 52.

Figure 27:
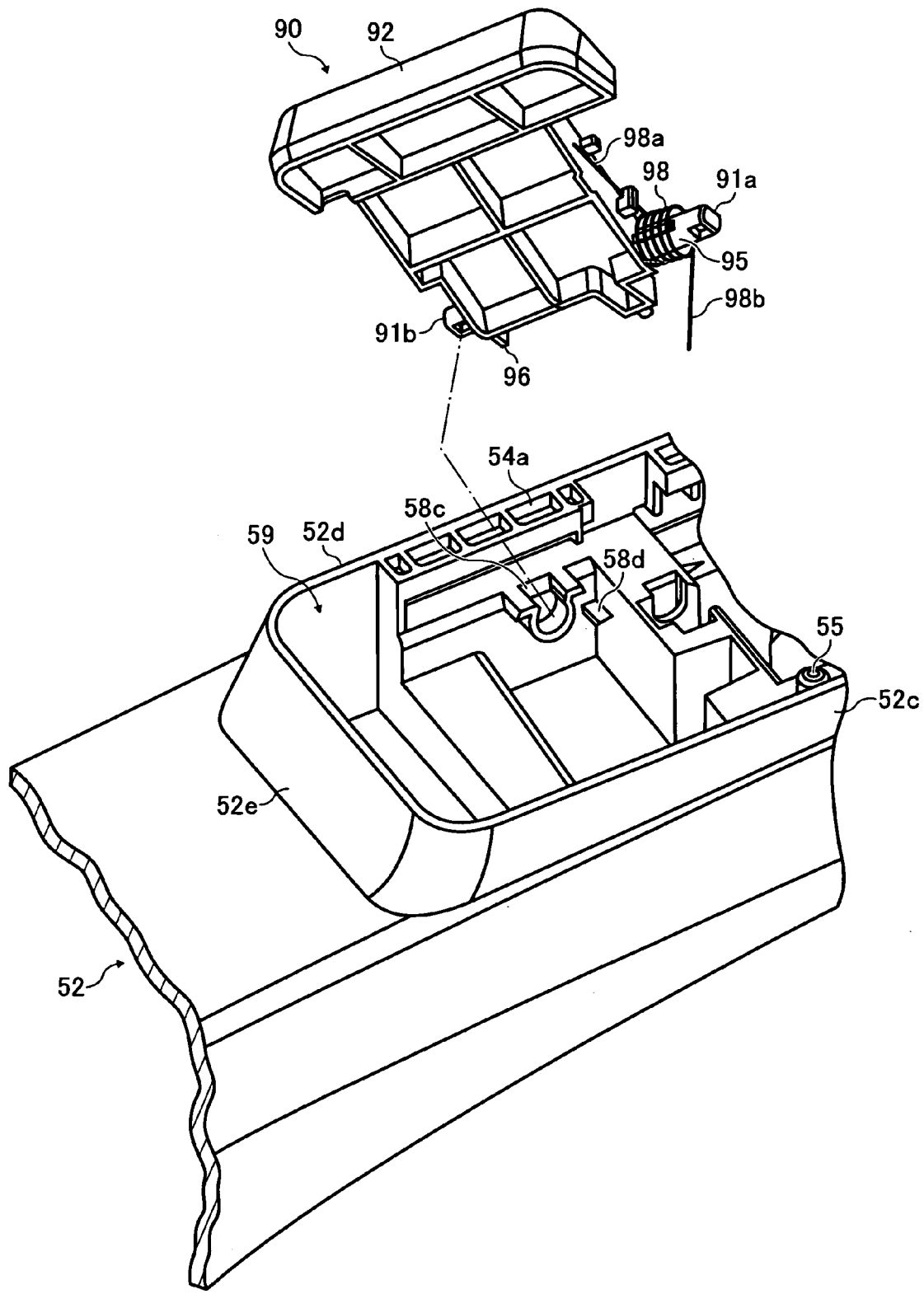
FIG. 27 is a schematic exploded perspective view illustrating attachment of the shield to a left bearing in the left supporter.
Figure 28:
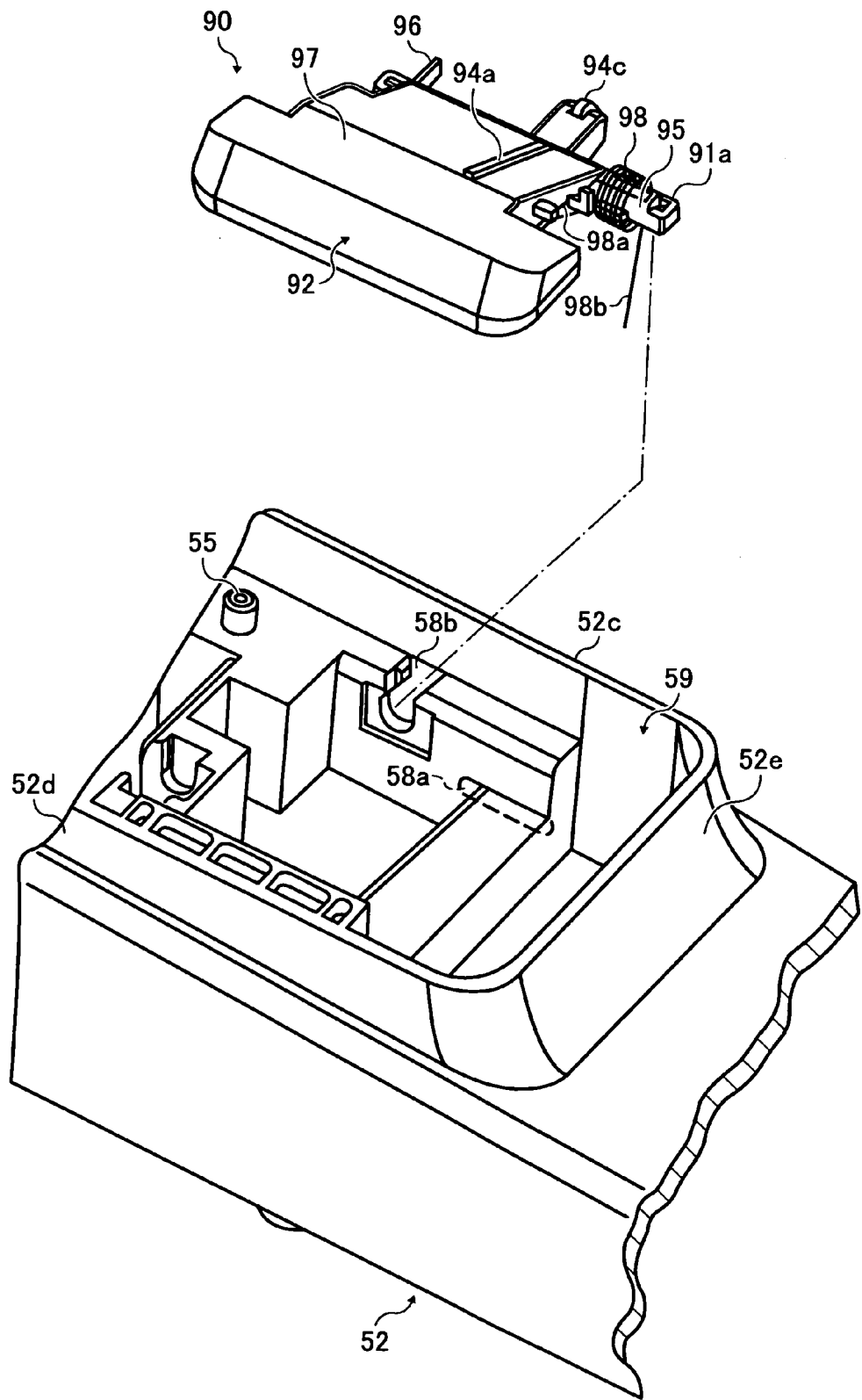
FIG. 28 is a schematic exploded perspective view illustrating attachment of the shield to a right bearing in the left supporter.
Figure 29:
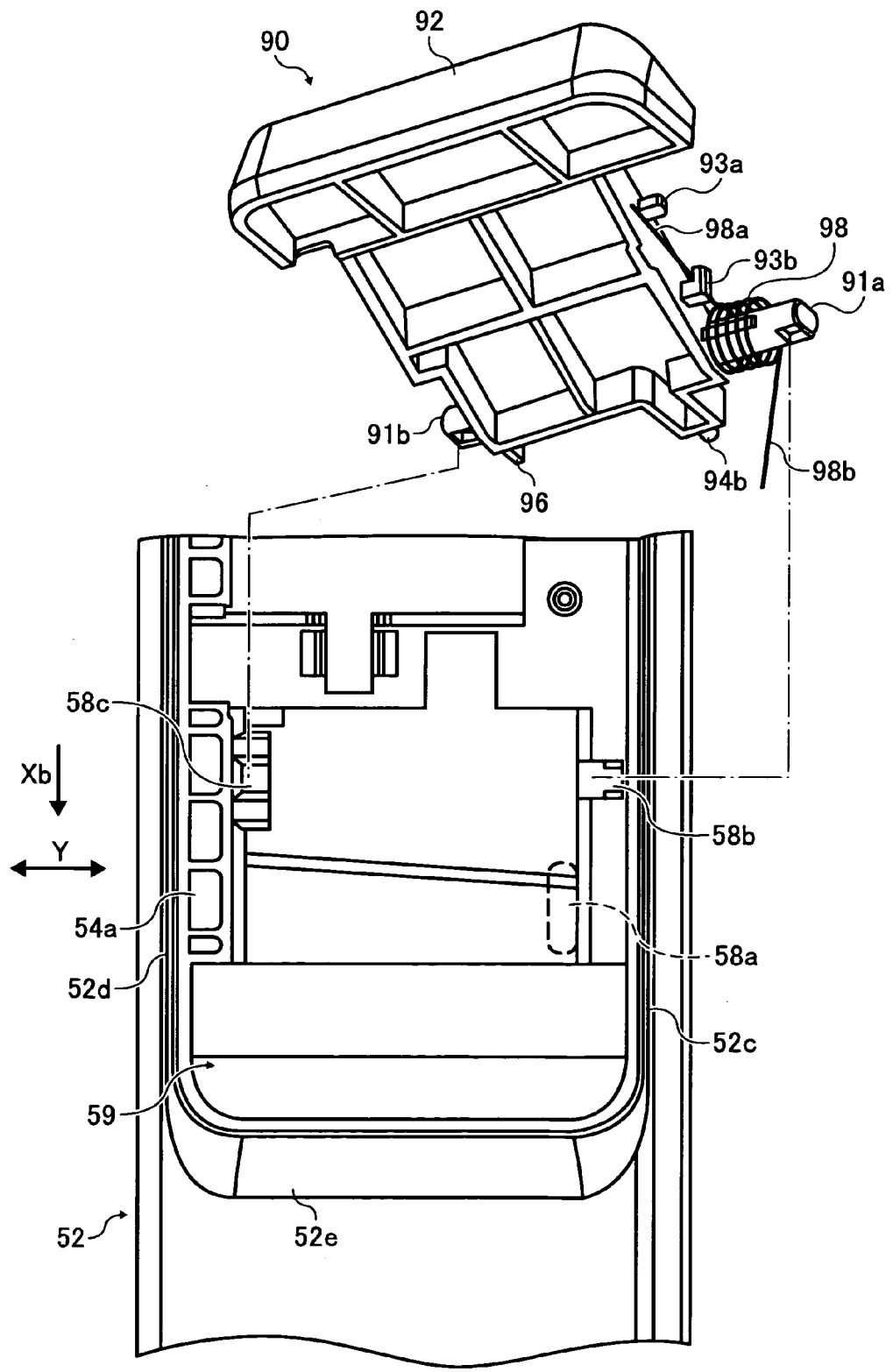
FIG. 29 is a schematic exploded perspective view illustrating attachment of the shield to the right and left bearings in the left supporter.

Referring to FIGS. 27 and 28, a torsion spring 98 is wound around the spring attachment part 95 located between the shaft parts 91a and 91b. The torsion spring 98 includes a first end 98a to be engaged with the first and second holders 93a and 93b and a second end 98b to be engaged with a spring engagement part 58a on a bottom wall of the supporter 52 shown by a dashed-dot line in FIG. 28. More specifically, the first end 98a is sandwiched between the first and second holders 93a and 93b so as not to disengage therefrom. The torsion spring 98 thus attached to the shield 90 and the supporter 52 transmits a torsion moment to the shield 90. The supporter 52 further includes a stopper engagement part 58d on the inner side of the sidewall 52d.

Each of the shaft parts 91a and 91b includes an oval cutout having a width smaller than a diameter thereof. The supporter 52 further integrally includes bearings 58b and 58c provided on the sidewalls 52c and 52d, having upward openings whose widths are larger than the widths of the oval cutouts of shaft parts 91a and 91b, respectively.

With the configuration described above, as illustrated in FIGS. 29 and 30, the shaft parts 91a and 91b of the shield 90 can be inserted easily from a circumferential direction into the bearings 58b and 58c that face the shaft parts 91a and 91b, respectively. When the shaft parts 91a and 91b are thus inserted into the bearings 58b and 58c and the shield 90 is mounted on the front edge portion of the supporter 52, the second end 98b of the torsion spring 98 contacts the spring engagement part 58a and is engaged therewith.

Figure 30:
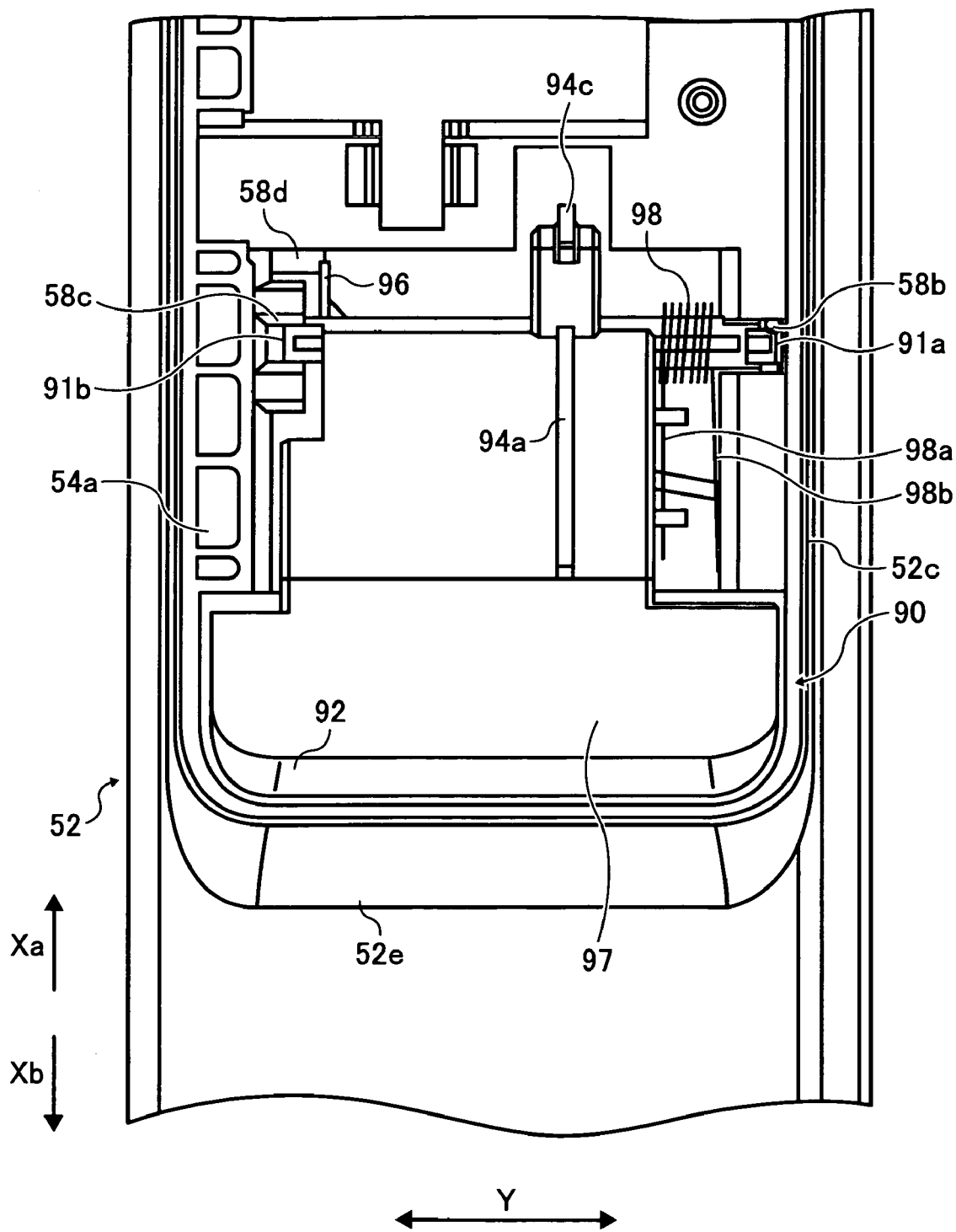
FIG. 30 is a plan view illustrating the shield attached to the left supporter.

After the shield 90 is inserted into the bearing 58b and 58c as illustrated in FIG. 30, the shield 90 is pivoted on the shaft parts 91a and 91b toward the front wall 52e of the supporter 52. While the shield 90 is thus moving to its usage range, the torsion spring 98 constantly applies an elastic force and a bias force to the shield 90 in a direction of the first position (shield position). In this state, the stopper 96 prevents the shield 90 from returning to a position where the shield 90 is mounted at the start of installation and the oval cutouts on the shaft parts 91a and 91b from disengaging from the bearings 58b and 58c, respectively. The stopper 96 is configured to bend in a rotary axis direction of the shield 90. As the shield 90 pivots on the shaft parts 91a and 91b, the stopper 96 contacts the stopper engagement part 58d provided in the supporter 52 and bends to an extent to go over the stopper engagement part 58d. After going over the stopper engagement part 58d, the stopper 96 remains astride the stopper engagement part 58d. This configuration prevents the oval cutouts on the shaft parts 91a and 91b from returning to the upward openings of the bearings 58b and 58c, respectively, thus preventing the shield 90 from disengaging from the opening 59.

The shield surfaces 92 and 97 that cover the opening 59 selectably and the pivot limiters 94a, 94b, and 94c are described below, together with operation of the shield 90, referring to FIGS. 31A through 33.

Figure 33:
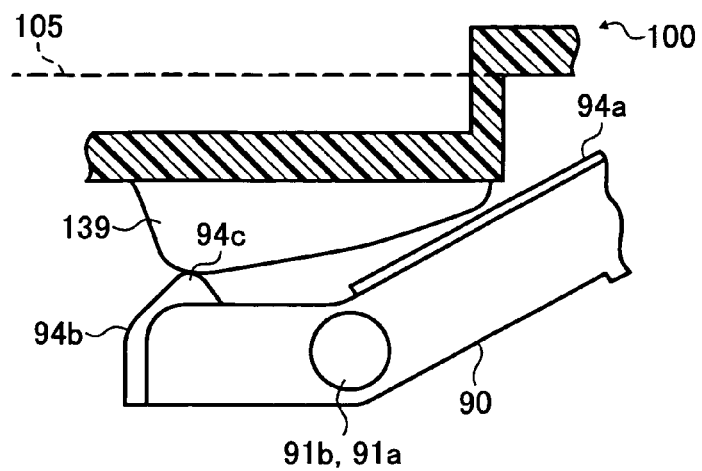
FIG. 33 is an enlarged cross-sectional view illustrating the engagement part of the scanner and the shield illustrated in FIG. 32B.

The shield 90 operates in conjunction with the sliding of the scanner 100. As described above with reference to FIG. 12, the engagement part 139 shaped like a plate projecting downward is integrally provided on a bottom wall of the scanner 100, at a position beneath the driving motor 131. FIG. 33 is an enlarged illustration of the engagement part 139 and the shield 90. As illustrated in FIG. 33, the engagement part 139 is a type of cam having an outline such as to engage the pivot limiters 94a and 94c and slide thereon selectably within the slidable range of the scanner 100, and includes a downward projecting surface at a back edge portion thereof on a left side and a front projection at a right side in FIG. 33.

Figure 31A:
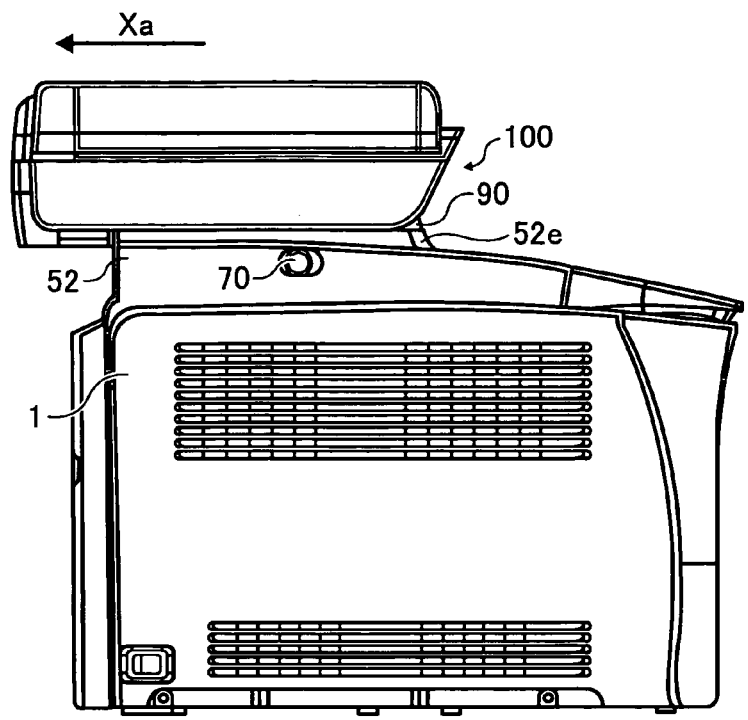
FIG. 31A is a plan view illustrating a state of the shield and a front edge portion of the left supporter when the scanner is at the rearmost position.
Figure 31B:
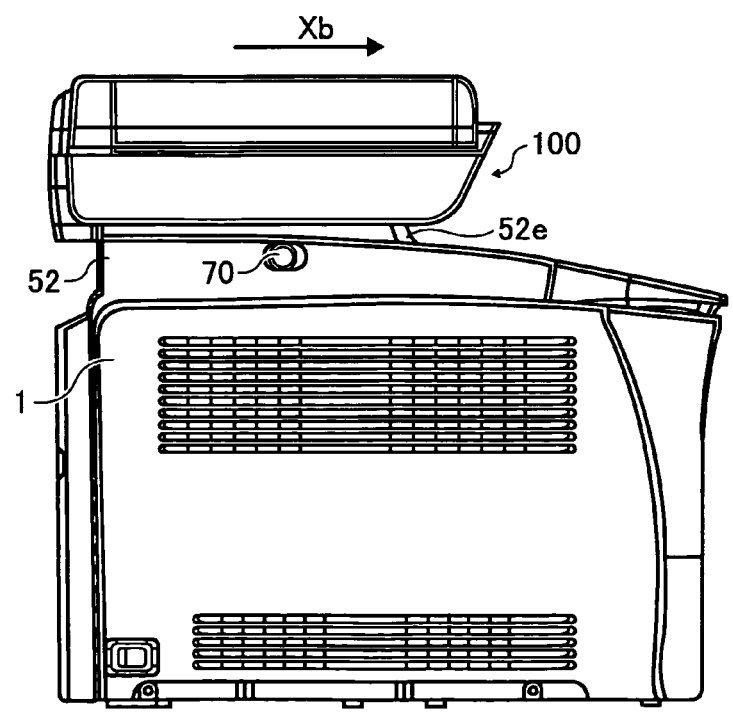
FIG. 31B is a plan view illustrating a state of the front edge portion of the left supporter when the scanner is at the foremost position.

The pivot limiter 94a limits pivoting (displacement) of the shield 90 when contacting a facing member, the engagement part 139 provided in the scanner 100. The scanner 100 is slid from the back side of the apparatus body 1 in the sliding direction shown by arrow Xb and mounted on the apparatus body 1 as illustrated in FIG. 31B. While the scanner 100 is sliding in the sliding direction shown by arrow Xb to counter the bias force of the torsion spring 98 illustrated in FIG. 30, a front edge portion of the engagement part 139 contacts the pivot limiter 94a before the scanner 100 reaches a position illustrated in FIGS. 31B and 32A. This contact between the engagement part 139 and the pivot limiter 94a causes the shield 90 to pivot about the shaft parts 91a and 91b clockwise in FIG. 32A, and then the back edge portion of the engagement part 139 further causes the shield 90 to pivot clockwise contacting the pivot limiter 94a. When the scanner 100 slides to the front edge of the supporter 52 illustrated in FIG. 31B, the shield 90 is at the standby position (standby angle) illustrated in FIG. 32A. The standby angle of the shield 90 is greater than the shield position (shield angle) and smaller than an angle at which the shield 90 is mounted.

When the shield 90 is at the standby position, the back side of the scanner 100 aligns with the back side of the apparatus body 1 as illustrated in FIG. 31B. In this state, the image forming apparatus 300 occupies a minimum volume and has less concavity and convexity. Therefore, the image forming apparatus 300 requires less packing and is environmentally sound because the number of image forming apparatuses that can be shipped at any one time can be increased. It should be noted that, during transport, the step screw 56 prevents the scanner 100 from disengaging from the supporter 51 and 52 in the mount and removal direction as illustrated in FIGS. 20A and 20B.

Sliding the scanner 100 backward is described below.

Figure 32A:
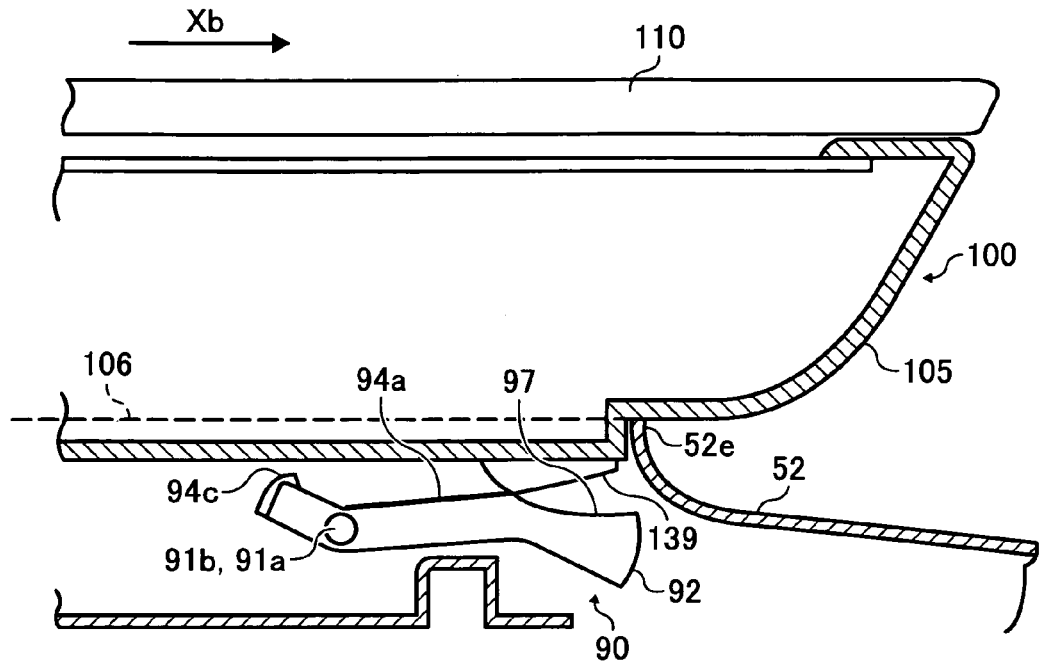
FIG. 32A is a cross-sectional view illustrating engagement between an engagement part of the scanner and the shield when the scanner is at the foremost position.
Figure 32B:
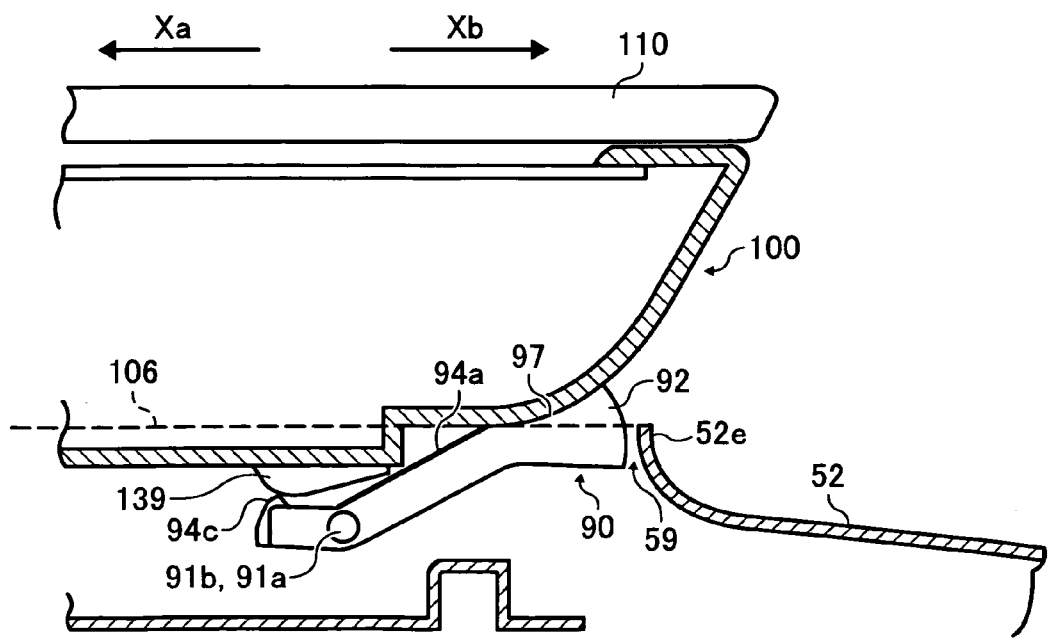
FIG. 32B is a cross-sectional view illustrating engagement between the engagement part of the scanner and the shield when the scanner is at the rearmost position.

When the scanner 100 is slid in the sliding direction shown by arrow Xa to the rearmost position illustrated in FIG. 32B to facilitate removal of sheets, the shield 90 pivots on the shaft parts 91a and 91b to the shield position illustrated in FIG. 32B. The engagement part 139 and the shield 90 are configured so that only the downward projection surface of the engagement part 139 and the pivot limiter 94c engage each other when the shield 90 is at the shield position as illustrated in FIGS. 32B and 33. That is, the front projection of the engagement part 139 does not engage the pivot limiter 94a when the shield 90 is at the shield position. Further, in the state illustrated in FIG. 32B, only the shield surface 92 appears on the exterior of the apparatus body 1, and the opening 59 is covered almost completely.

In other words, the shield 90 is configured so that the shield 97, which is perpendicular to a pivot direction, is not exposed to the opening 59. This configuration prevents users from accessing the shield surface 97 and users' fingers from getting caught between the shield surface 97 and the scanner 100, and thus the shield 90 can maintain its effectiveness and be protected from damage.

More specifically, the shield surface 92 that covers the opening 59 is shaped like a surface of a cylinder whose axis is coaxial or nearly coaxial with the shaft parts 91a and 91b, which are the center of rotation of the shield 90. Therefore, the shield 90 covers the opening 59 provided on the front edge portion of the supporter 52 that contains the shield 90 while leaving no significant gap either while pivoting or at the shield position. It is preferable that the shield surface 92 be formed with a continuous circumferential surface that maintains the gap between the shield 90 and the supporter 52 at less than 1 mm wherever the scanner 100 is within the slidable range to prevent small things, such as paper clips, from falling into the opening 59.

It is to be noted that the shape of the shield surface 92 is not limited to a cylindrical surface, and alternatively may be a spherical surface whose axis is coaxial or nearly coaxial with the shaft parts 91a and 91b, which are the center of rotation of the shield 90.

Further, the shield surface 97 is shaped to be flush with a front wall of the scanner 100. More specifically, when the scanner 100 slides backward in the sliding direction shown by arrow Xa in FIG. 32B, the shield 90 pivots on the shaft parts 91a and 91b counterclockwise, biased by the torsion spring 98 illustrated in FIG. 30, and the shield surface 97 rotates upward and contacts the front wall of the scanner 100 almost completely. Therefore, the shield 90 can cover the opening 59, maintaining the gap formed with the shield 90, the sidewalls 52c and 52d, and the front wall 52e minimum, thus completely protecting users' fingers from getting caught in the opening 59 and small things, such as paper clips, from falling into the opening 59.

If the shield surface 92 is rotated upward only by the bias of the torsion spring 98, the shield surface 92 might rotate downward to expose the opening 59 when the user pushes the shield 90, thus posing a safety hazard to the user, who might get his/her fingers caught in the opening 59, as well as posing a risk that small things, such as paper clips, might fall into the opening 59. By contrast, in the present embodiment, the pivot limiter 94c illustrated in FIGS. 26 and 32B contacts the downward projection surface provided on the back edge portion of the engagement part 139 and prevents the shield surface 92 from rotating downward as illustrated in FIG. 32B, even if the user pushes the shield surface 92. That is, the pivot limiter 94c functions as a shield stopper that prevents the shield 90 from changing its position while the shield 90 is at the shield position, even when pressed. The pivot limiter 94c as the shield stopper further serves as a displacement controller that controls displacement of the shield 90 by selectably contacting the engagement part 139.

It is to be noted that the shapes of the shield surfaces 92 and 97 are not limited to those described above. For example, alternatively, the front wall 52e of the supporter 52 may be omitted and a portion corresponding thereto may be provided on the shield 90, on condition that sufficient strength is maintained thereby. In addition, although the configuration described above is suitable for a case in which slide lock positions are fixed, the opening 59 can be covered with a flat surface that is on an identical or similar surface to the slide surfaces with similar effects, regardless of the position of the scanner 100 in the sliding direction.

Further, when vertical jolting of the slide mechanism is not significant, alternatively, the torsion spring 98 may be omitted, provided that the engagement part 139 of the scanner 100 and the pivot limiter 94c of the shield 90 are enhanced in accuracy. Also in this case, the shield 90 can be maintained at the shield position illustrated in FIG. 32B leaving no significant gap.

Locking of the platen cover 110 is described below.

As described above with reference to FIG. 5, the upper cover 18 is rotatable upward around the rotary shaft 17. When the user operates the cover pull 61 to rotate the upper cover 18 upward around the rotary shaft 17, the light-scanning device 8 in the lower portion thereof and the scanner 100 located thereon via the supporters 51 and 52 are also rotated upward. In this state, the interior of the apparatus body 1 is exposed, facilitating maintenance work.

It is to be noted that the platen cover 110 might rotate around the hinge 111 in conjunction with rotation of the upper cover 18 because the rotary shaft 17 of the upper cover 18 and the hinge 111 of the platen cover 110 have axis lines parallel to each other.

Therefore, the image forming apparatus 300 according to the present embodiment further includes a platen lock 170 to prevent the platen cover 110 from accidentally rotating when the upper cover 18 is rotated, as described below with reference to FIGS. 34 through 39.

Figure 34:
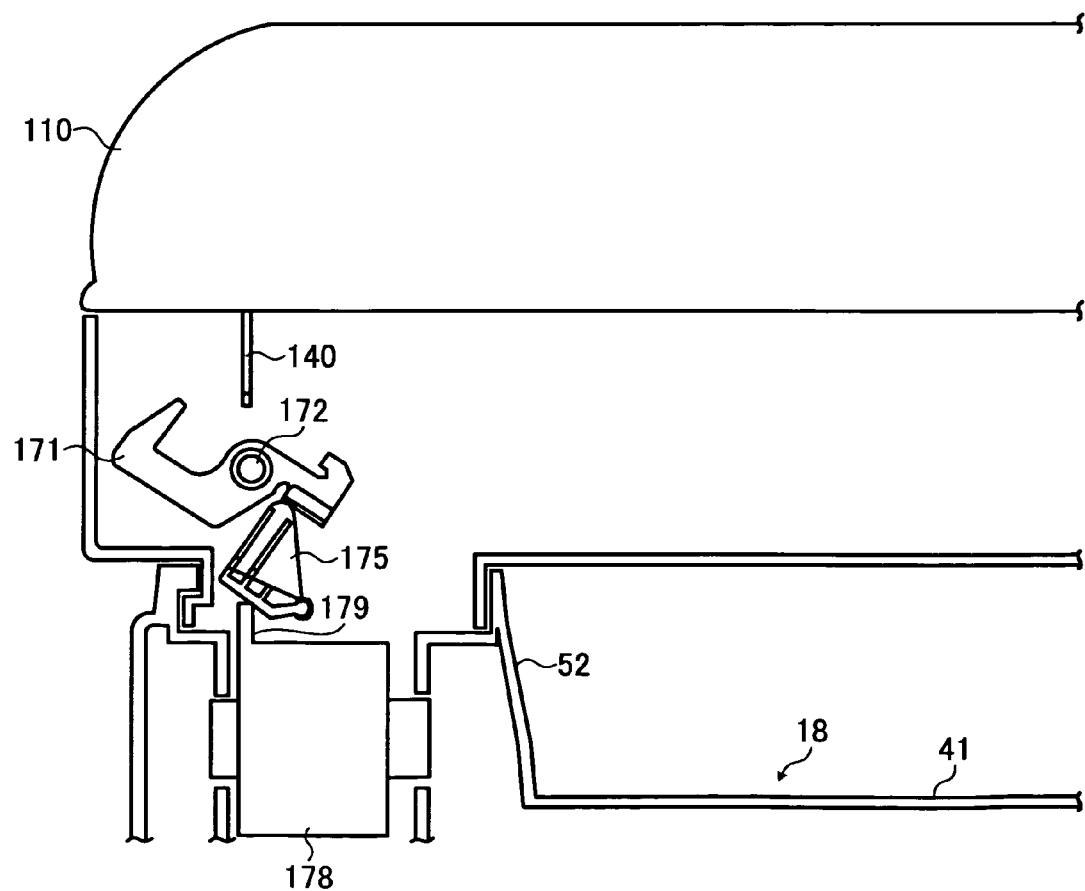
FIG. 34 is a cross-sectional view illustrating a lock mechanism when the platen cover is unlocked, as viewed from the front of the apparatus.
Figure 35:
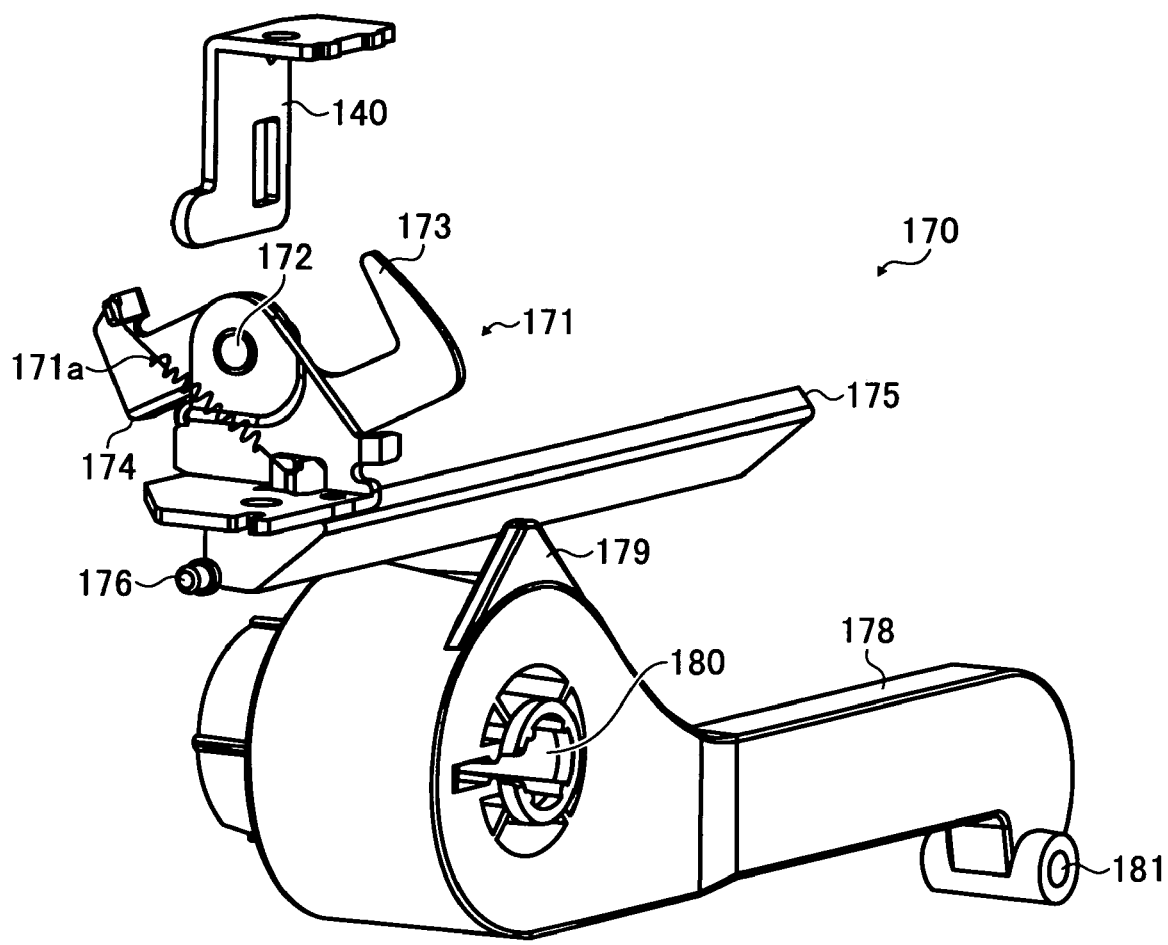
FIG. 35 is a perspective view illustrating the lock mechanism when the platen cover is unlocked.
Figure 36:
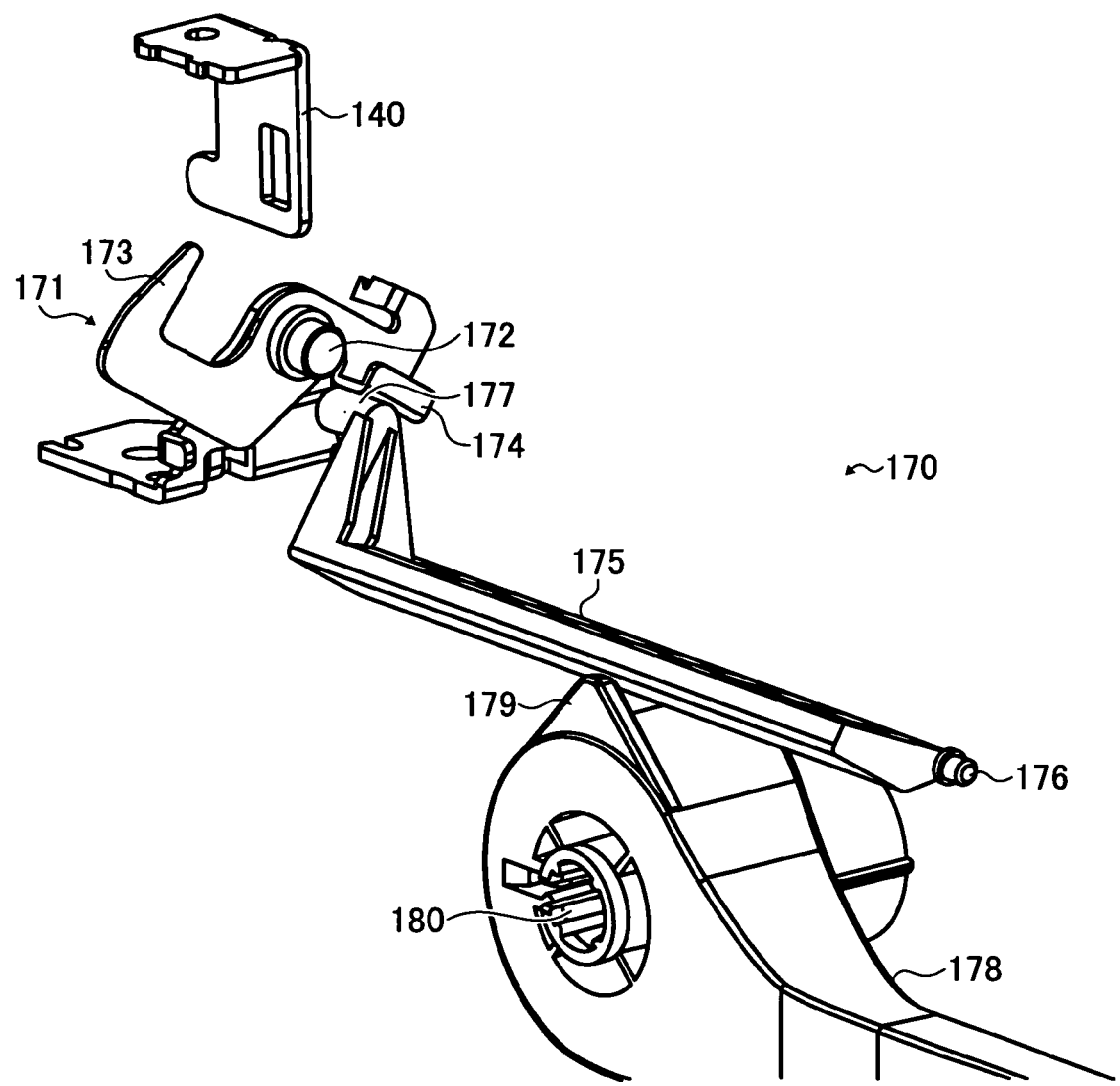
FIG. 36 is another perspective view illustrating the lock mechanism when the platen cover is unlocked.

FIGS. 34 through 36 illustrate a state of the platen lock 170 when the upper cover 18 is closed. FIG. 34 illustrates left side portions of the scanner 100 and the apparatus body 1 viewed from the front side.

As illustrated in FIG. 34, the platen lock 170 includes a lock member 171 that engages an engagement part 140 provided on the platen cover 110, a pivot 172, a lock intermediate member 175 to move the lock member 171, and an operation member 178 that includes a cam 179 as a cam portion and operates the lock intermediate member 175. The lock member 171 is supported by the scanner 100 rotatably around the pivot 172.

Referring to FIGS. 34 through 36, the lock member 171 includes a first end (upper end) including a lock claw 173 that detachably engages the engagement part 140 and a second end having an operation part 174, opposite to the lock claw 173 via the pivot 172. The lock intermediate member 175 is substantially panel-shaped, and includes a support shaft 176 provided along a side in a longitudinal direction thereof by which the lock intermediate member 175 is rotatably supported by the scanner 100 as illustrated in FIG. 34. The other side of the lock intermediate member 175 in the longitudinal direction is an outer circumferential side during rotation. As illustrated in FIG. 36, the lock intermediate member 175 further includes an upward projection on one end in the longitudinal direction, and an operation pin 177 that contacts the operation part 174 of the lock member 171 is provided on an upper end of the upward projection.

As illustrated in FIG. 35, the platen lock 170 further includes a spring 171a and a shaft 180. The operation member 178 includes a first end to be rotatably attached to the upper cover 18 via the shaft 180 and a second end 181. The spring 171a biases the lock member 171 to rotate around the pivot 172 in a direction that causes the operation part 174 to contact the operation pin 177, thus ensuring that the operation pin 177 contacts the operation part 174.

Although the lock intermediate member 175 rotates around the support shaft 176, its outer circumferential side descends by its own weight and rests on the cam 179 of the operation member 178. The cam 179 is provided on a circle whose axis is coaxial or nearly coaxial with the axis of the shaft 180.

When the upper cover 18 is closed, a projection of the cam 179 contacts the lock intermediate member 175. In this state, the lock intermediate member 175 rotates around the support shaft 176 so as to be slanted in a width direction thereof with its outer circumferential side obliquely above the support shaft 176, and the lock member 171 is at an unlock position with the lock claw 173 disengaged from the engagement part 140 on the scanner 100 as illustrated in FIG. 34. In this state, the platen cover 110 can be rotated upward and opened with respect to the apparatus body 1.

Figure 37A:
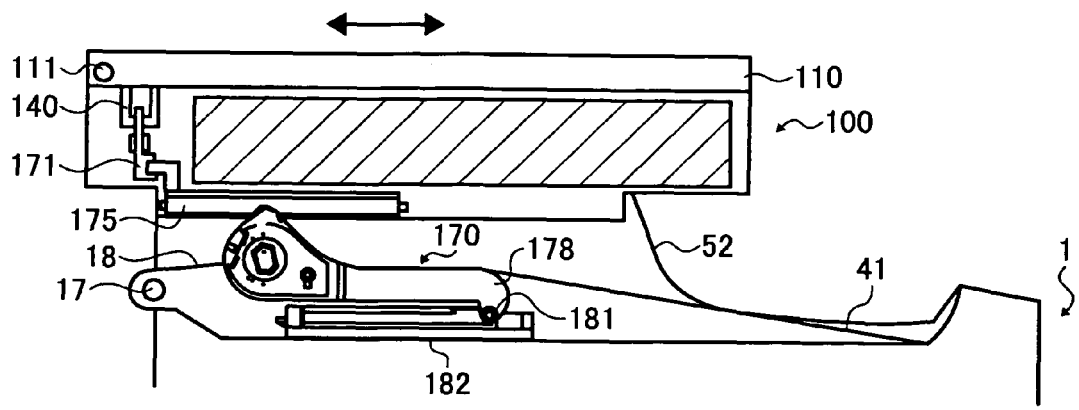
FIG. 37A is a cross-sectional view illustrating the lock mechanism when the scanner is at the foremost position.
Figure 37B:
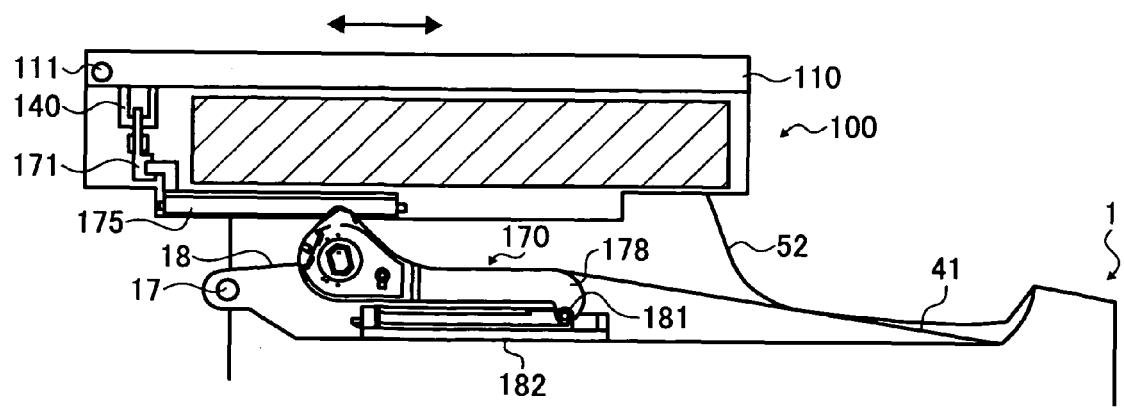
FIG. 37B is a cross-sectional view illustrating the lock mechanism when the scanner is at the rearmost position.

FIGS. 37A and 37B illustrate states of the platen lock 170 when the scanner 100 is at positions close to and away from the front side of the apparatus body 1, respectively. As illustrated in FIGS. 37A and 37B, the second end 181 of the operation member 178 is slidably mounted on a rail 182 provided on the apparatus body 1.

Figure 38:
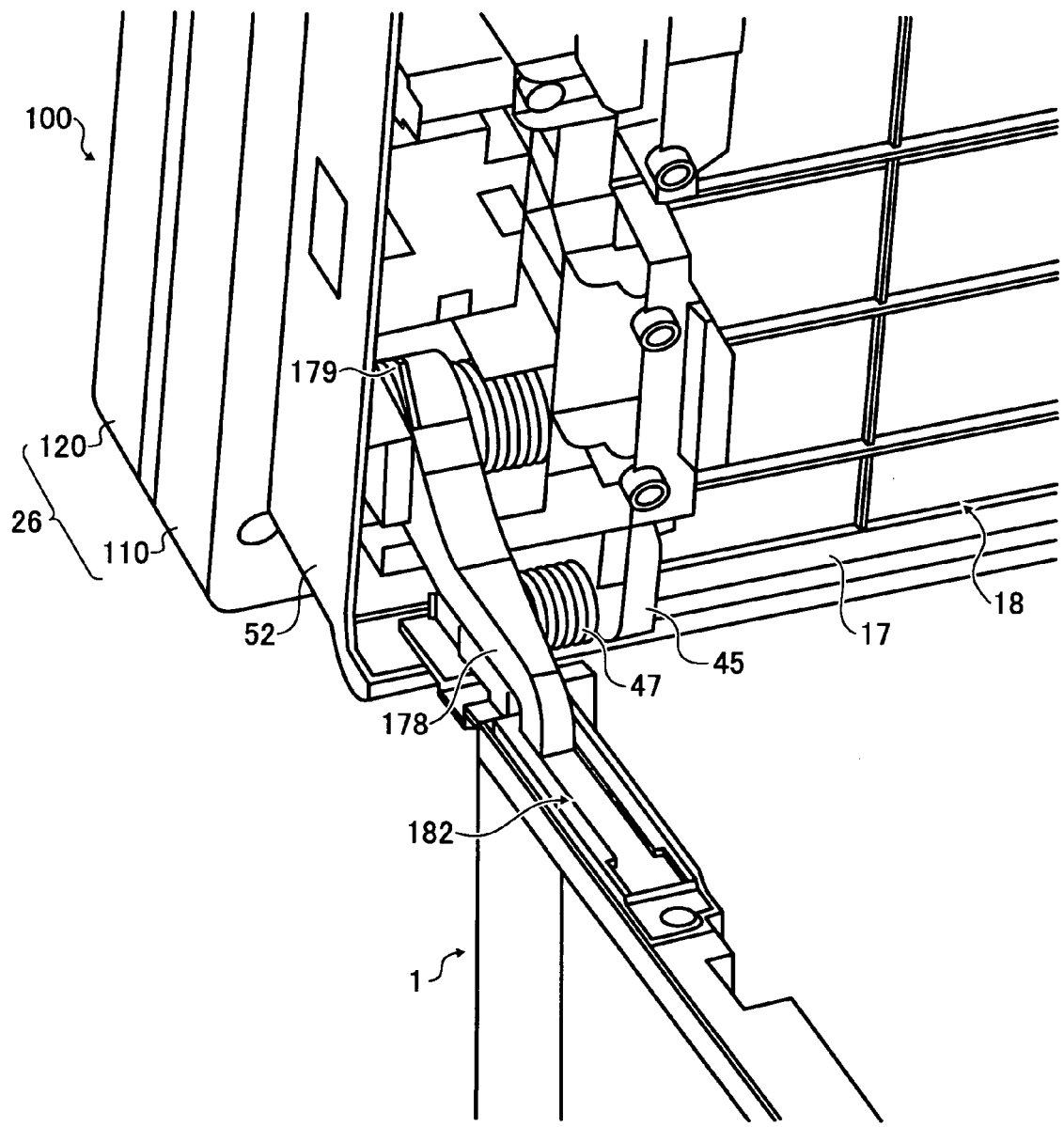
FIG. 38 is an enlarged perspective view of left side portions of the apparatus body and the upper structure in a state illustrated in FIG. 5 as viewed from the front of the apparatus.

FIG. 38 is an enlarged illustration of left side portions of the apparatus body 1 and the upper structure 26 in a state illustrated in FIG. 5, as viewed from the front side. The upper cover 18 further includes a pair of right and left upper frames 45 in the lower portion thereof, between which the light-scanning device 8 illustrated in FIG. 5 is provided, although only the left upper frame 45 is illustrated in FIG. 38. The rotary shaft 17 is attached to an upper edge of the back side of the apparatus body 1, with both ends thereof inserted into the right and left upper frames 45, respectively. Therefore, the upper structure 26 is rotatable around the rotary shaft 17 and openable and closable with respect to the apparatus body 1. With this configuration, when being rotated to an angle exceeding a reversionary angle, the upper structure 26 receives a moment in an open direction due to gravity, and thus the image forming part 2 is exposed as illustrated in FIG. 5. Further, a rotary shaft spring 47, such as a torsion spring, is provided on each end of the rotary shaft 17 penetrating the upper frame 45, with one end thereof attached to the apparatus body 1 and the other end thereof attached to the upper structure 26. The rotary shaft springs 47 are a bias member to bias the upper structure 26 in the open direction.

When the upper cover 18 is rotated upward around the rotary shaft 17, for example to replace the process cartridge, the second end 181 of the operation member 178 moves along the rail 182 and the first end thereof moves upward as illustrated in FIG. 38.

Figure 39:
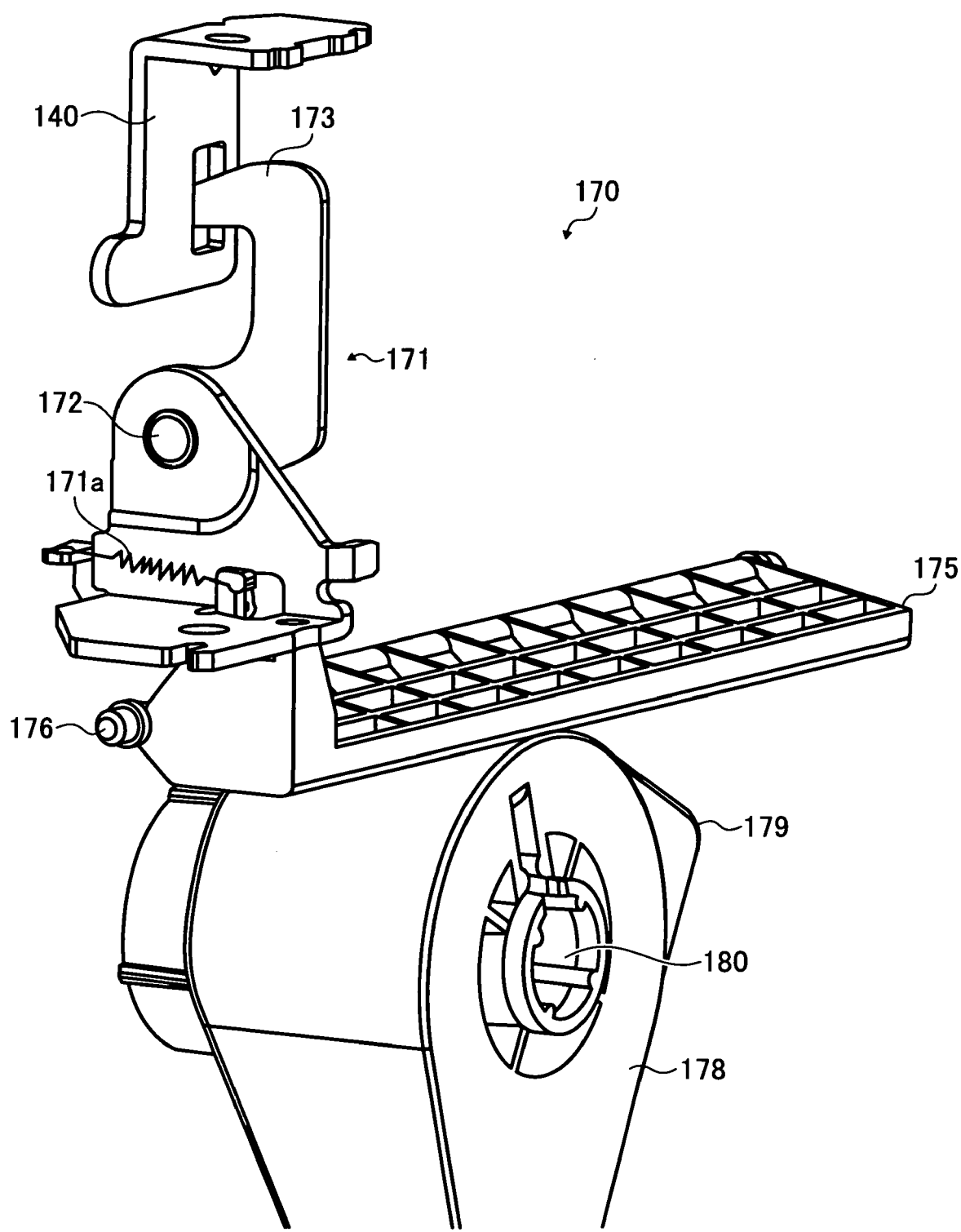
FIG. 39 is a perspective view illustrating the lock mechanism when the platen cover is locked.
Figure 40:
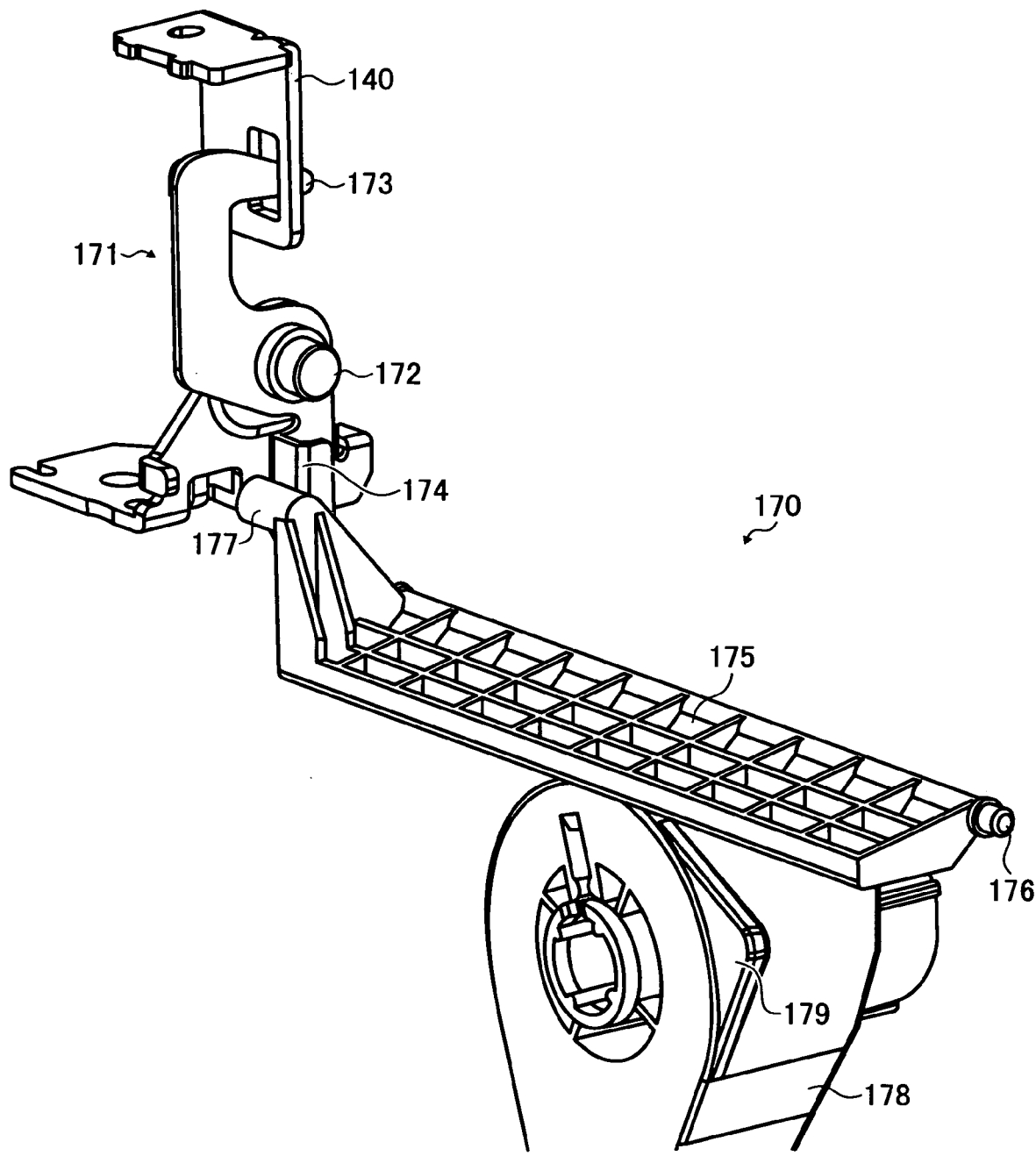
FIG. 40 is another perspective view illustrating the lock mechanism when the platen cover is locked.
Figure 41:
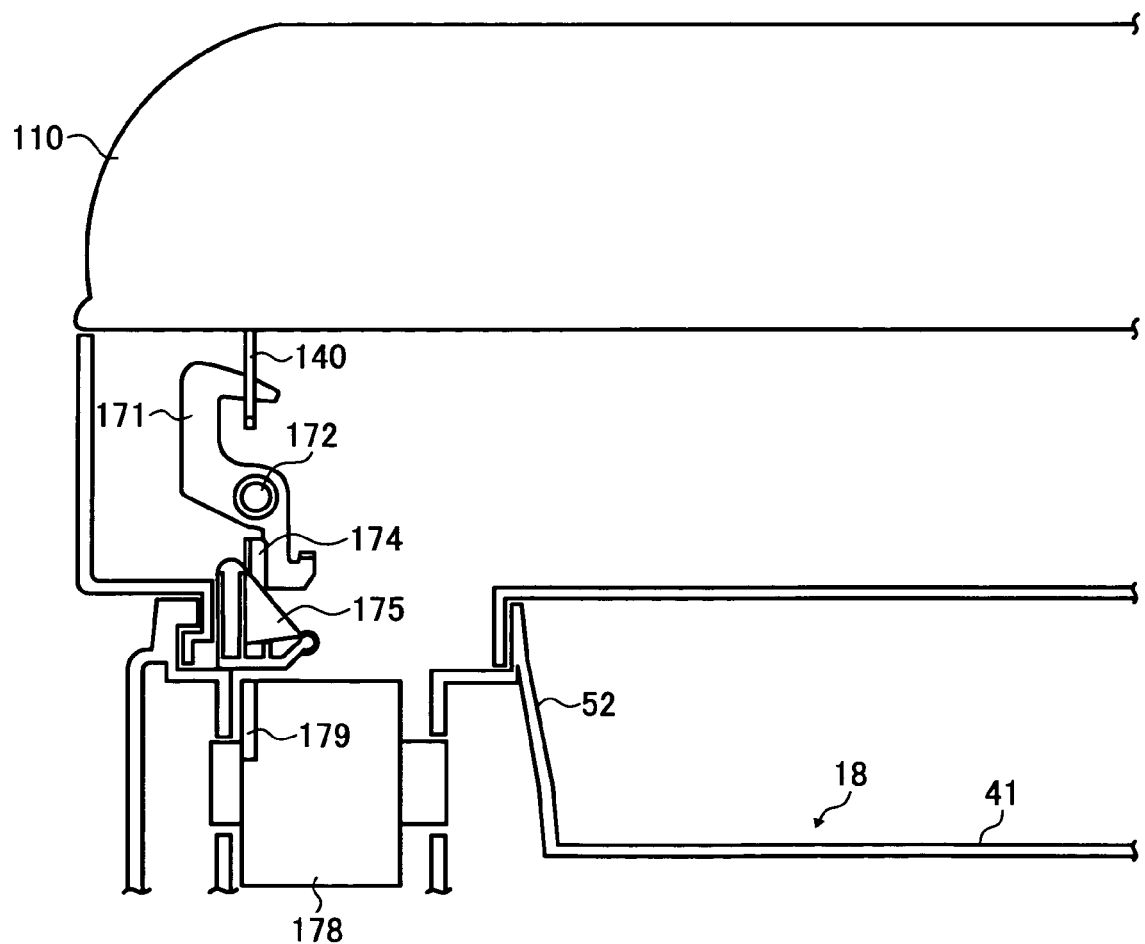
FIG. 41 is a cross-sectional view illustrating the lock mechanism when the platen cover is locked, as viewed from the front of the apparatus.

FIGS. 39 through 41 illustrate a state in which the platen lock 170 locks the platen cover 110. When the operation member 178 is in the state illustrated in FIG. 38, the operation member 178 rotates around the shaft 180 clockwise in FIG. 37A, with the projection of the cam 179 disengaged from the lock intermediate member 175 and a circular portion of the operation member 178 being in contact with the lock intermediate member 175 as illustrated in FIGS. 39 and 40. That is, the lock intermediate member 175 is substantially horizontal. Further, along with this rotating of the lock intermediate member 175, the lock member 171 rotates around the pivot 172 to a lock position at which the lock claw 173 engages the engagement part 140, and thus the platen cover 110 is locked as illustrated in FIG. 41.

As described above, the platen cover 110 of the scanner 100 is locked in conjunction with opening of the upper cover 18 with respect to the apparatus body 1. Therefore, opening of the upper cover 18 does not cause the platen cover 110 to open even when both the upper cover 18 and the platen cover 110 are rotatable upward around rotary shafts provided on the back side to be operated from the front side. That is, the upper cover 18 can be protected from damage caused by an accidental opening of the platen cover 110.

As described above, the scanner 100 is slidable so as to increase the distance between the sheet exit 25a and the scanner 100 to enable users to better see and remove sheets on the sheet stack surface 41 as illustrated in FIG. 4. Therefore, the platen lock 170 is configured to be able to lock the platen cover 110 wherever the scanner 100 is within the slidable range. As illustrated in FIGS. 37A and 37B, the cam 179 of the operation member 178 contacts the lock intermediate member 175 both when the scanner 100 is close to and away from the front side of the apparatus body 1. That is, the longitudinal side of the lock intermediate member 175 has a length longer than that of the sliding range of the scanner 100, and the operation member 178 is located so as not to disengage from the lock intermediate member 175 throughout the slidable range of the scanner 100. Therefore, the lock intermediate member 175 and the cam 179 of the operation member 178 remain in constant contact with each other, and thus the platen lock 170 locks the platen cover 110 throughout the slidable range of the scanner 100.

It is to be noted that the lock intermediate member 175 should rotate only within a range from the position slant in the width direction illustrated in FIGS. 34 through 36 to the substantially horizontal position illustrated in FIGS. 39 through 41. The lock intermediate member 175 contacts the cam 179 and is held thereby in the state illustrated in FIGS. 34 through 36. Further, a stopper, not shown, is provided on the housing of the scanner 100 to prevent the outer circumferential side of the lock intermediate member 175 from rotating downward from the horizontal state illustrated in FIGS. 39 through 41. Therefore, the lock intermediate member 175 may be either in contact with or slightly away from the cam 179 while in the horizontal state illustrated in FIGS. 39 through 41. Further, when the stopper is provided, the lock intermediate member 175 does not project from the slide contact surface between the scanner 100 and the supporter 52 illustrated in FIGS. 37A and 37B, and thus sliding of the scanner 100 is not hindered.

As described above, in the present embodiment, opening of the upper cover 18 does not cause the platen cover 110 to open, regardless of the position of the scanner 100, that is, wherever the scanner 100 is in the slidable range.

Further, the image forming apparatus 300 according to the present embodiment includes the lock mechanism to lock the upper cover 18 described above, that is, to prevent the cover lock 60 from being unlocked while the platen cover 110 is in an open state. This upper cover lock mechanism is described below with reference to FIGS. 42 through 44.

Figure 42:
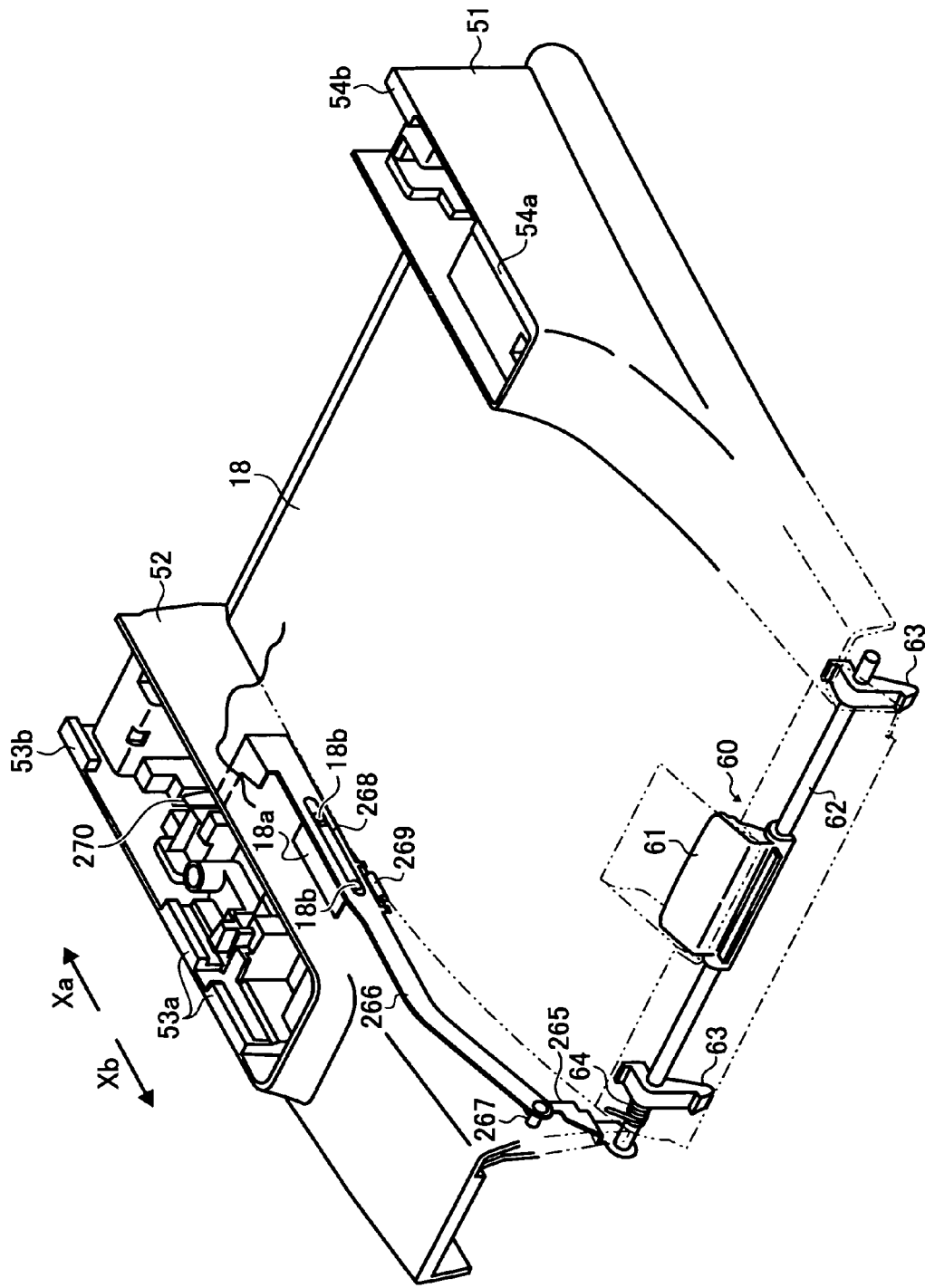
FIG. 42 is a perspective view illustrating arrangement of an upper cover lock mechanism for preventing an upper cover member from being opened.

Referring to FIG. 42, the upper cover lock mechanism includes a relay lever 265, a slide member 266 that is slidable in the sliding direction shown by arrows Xa and Xb, and a pin 267 attached to a front end of the slide member 266. The relay lever 265 includes a first end fixed to a left end of the support shaft 62 of the cover lock 60 and a second end that contacts the pin 267. The relay lever 265 rotates when the cover pull 61 is operated and the support shaft 62 is rotated. The slide member 266 is a long lever extending in the sliding direction shown by arrows Xa and Xb, and a slot 268 extending in the sliding direction is provided on a portion slightly backward from the center of the slide member 266. A coil spring 64 attached to the shaft 62 biases the lock claws 63 constantly to engage the protrusions 1a provided on the apparatus body 1 illustrated in FIG. 4.

On an inner side of the upper cover 18, a bracket 18a to which guide rollers 18b are attached is provided. The guide rollers 18b engage the slot 268, thus controlling a slide direction and a slidable range of the slide member 266. A tension spring 269 provided between the bracket 18a and the slide member 266 biases the slide member 266 backward constantly. At a back end of the slide member 266, which is opposite the front end to which the pin 267 is attached, a convexity 270 projecting upward is provided.

Figure 43:
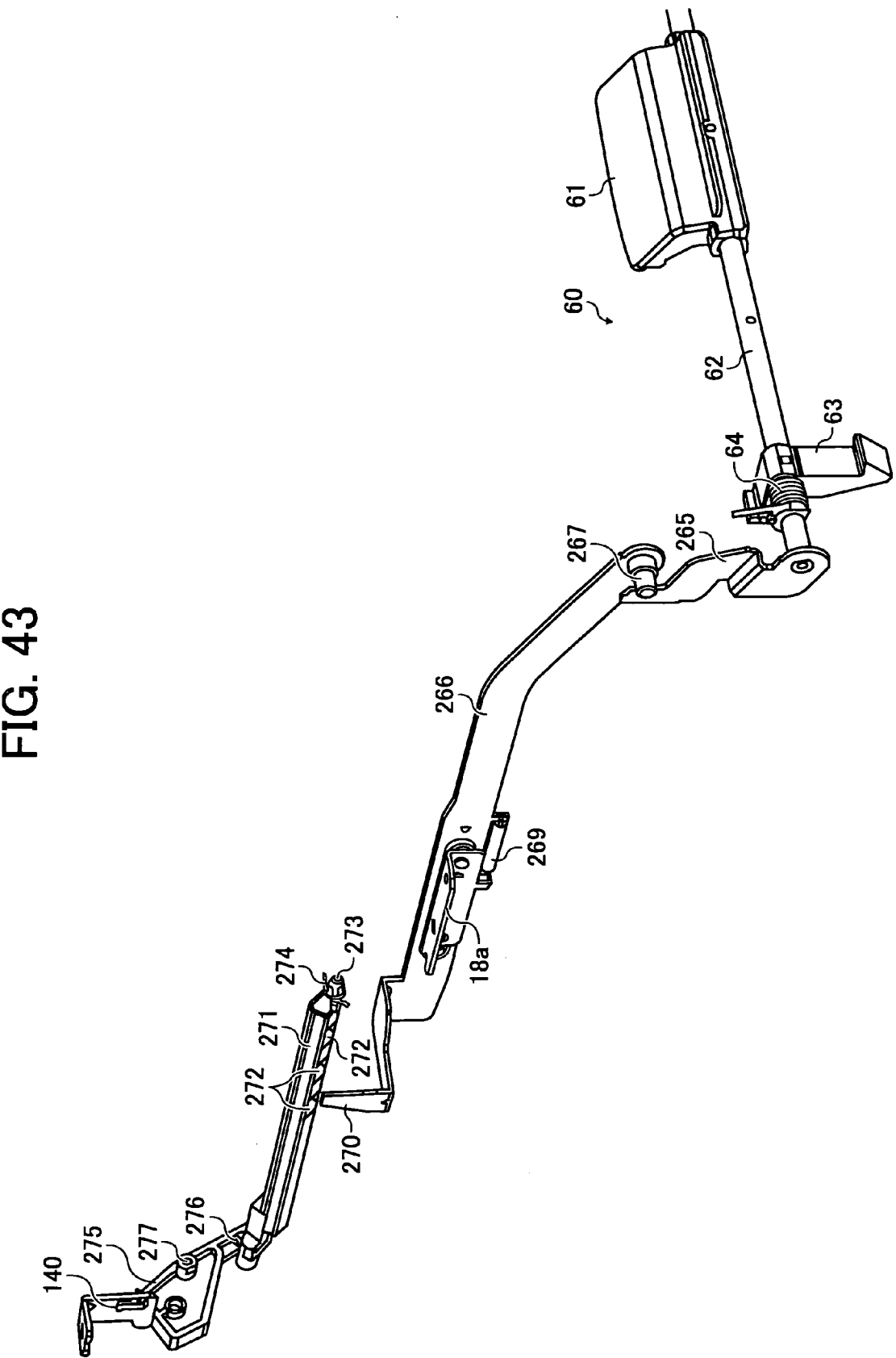
FIG. 43 is a perspective view illustrating a state in which the upper cover lock mechanism is unlocked.
Figure 44:
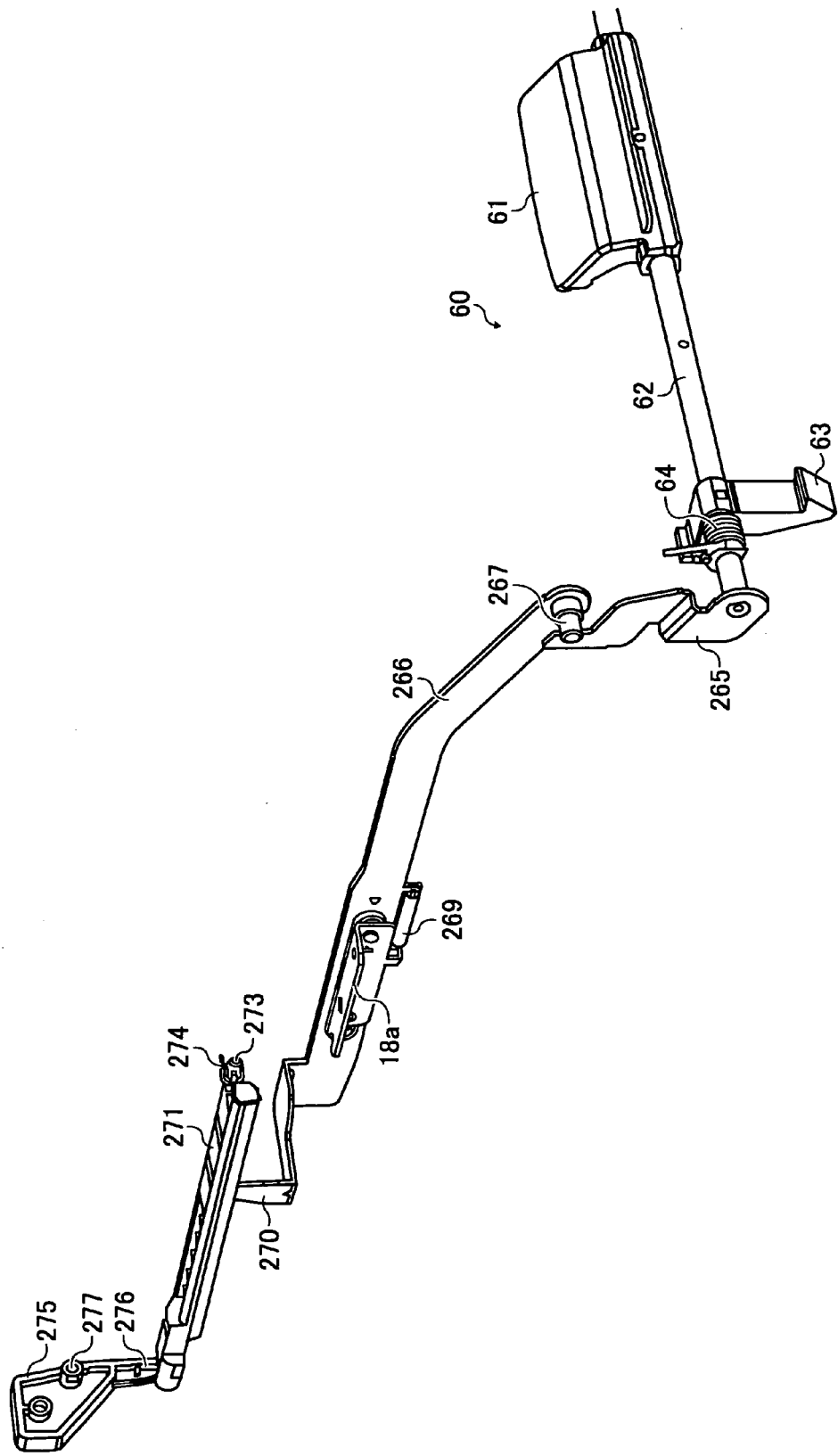
FIG. 44 is a perspective view illustrating a state in which the upper cover lock mechanism is locked.

Referring to FIGS. 43 and 44, the convexity 270 engages a substantially panel-shaped lock release 271. The lock release 271 has an axis line in a longitudinal direction and is attached to the scanner 100 rotatably around a pivot 273 provided on a short side thereof. The lock release 271 includes concavities 272 each of which has a rectangular cross section, and the convexity 270 engages one of the concavities 272 as illustrated in FIG. 44, and disengages therefrom as illustrated in FIG. 43. In the present embodiment, three concavities 272 are formed on the lock release 271. The lock release 271 is biased by a spring 274.

The upper cover lock mechanism further includes an operation member 275 that operates in conjunction with opening and closing of the platen cover 110, and which is located at the back end side of the lock release 271. The operation member 275 includes a leg 276 that rotates the lock release 271. The operation member 275 is attached to the scanner 100 rotatably around a pivot 277.

Figure 45:
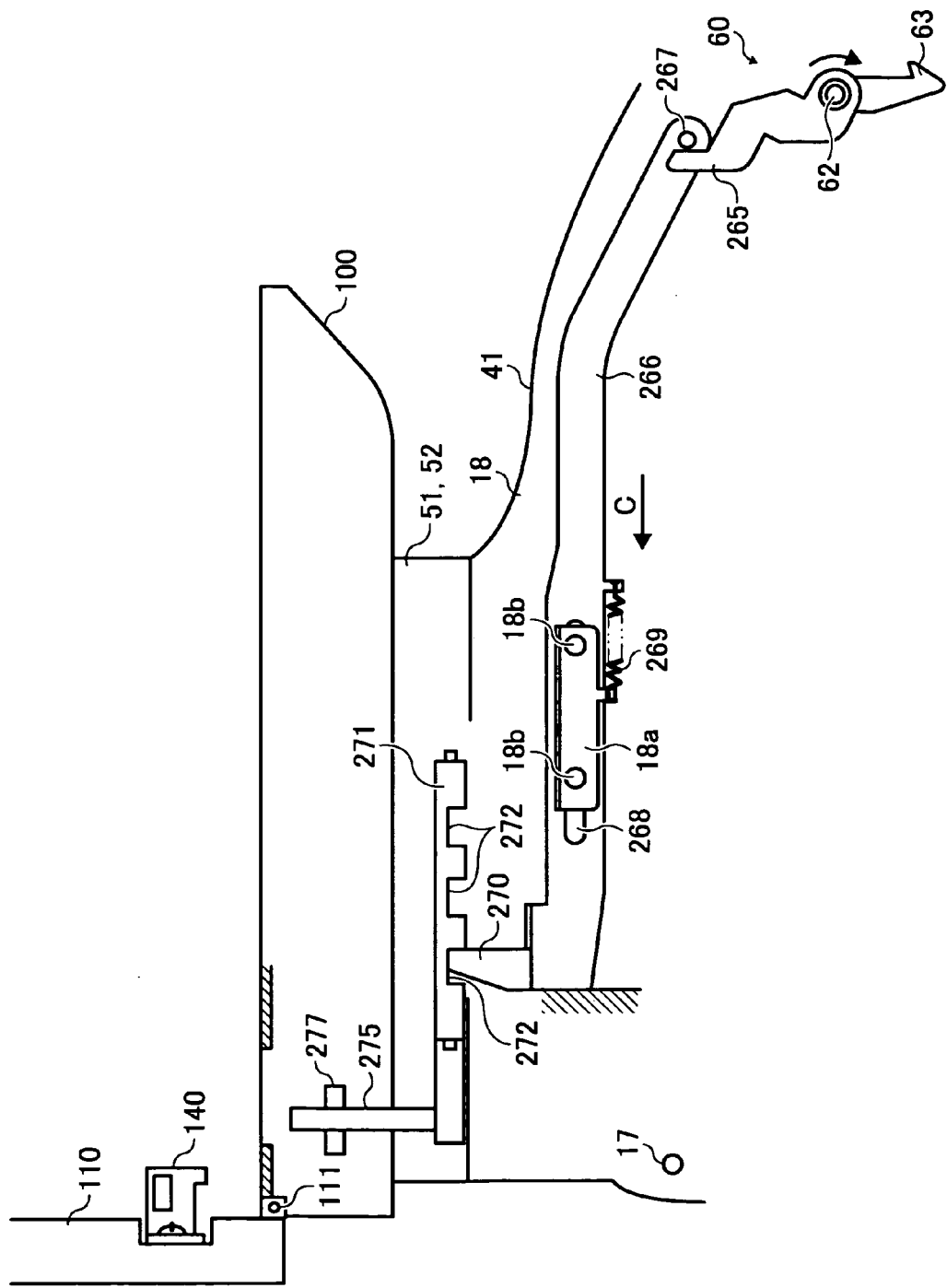
FIG. 45 is a side view illustrating the state in which the upper cover lock mechanism is locked.

FIG. 45 illustrates a state in which the platen cover 110 is opened with respect to the housing of the scanner 100. As illustrated in FIG. 45, the spring 269 biases the slide member 266 in a direction shown by arrow C and holds the slide member 266 so that the back end of the slide member 266 contacts the housing of the upper cover 18. When the user operates the cover pull 61 illustrated in FIG. 42 to rotate the support shaft 62 of the cover lock 60, the relay lever 265 engages the pin 267, and thus the slide member 266 is pulled to the front side, in a direction opposite the direction shown by arrow C. When the user releases the cover pull 61, the slide member 266 moves in the direction shown by arrow C to the position illustrated in FIG. 45, being biased by the spring 269.

It is to be noted that, in view of component and installation tolerances, it is preferable to allow a given space between the pin 267 and the relay lever 265 when the upper cover 18 is closed. With such a space, the slide member 266 can slide to the position at which its back end contacts the housing of the upper cover 18, without being hindered by the relay lever 265.

Figure 46A:
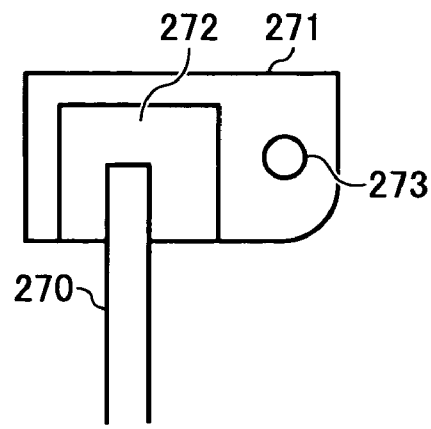
FIG. 46A illustrates engagement between a convexity and a concavity included in the upper cover lock mechanism.
Figure 46B:
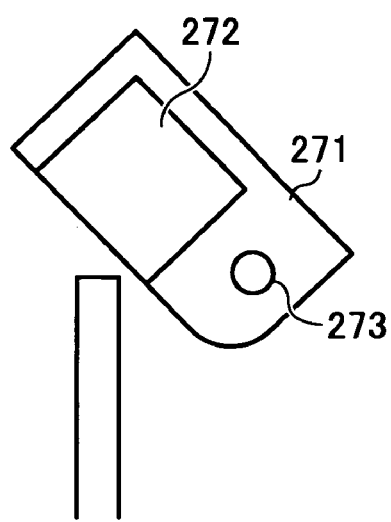
FIG. 46B illustrates disengagement between the convexity and the concavity included in the upper cover lock mechanism.

FIG. 46A illustrates a lock position of the lock release 271 at which the convexity 270 engages the concavity 272, and FIG. 46B illustrates an unlock position thereof at which the convexity 270 disengages from the concavity 272. The lock release 271 is controlled by a stopper, not shown, to rotate between the lock position and the unlock position. Referring to FIGS. 43, 44, 46A, and 46B, the spring 274 biases the lock release 271 to rotate around the pivot 273 to the unlock position, and the leg 276 of the operation member 275 rotates the lock release 271 to the lock position and the unlock position.

Figure 47A:
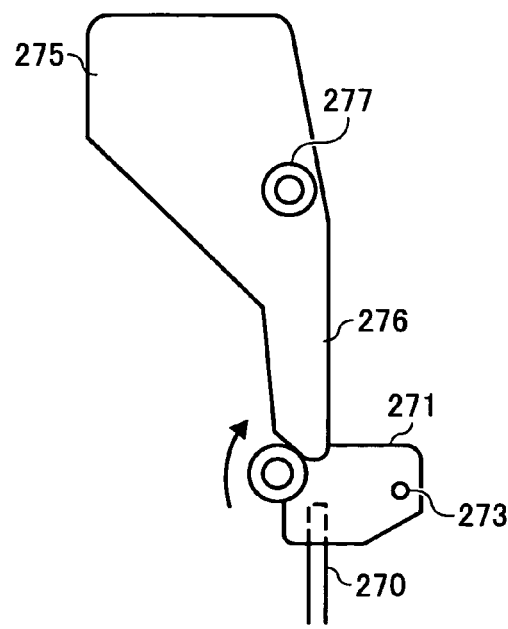
FIG. 47A illustrates a lock position of an operation member.
Figure 47B:
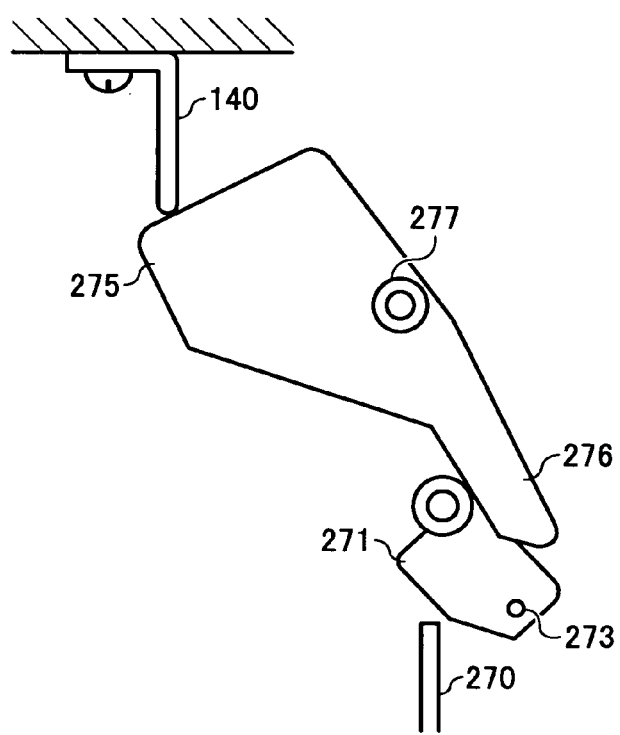
FIG. 47B illustrates an unlock position of the operation member.

FIGS. 47A and 47B illustrate lock and unlock positions of the operation member 275 when the platen cover 110 is opened and closed, respectively. As described above, the operation member 275 is attached to the scanner 100 rotatably around the pivot 277. When the platen cover 110 is opened as illustrated in FIG. 45, the leg 276 of the operation member 275 is held by a spring, not shown, to the lock position to contact the lock release 271 as illustrated in FIGS. 44 and 47A. Although the spring of the operation member 275 biases the operation member 275 in the direction (lock direction) opposite the direction in which the spring 274 biases the lock release 271 (unlock direction), the spring of the operation member 275 surpasses the spring 274 of the lock release 271 in bias force, and thus the lock release 271 is held at the lock position.

By contrast, when the platen cover 110 is closed, the operation member 275 rotates counterclockwise from the position illustrated in FIGS. 44 and 47A around the pivot 277. In this rotation, the leg 276 of the operation member 275 moves away from the lock release 271, and the lock release 271 is rotated clockwise around the pivot 273 by the spring 274 so that the concavity 272 disengages from the convexity 270 as illustrated in FIGS. 43 and 47B.

Therefore, when the platen cover 110 is opened, the slide member 266 does not slide even if the user attempts to rotate the cover pull 61 upward around the support shaft 62 to open the upper cover 18 because the convexity 270 engages the concavity 272. That is, when the platen cover 110 is opened, the upper cover 18 is prevented from being opened because the cover pull 61 does not move. By contrast, when the platen cover 110 is closed, the slide member 266 can slide because the lock release 271 rotates and the concavity 272 disengages from the convexity 270. In this state, the cover pull 61 can rotate around the support shaft 62, and thus the upper cover 18 can be opened when the platen cover 110 is closed.

Figure 48:
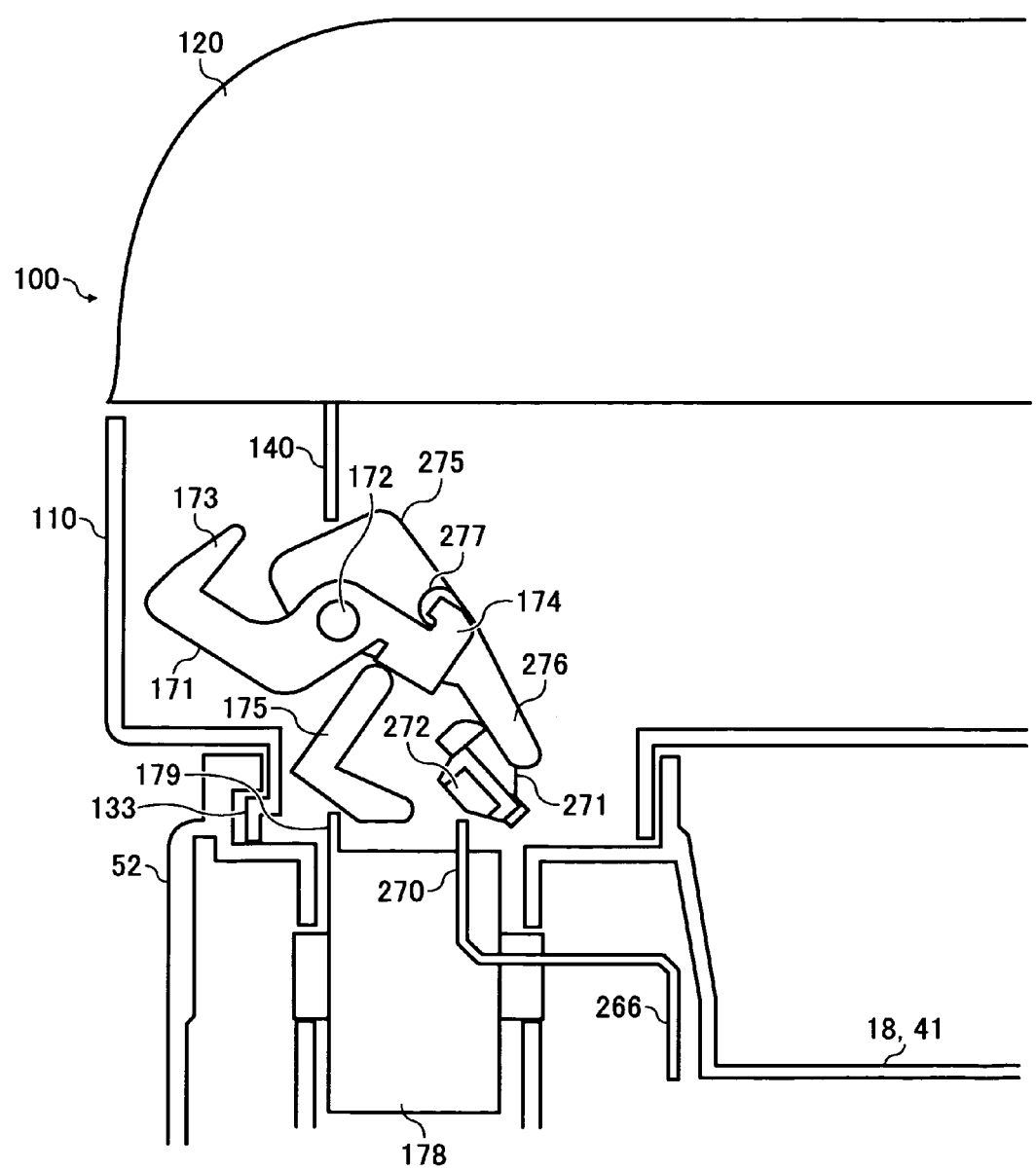
FIG. 48 illustrates arrangement of the upper cover lock mechanism and the lock mechanism illustrated in FIG. 34 in a cross-sectional view of the left supporter as viewed from the front of the apparatus.
Figure 49:
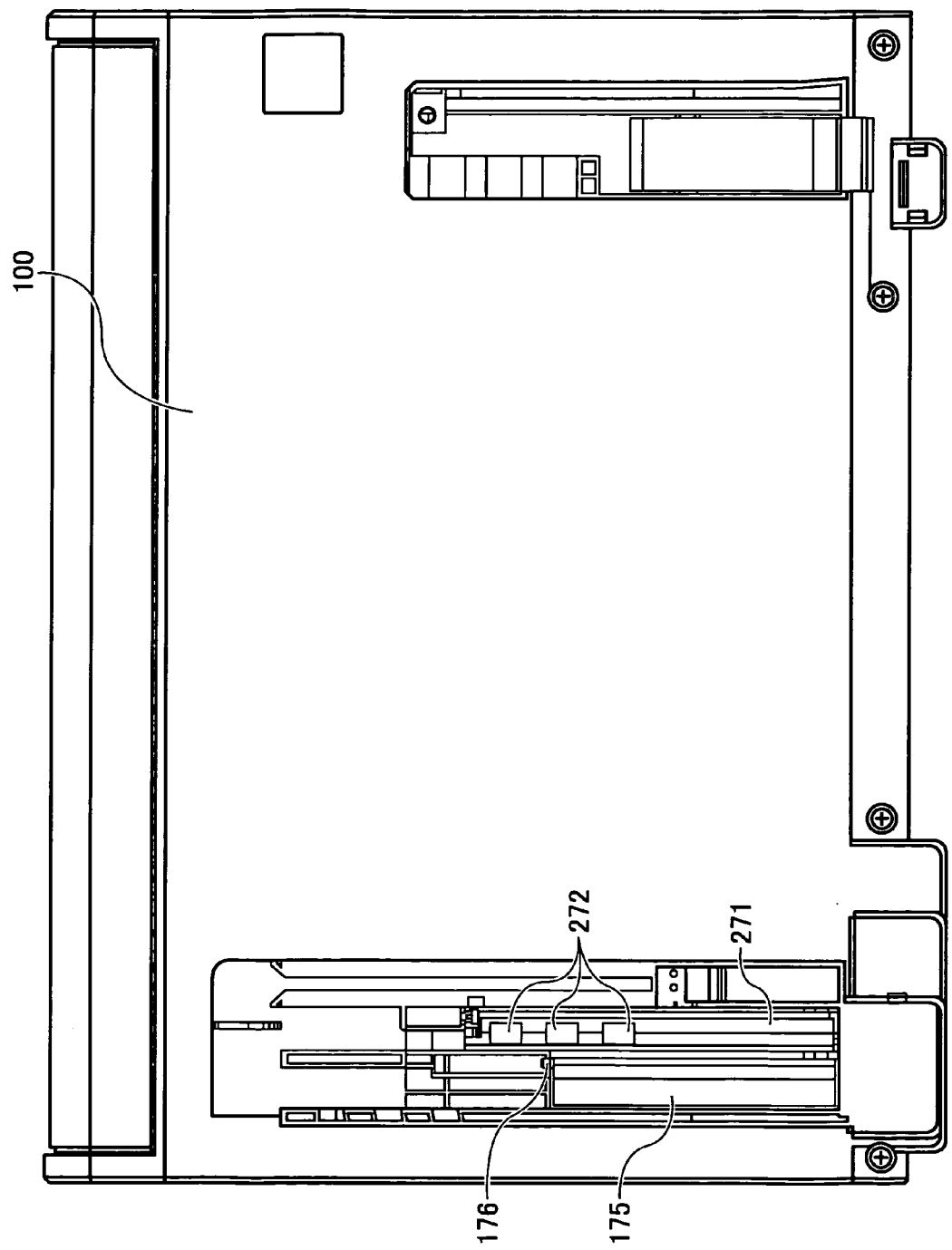
FIG. 49 illustrates the arrangement illustrated in FIG. 48 as seen in a bottom view of the scanner.

FIG. 48 illustrates arrangement of the upper cover lock mechanism and the platen lock 170 in a cross-sectional view of the support 52 as viewed from the front side. FIG. 49 also illustrates this arrangement as seen in a bottom view of the scanner 100.

As illustrated in FIG. 48, the convexity 270 that engages the concavity 272, the slide member 266, and the operation member 178 including the cam 179 that engages the lock intermediate member 175 are arranged within a width of the upper cover 18 on which the supporter 52 is provided, in a horizontal direction in FIG. 48. The slide member 266 extends from the front to the back sides of the image forming apparatus 300 (sliding direction), along the sheet stack surface 41.

As illustrated in FIG. 49, the lock release 271 that engages the convexity 270, the concavities 272, and the rotatable lock intermediate member 175 that engages the cam 179 of the operation member 178 are located laterally in the scanner 100 so as not to interfere with each other.

In FIG. 48, the lock release 271 is disengaged from the convexity 270 (unlock position), and rotatable counterclockwise to the lock position. In this state, the user can rotate the cover pull 61 to unlock the cover lock 60 and open the upper cover 18 with respect to the apparatus body 1 as illustrated in FIG. 5.

In FIG. 48, the lock intermediate member 175 contacts the cam 179 and tilts clockwise as illustrated in FIG. 36. In this state, the lock claw 173 is disengaged from the engagement part 140, and thus the platen cover 110 can be opened while the upper cover 18 is closed.

Figure 50:
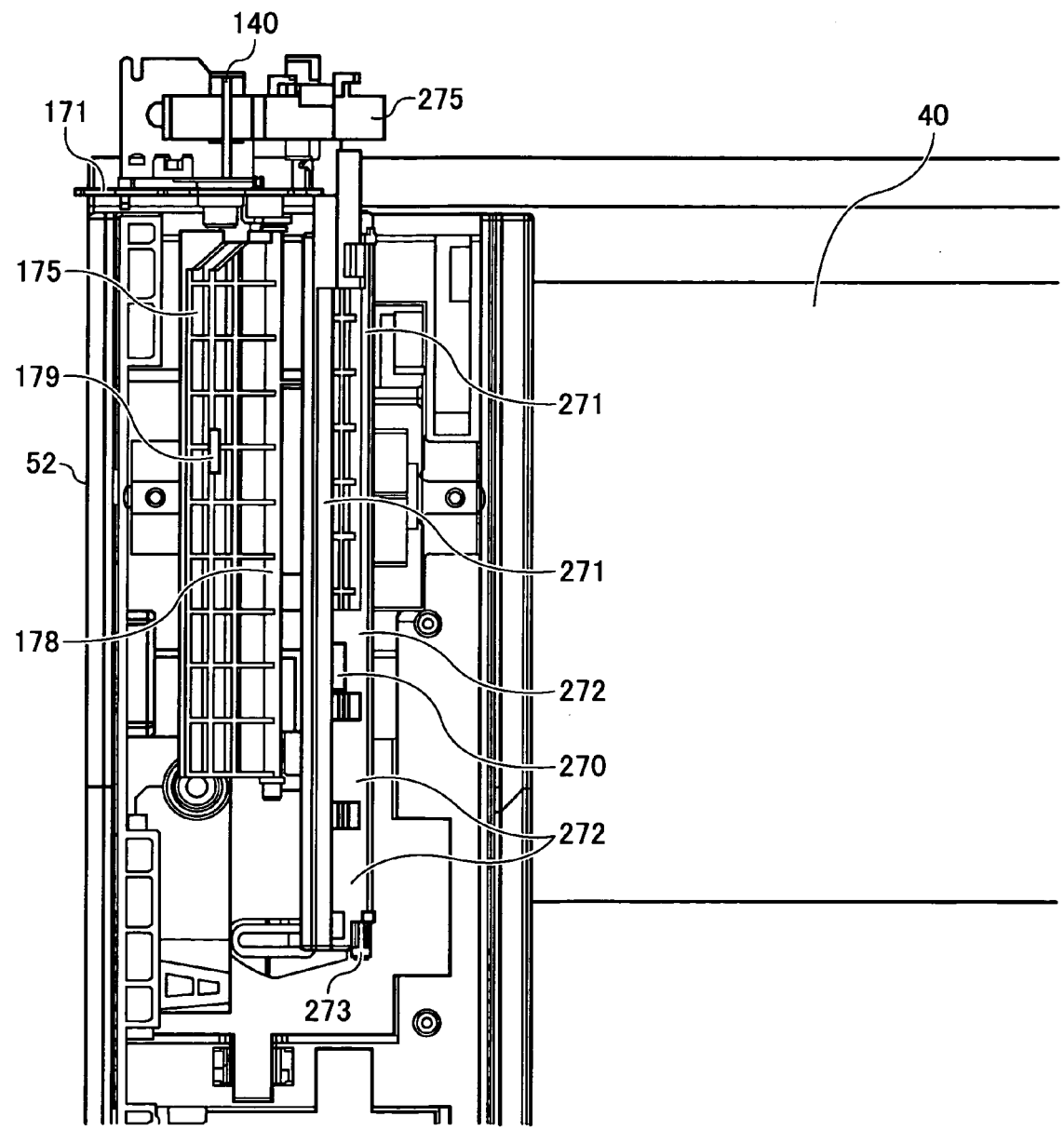
FIG. 50 illustrates the left supporter illustrated in FIG. 48 as viewed from above.

FIG. 50 illustrates the left supporter 52 as viewed from above, in the state illustrated in FIG. 48. As illustrated in FIGS. 49 and 50, the lock intermediate member 175 and the lock release 271 are rotatably provided within a width of the rail 133 (leg) of the scanner 100 that is slidably mounted within the supporter 52. The lock member 171 and the operation member 275 are located in a back side portion of the scanner 100 that protrudes from the back end of the supporter 52. The engagement part 140 is provided in the platen cover 110 as illustrated in FIG. 48 and extends across the operation member 275 and the lock member 171 as illustrated in FIGS. 48 and 50 when the platen cover 110 including the ADF 120 is closed with respect to the housing of the scanner 100.

Therefore, the engagement part 140 prohibits and allows opening of both the platen cover 110 and the upper cover 18 by engaging and disengaging from the lock member 171 and the operation member 275, respectively.

When the scanner 100 and the apparatus body 1 are separated as being individual units, a flat cable 370 runs from the scanner 100 to a control unit, not shown, of the apparatus body 1 through the supporter 51 as a signal line for transmitting image information read by the scanner 100 and a connection member for driving a scanner motor.

Figure 51:
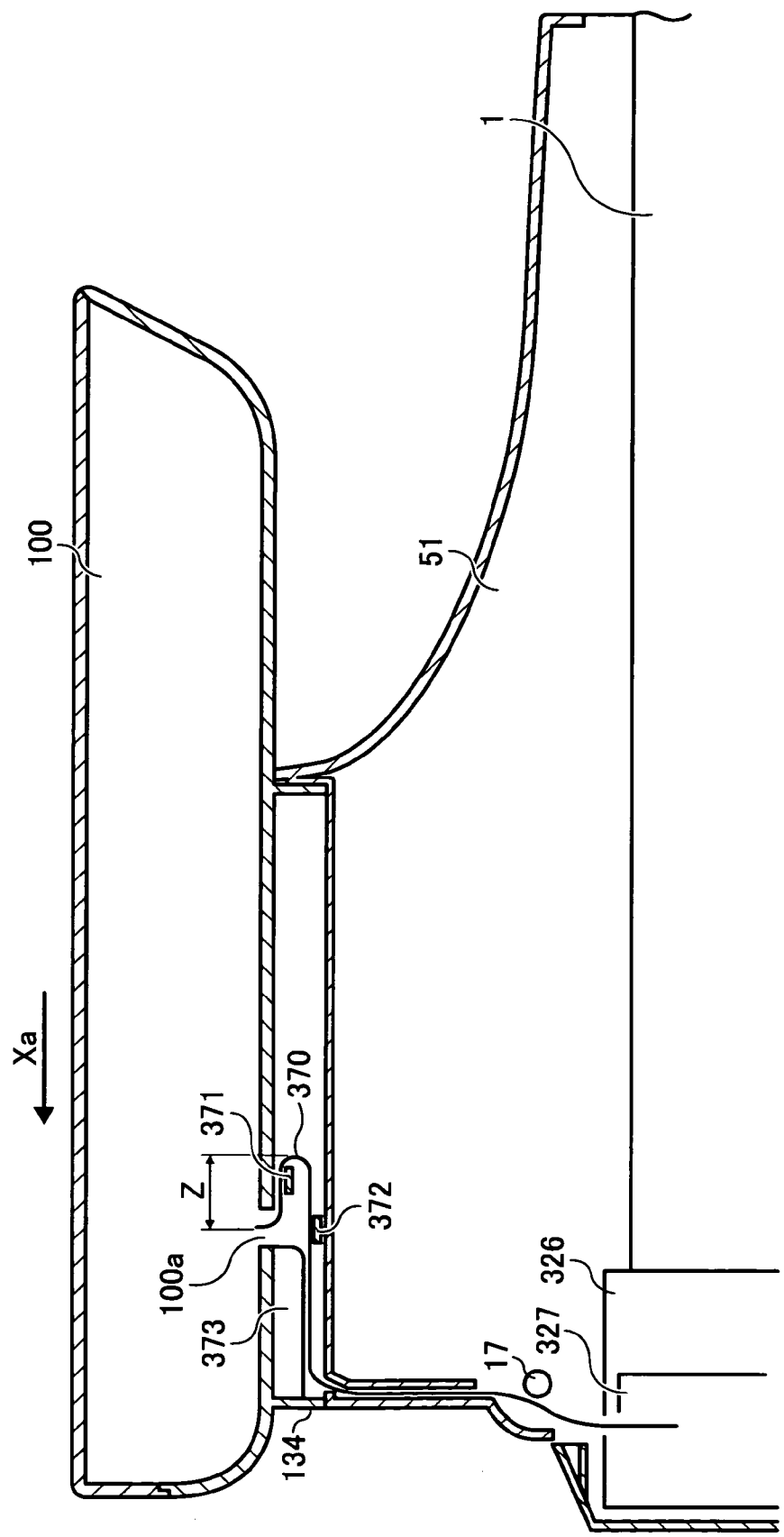
FIG. 51 is a cross-sectional view illustrating a flat cable connecting the scanner to the apparatus body.

Since the scanner 100 is installed so as to slide relative to the apparatus body 1 in the image forming apparatus 300 according to the present embodiment, the position of the scanner 100 changes relative to the apparatus body 1 in the sliding direction of the scanner 100. Therefore, as illustrated in FIG. 51, the flat cable 370 is bent back, otherwise the flat cable 370 is tensioned, which makes it difficult to slide the scanner 100.

Figure 2:
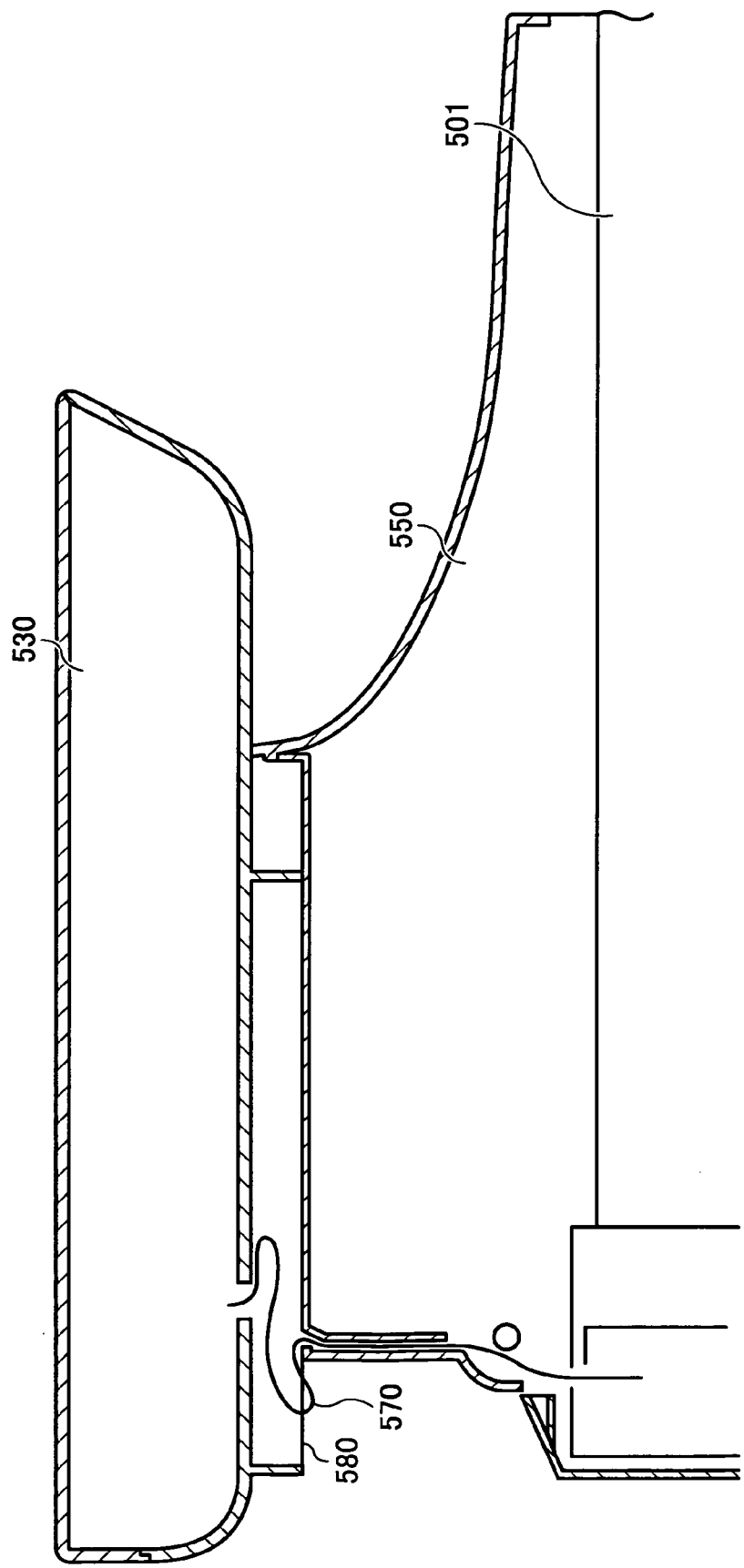
FIG. 2 is a cross-sectional view illustrating another state of the flat cable when the scanner is slid in the typical image forming apparatus.

However, when the flat cable 370 is bent back, the flat cable 370 hangs down as illustrated in FIG. 1 or hangs down from the space as illustrated in FIG. 2.

Therefore, in the present embodiment, the image forming apparatus 300 includes a first forming part 371 serving as a bending unit that bends back the flat cable 370 by holding the lower surface of the flat cable 370, a second forming part 372 serving as a bending unit that bends back the flat cable 370 to the rear of the apparatus by holding the lower surface of the flat cable 370 that passes the upper surface of the first forming part 371, and a bend limiter 373 extending from the back edge of the sliding portion of the scanner 100 to the vicinity of the second forming part 372.

Figure 52:
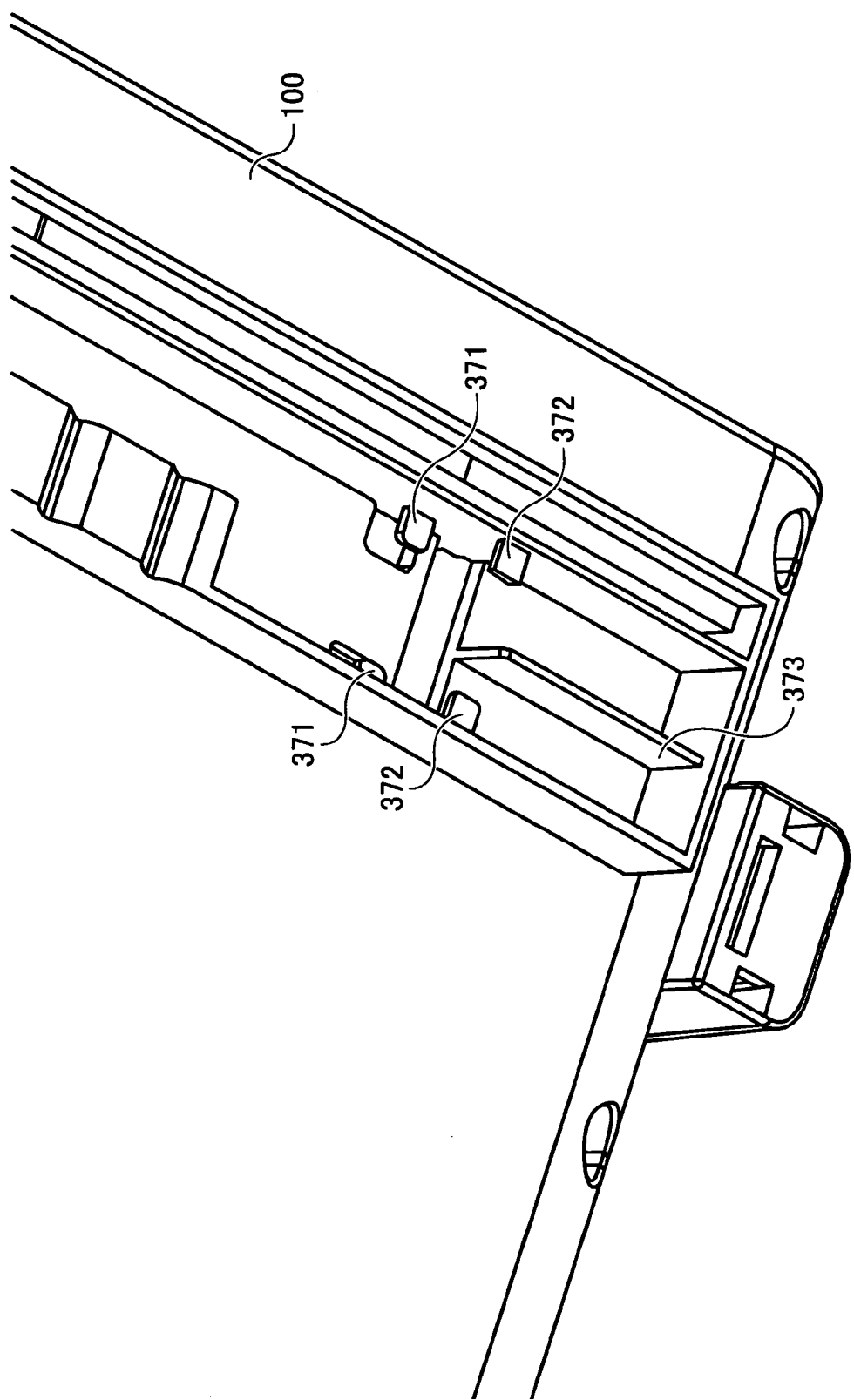
FIG. 52 is a perspective view illustrating an embodiment of a bending unit for the flat cable of FIG. 51 as viewed from beneath the scanner.
Figure 53:
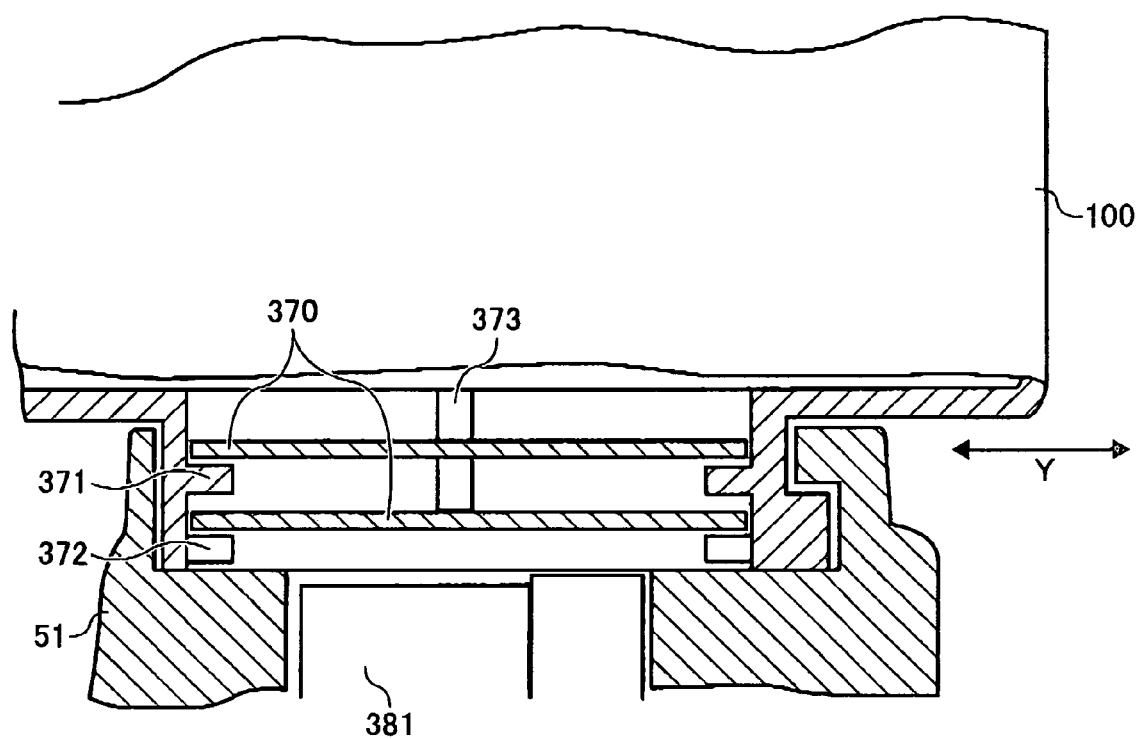
FIG. 53 is a cross-sectional view illustrating a positional relation between the flat cable of FIG. 51 and the bending unit as viewed from the front of the apparatus.
Figure 54:
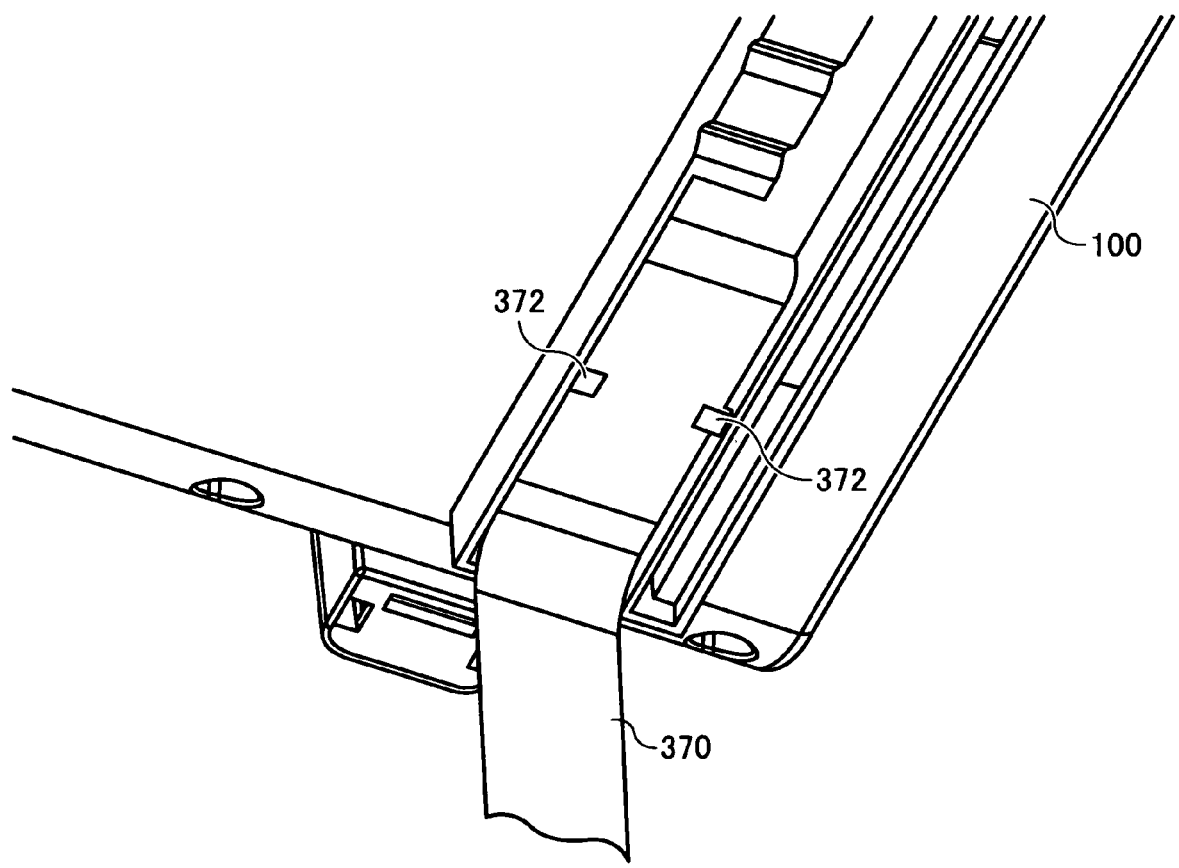
FIG. 54 is a perspective view illustrating the flat cable held by the bending unit as viewed from beneath the scanner.
Figure 55:
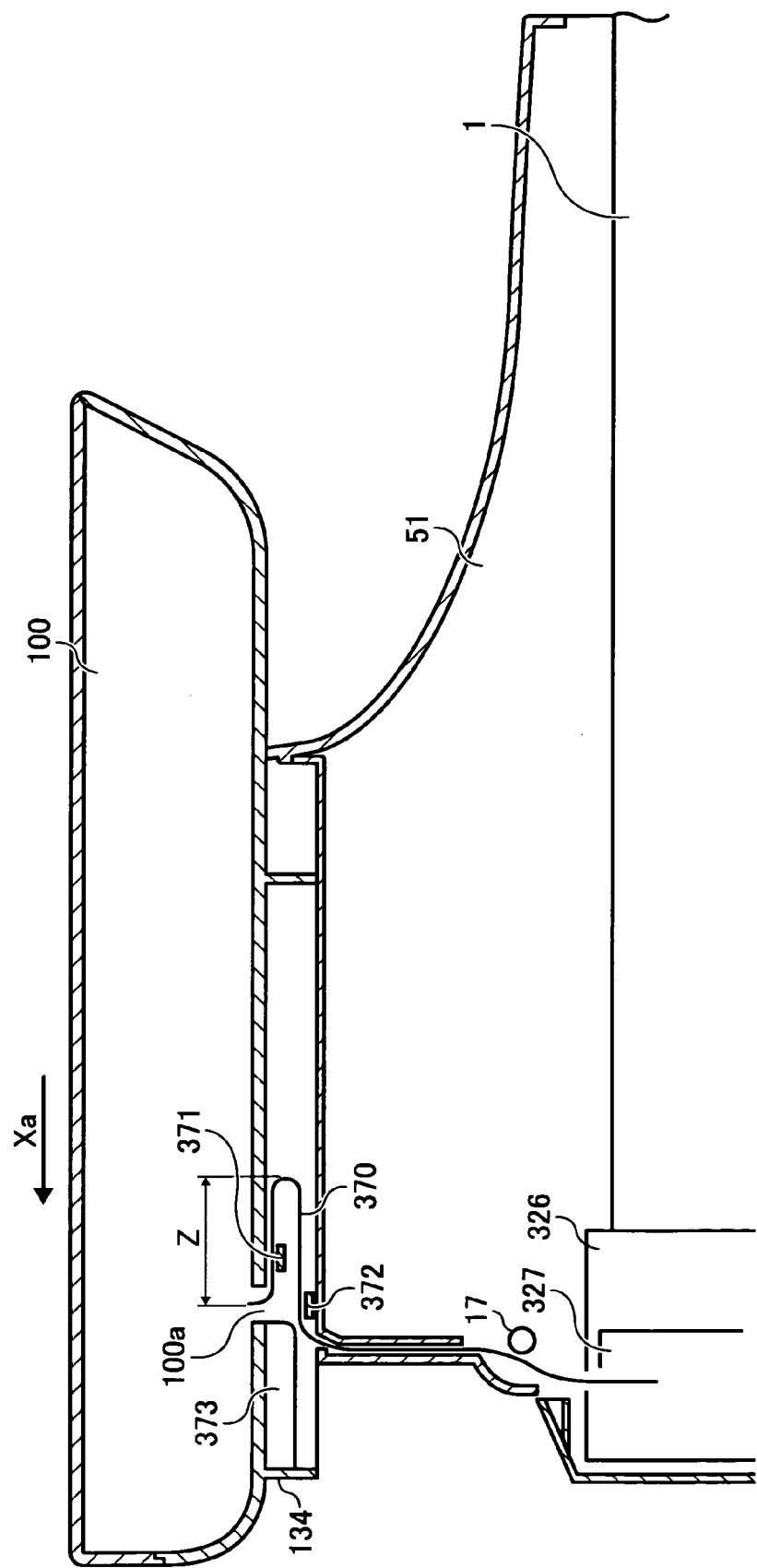
FIG. 55 is a cross-sectional view illustrating the flat cable when the scanner is slid backward.

As illustrated in FIG. 52, each of the first and second forming parts 371 and 372 is provided on both left and right of the opening in the sliding portion of the scanner 100. Each pair of the first forming parts 371 and the second forming parts 372 is arranged at a given interval in the width direction of the opening so that the flat cable 370 is easily inserted. The bend limiter 373 includes a rib formed at the substantial center of the opening in the sliding portion to bias the flat cable 370 at the substantial center thereof. The second forming part 372 is provided above the lower surface of the scanner 100 with a given space therebetween so that the second forming part 372 does not contact the slide surface of the supporter 51 when the scanner 100 slides on the slide surface of the supporter 51. The bend limiter 373 has a length longer than the distance between the back edge of the supporter 51 and the back edge of the sliding portion of the scanner 100 placed at the rearmost position as illustrated in FIG. 55.

With this configuration, the flat cable 370 running from an opening 100a of the scanner 100 is bent back at a forward position of the opening 100a using the first forming part 371. Therefore, the flat cable 370 is bent without tension either when the scanner 100 is slid forward or backward as illustrated in FIGS. 51 and 55. By providing the second forming part 372 beneath the flat cable 370 and behind the bent portion, the bent portion of the flat cable 370 is prevented from hanging down and contacting components, not shown, included in the supporter 51 like the flat cable 570 of FIG. 1.

Figure 56:
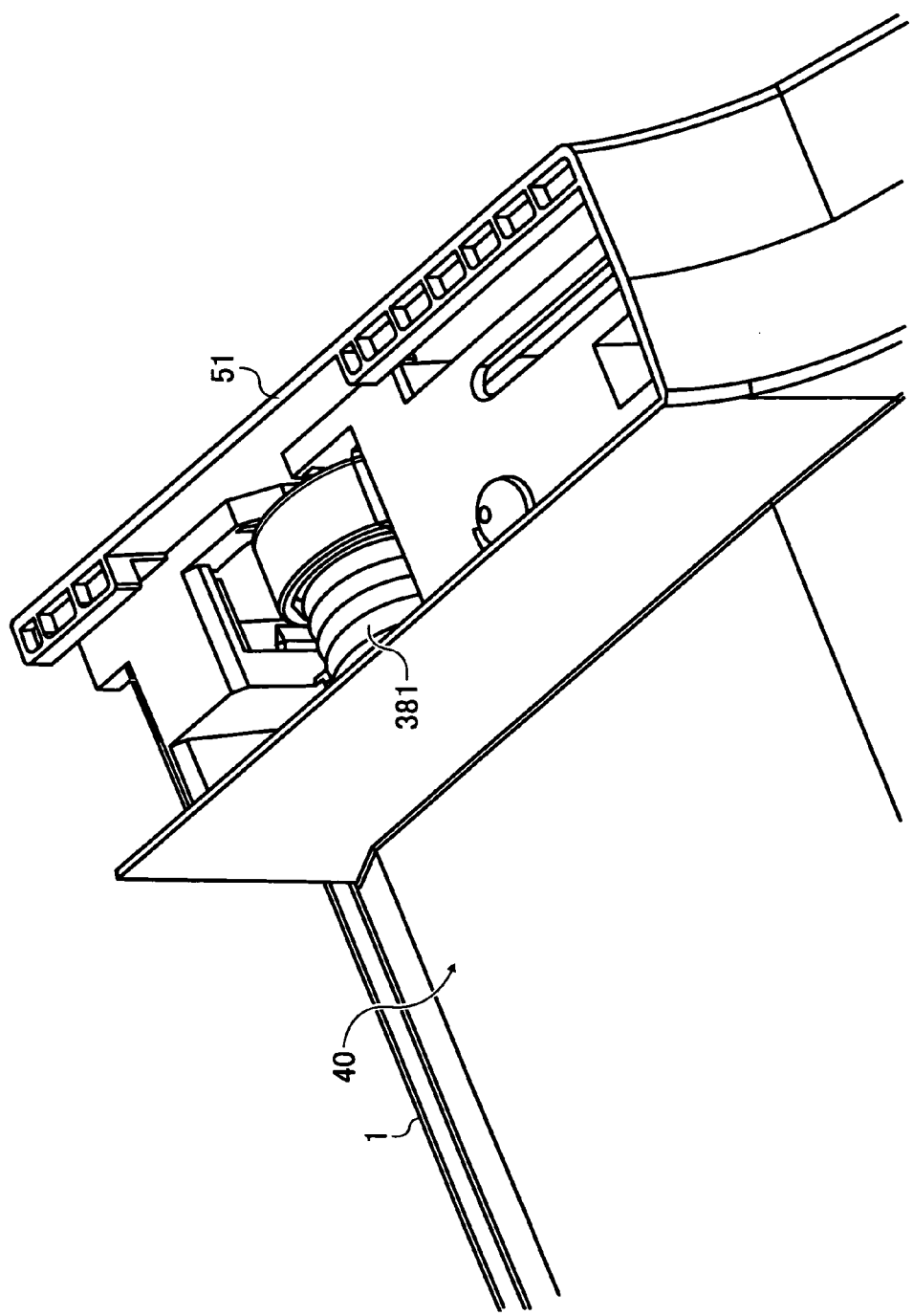
FIG. 56 is a perspective view of the supporter through which the flat cable runs as viewed from above.

Among the components included in the supporter 51, the flat cable 370 easily contacts a spring 381 illustrated in FIG. 56 that absorbs the shock of closing the upper cover 18. When the upper surface of the supporter 51 is opened, the hanging flat cable 570 in the configuration of FIG. 1 contacts the spring 381 and is damaged. By preventing the flat cable from hanging down using the second forming part 372, a damage to the flat cable 370 is prevented.

When the scanner 100 is positioned as illustrated in FIG. 51, the bend limiter 373 is located above the upper surface of the flat cable 370.

When the scanner 100 is slid backward in the sliding direction shown by arrow Xa as illustrated in FIG. 55, a bent part Z increases by K/2 mm, where K is the sliding amount of the scanner 100. The flat cable 370 tends to protrude upward and move backward as the scanner 100 slides backward. However, the bend limiter 373 provided above the upper surface of the flat cable 370 limits the upward movement of the flat cable 370 when the scanner 100 slides backward. Therefore, the flat cable 370 is prevented from moving back together with the scanner 100 and hanging down from beneath the slide surface of the scanner 100 as illustrated in FIG. 2.

Figure 57:
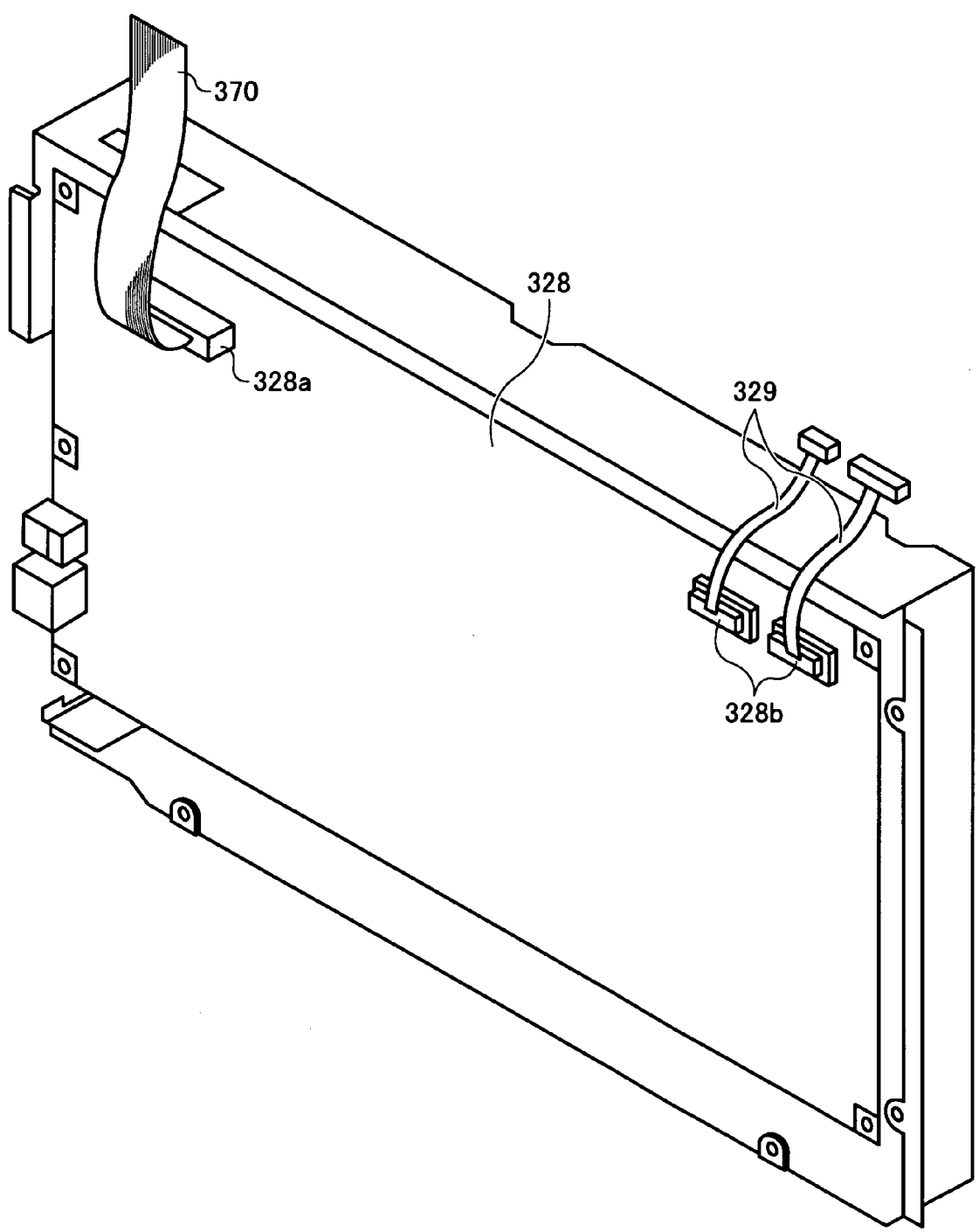
FIG. 57 is a perspective view illustrating a controller board to which the flat cable or harnesses are connected.

The flat cable 370 is bent back in the rail 134 and wired to controller boxes 326 and 327 provided on the rear of the apparatus as illustrated in FIGS. 51 and 55. As illustrated in FIG. 57, the flat cable 370 and harnesses 329 are connected to a controller board 328 included in the controller boxes 326 and 327 via connectors 328a and 328b, respectively.

By providing the controller board 328 to which the signal lines are connected on the rear of the apparatus, each of the flat cable 370 on the right and the harnesses 329 on the left of the apparatus runs a shorter distance.

The controller board 328 of FIG. 57 includes connectors for signal lines on the left and right to receive the corresponding left and right signal lines running from the rails. Therefore, the signal lines can be shortened. Further, the connector 328a for the flat cable is provided on the right of the apparatus and the connector 328b for the harness is provided on the left of the apparatus.

In addition, a plurality of signal lines are separated into the left and right rails provided beneath the scanner 100, which leads to effective use of space. When the apparatus includes a flat cable and a harness, the flat cable and the harness are separated into left and right for easy storage in the rail 134 and prevention of mutual detrimental influence of noise.

The bend limiter 373 is configured to bias the flat cable 370 at the substantial center thereof in the present embodiment, but is not limited thereto.

Figure 58:
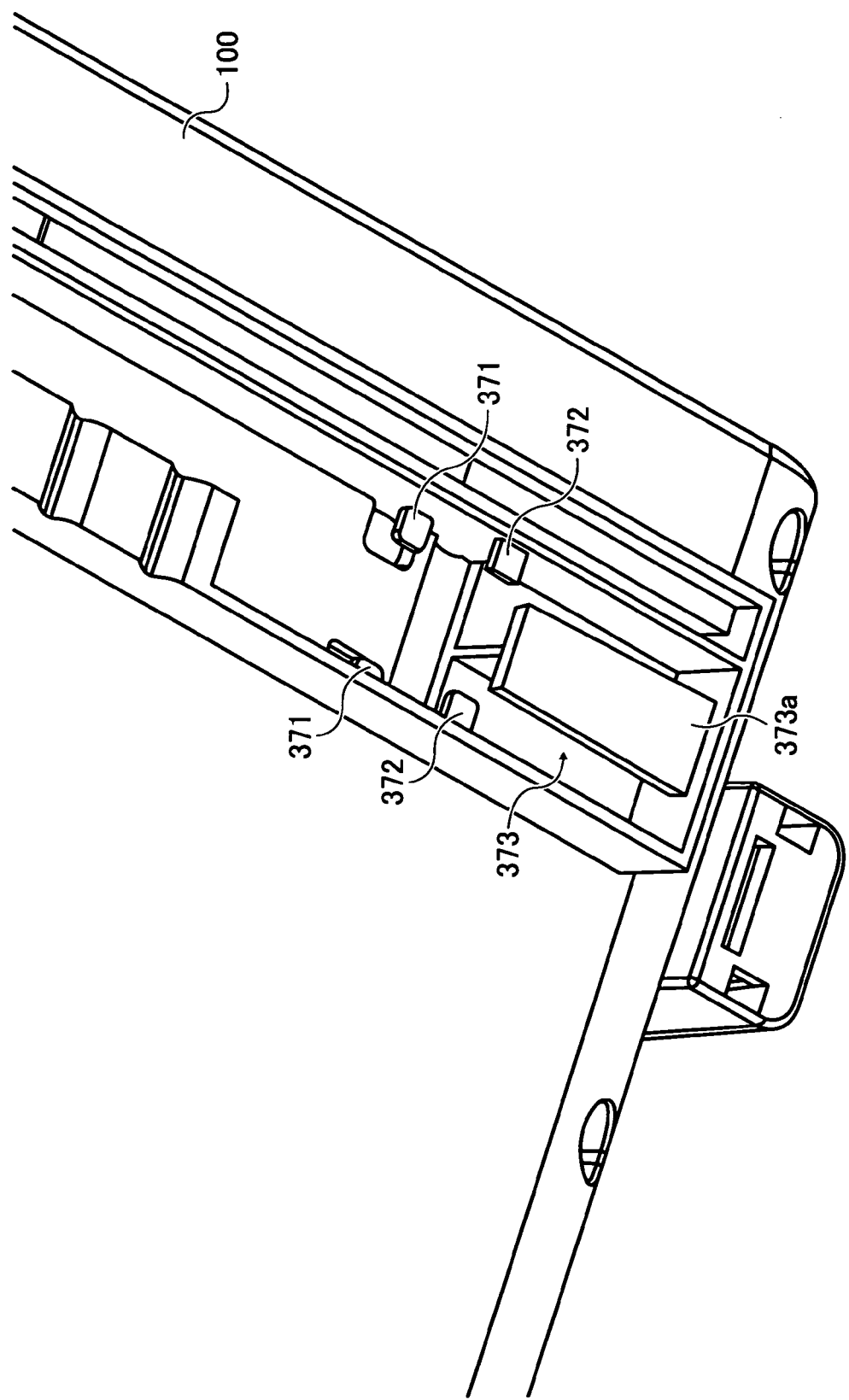
FIG. 58 is a perspective view illustrating another embodiment of the bending unit as viewed from beneath the scanner.

For example, as illustrated in FIG. 58, the bend limiter 373 includes a component 373a having a planar shape to bias the flat cable 370. In this case, the plane contact with the flat cable 370 limits the movement of the flat cable 370 more firmly. The bend limiter 373 including the component 373a is applied to limit the movement of a signal line that does not have a planar shape, as the flat cable 370 does.

Figure 59:
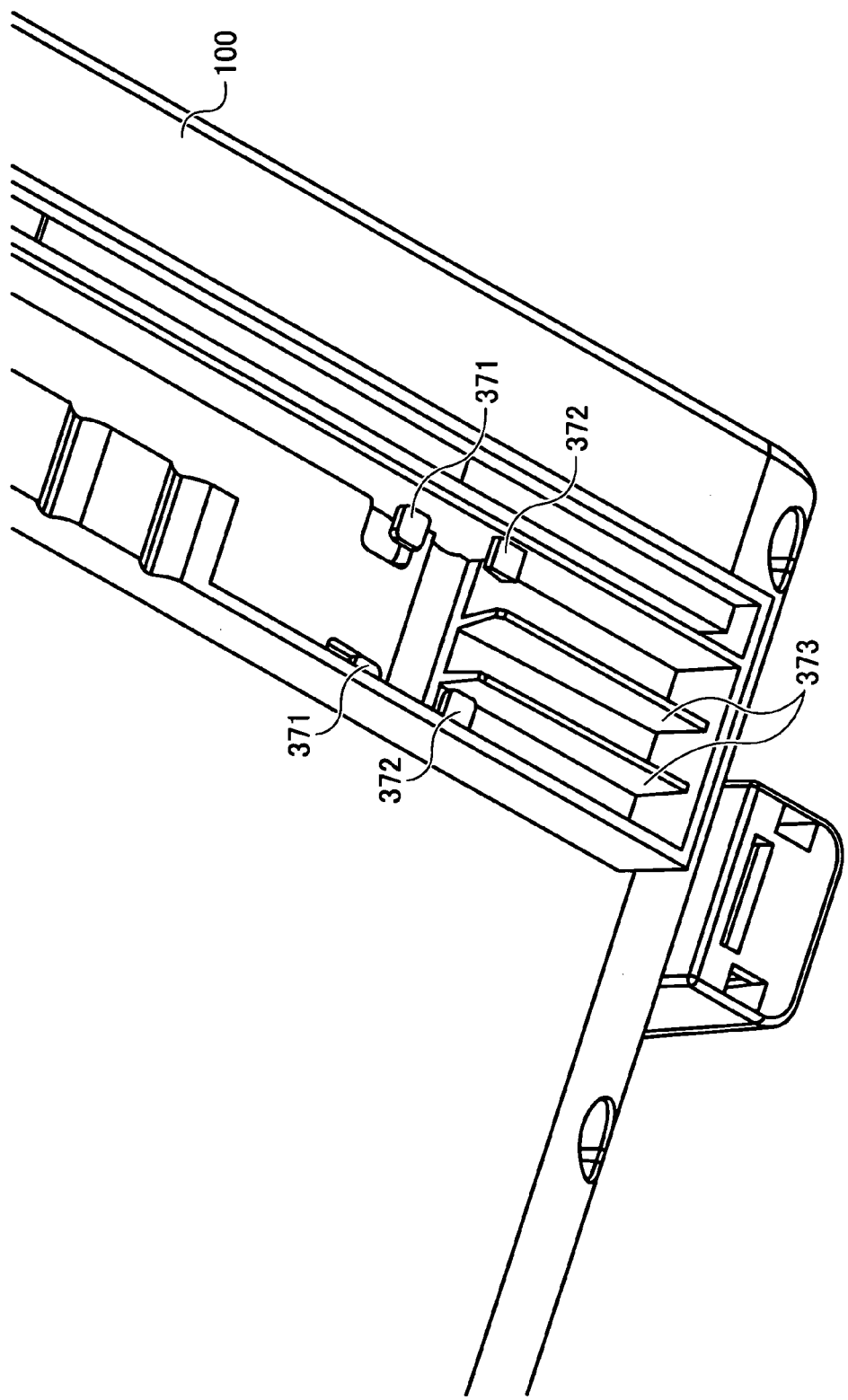
FIG. 59 is a perspective view illustrating still another embodiment of the bending unit as viewed from beneath the scanner.

As another type of the bend limiter 373, the bend limiter 373 includes a plurality of ribs that are parallel to the signal line. For example, as illustrated in FIG. 59, the bend limiter 373 includes two ribs. In this case, the flat cable 370 is biased at both ends, which more firmly limits the movement of the flat cable 370. Further, the bend limiter 373 including lattice-shaped ribs is applied to achieve the same effect.

The second forming part 372 is provided to prevent the flat cable 370 from hanging down in the present embodiment, but is not limited thereto.

Figure 60:
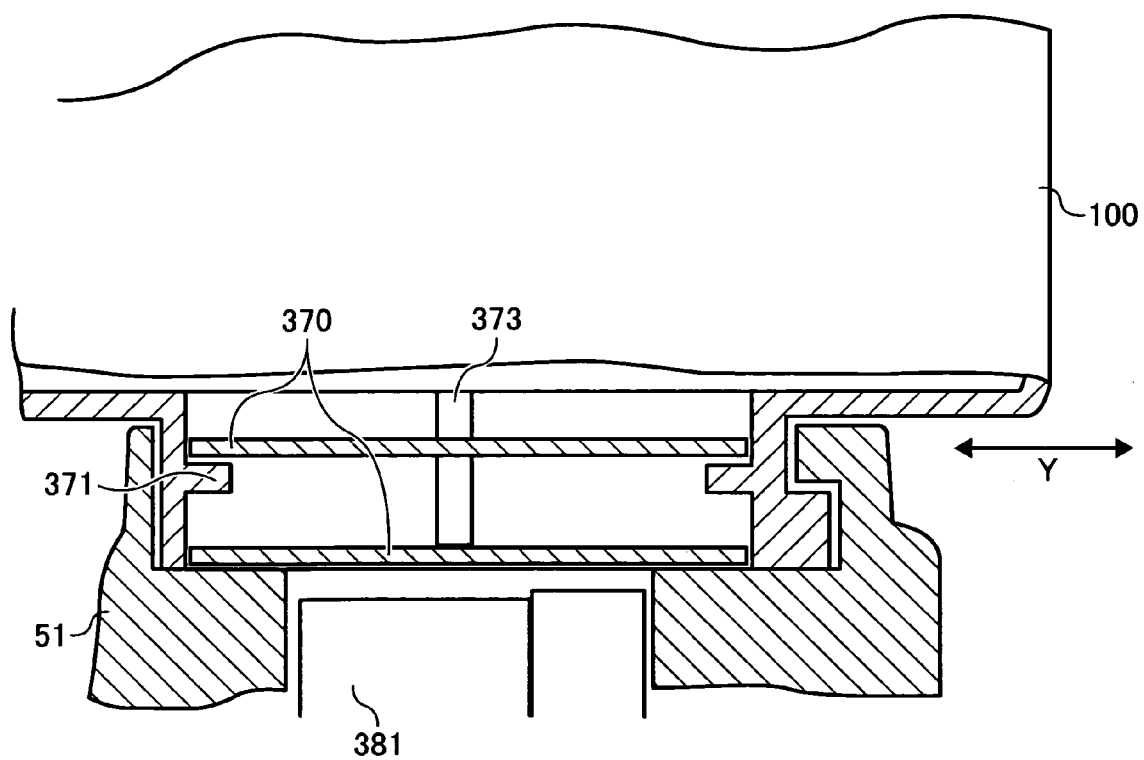
FIG. 60 is a cross-sectional view illustrating a positional relation between the flat cable and the bending unit according to still another embodiment as viewed from the front of the apparatus.

For example, the upper surface of the supporter 51, on which the scanner 100 slides, is used as the second forming part 372 as illustrated in FIG. 60.

Specifically, as illustrated in FIG. 56, the supporter 51 on the right of the apparatus body 1 includes the slide surface on which the scanner 100 slides. The slide surface has an opening in which the spring 381 and the rotation axis 17 are partially exposed. The opening has a width larger than that of the flat cable 370 as illustrated in FIG. 60. When the upper edges of the spring 381 and the rotation axis 17 are lower than the slide surface, the flat cable 370 is prevented from hanging down by the slide surface. Therefore, the second forming part 372 is not necessary.

Numerous additional modifications and variations are possible in light of the above teachings. It is therefore to be understood that, within the scope of the appended claims, the disclosure of this patent specification may be practiced otherwise than as specifically described herein.

What is claimed is:

1. An image forming apparatus comprising:
   an image reading part configured to read an original;
   an image forming part configured to form an image of the original on a sheet;
   a sheet discharge part configured to discharge the sheet on which the image is formed by the image forming part from front to rear of a main body of the image forming apparatus;
   a sheet stack part configured to stack the sheet discharged by the sheet discharge part between the image reading part and the image forming part;
   a supporter provided outside the sheet stack part along a discharge direction of the sheet and configured to form a space between the sheet stack part and the image reading part;
   a connector configured to electrically connect the image forming part with the image reading part;
   a bending unit provided between the image reading part and the supporter and configured to bend back the connector in a sliding direction of the image reading part; and
   a bend limiter provided at a rear position of the image reading part in the sliding direction and configured to limit bending of the connector.

2. The image forming apparatus according to claim 1, wherein the image reading part comprises a leg part sliding on an upper surface of the supporter, and wherein the leg part includes the bend limiter.

3. The image forming apparatus according to claim 1, wherein the bending unit comprises a hook part provided at a forward position of an opening of the image reading part from which the connector runs and configured to bend back the connector.

4. The image forming apparatus according to claim 3, wherein the connector comprises a flat cable configured to transmit image information read by the image reading part.

5. The image forming apparatus according to claim 3, wherein the connector comprises a flat cable configured to transmit input to a motor of the image reading part.

* * * * *